(12) United States Patent
Chen et al.

(10) Patent No.: US 12,150,167 B2
(45) Date of Patent: Nov. 19, 2024

(54) PHYSICAL LAYER PREAMBLE AND SIGNALING FOR WIRELESS COMMUNICATION

(71) Applicant: QUALCOMM Incorporated, San Diego, CA (US)

(72) Inventors: Jialing Li Chen, San Diego, CA (US); Sameer Vermani, San Diego, CA (US); Lin Yang, San Diego, CA (US); Bin Tian, San Diego, CA (US); Vincent Knowles Jones, IV, Redwood City, CA (US); Youhan Kim, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/480,480

(22) Filed: Oct. 3, 2023

(65) Prior Publication Data

US 2024/0040610 A1    Feb. 1, 2024

Related U.S. Application Data

(63) Continuation of application No. 18/092,361, filed on Jan. 2, 2023, now Pat. No. 11,871,446, which is a
(Continued)

(51) Int. Cl.
*H04W 74/00* (2009.01)
*H04L 5/00* (2006.01)
(Continued)

(52) U.S. Cl.
CPC ......... *H04W 74/004* (2013.01); *H04L 5/0053* (2013.01); *H04L 5/0094* (2013.01);
(Continued)

(58) Field of Classification Search
CPC ........... H04W 74/004; H04W 72/0446; H04W 72/0453; H04W 72/21; H04W 72/23;
(Continued)

(56) References Cited

U.S. PATENT DOCUMENTS 9,439,161 B2    9/2016  Vermani et al.
10,165,551 B2   12/2018 Bharadwaj et al.
(Continued)

FOREIGN PATENT DOCUMENTS

CN    107005526 A    8/2017
CN    107534897 A    1/2018
(Continued)

OTHER PUBLICATIONS

Huawei., et al., "Inband Leakage and Blocking of Wideband Operation in NR-U", 3GPP TSG RAN WG1 Meeting #95, R1-1812674, Spokane, USA, Nov. 12-Nov. 16, 2018, 6 Pages.
(Continued)

*Primary Examiner* — Brian T O Connor
(74) *Attorney, Agent, or Firm* — Kevin M. Donnelly; Holland & Hart LLP

(57) ABSTRACT

This disclosure provides methods, devices and systems for wireless communication, and particularly, methods, devices and systems for including signaling regarding enhanced features of new wireless communication protocols. The signaling may be included in various portions of a physical layer preamble of a wireless transmission. In some implementations, the physical layer preamble may be used to indicate puncturing of subbands or content channels that may carry further signaling in accordance with preamble signaling designs of this disclosure. The physical layer preamble signaling be parallelized for different subchannels of a wireless channel that consists of multiple subchannels. Some implementations of the physical layer preambles may
(Continued)

be used to multiplex different types of wireless local area network communications into different subsets of the plurality of subchannels of the wireless channel.

27 Claims, 33 Drawing Sheets

Related U.S. Application Data continuation of application No. 16/988,631, filed on Aug. 8, 2020, now Pat. No. 11,564,250.

(60) Provisional application No. 63/013,530, filed on Apr. 21, 2020, provisional application No. 63/003,812, filed on Apr. 1, 2020, provisional application No. 62/984,777, filed on Mar. 3, 2020, provisional application No. 62/978,297, filed on Feb. 18, 2020, provisional application No. 62/957,117, filed on Jan. 3, 2020, provisional application No. 62/926,406, filed on Oct. 25, 2019, provisional application No. 62/885,192, filed on Aug. 9, 2019.

(51) Int. Cl.
| | |
|---|---|
| *H04L 69/18* | (2022.01) |
| *H04L 69/22* | (2022.01) |
| *H04W 72/0446* | (2023.01) |
| *H04W 72/0453* | (2023.01) |
| *H04W 72/21* | (2023.01) |
| *H04W 72/23* | (2023.01) |
| *H04W 84/12* | (2009.01) |

(52) U.S. Cl.
CPC .............. *H04L 69/18* (2013.01); *H04L 69/22* (2013.01); *H04W 72/0446* (2013.01); *H04W 72/0453* (2013.01); *H04W 72/21* (2023.01); *H04W 72/23* (2023.01); *H04W 84/12* (2013.01)

(58) Field of Classification Search
CPC .. H04W 84/12; H04W 74/002; H04L 5/0053; H04L 5/0094; H04L 69/18; H04L 69/22; H04L 27/2602; H04L 27/2603; H04L 5/0091; H04L 27/2613; H04L 1/0013; H04L 1/0028; H04L 1/0079; H04L 5/0007

See application file for complete search history.

(56) References Cited

U.S. PATENT DOCUMENTS

| | | | | |
|---|---|---|---|---|
| 10,439,773 | B2 | 10/2019 | Vermani et al. | |
| 10,582,025 | B2* | 3/2020 | Josiam | H04L 5/0044 |
| 11,128,505 | B2* | 9/2021 | Chen | H04L 5/0094 |
| 11,128,515 | B2* | 9/2021 | Park | H04L 27/2602 |
| 11,212,705 | B2* | 12/2021 | Cao | H04L 27/2602 |
| 11,398,886 | B2 | 7/2022 | Noh et al. | |
| 11,546,938 | B2* | 1/2023 | Chen | H04W 74/002 |
| 11,564,250 | B2* | 1/2023 | Chen | H04L 5/0094 |
| 11,569,953 | B2* | 1/2023 | Chen | H04L 5/0044 |
| 11,871,446 | B2* | 1/2024 | Chen | H04L 69/18 |
| 2014/0307649 | A1 | 10/2014 | Vermani et al. | |
| 2016/0212001 | A1 | 7/2016 | Azizi et al. | |
| 2016/0330300 | A1 | 11/2016 | Josiam et al. | |
| 2017/0013603 | A1 | 1/2017 | Vermani et al. | |
| 2017/0064718 | A1 | 3/2017 | Bharadwaj et al. | |
| 2019/0097850 | A1 | 3/2019 | Kenney et al. | |
| 2019/0116513 | A1 | 4/2019 | Verma et al. | |
| 2020/0136884 | A1 | 4/2020 | Park et al. | |
| 2020/0177425 | A1 | 6/2020 | Chen et al. | |
| 2020/0382998 | A1 | 12/2020 | Cao et al. | |
| 2021/0045117 | A1 | 2/2021 | Chen et al. | |
| 2021/0045151 | A1 | 2/2021 | Chen et al. | |
| 2021/0273838 | A1 | 9/2021 | Park et al. | |
| 2022/0124507 | A1 | 4/2022 | Ryu et al. | |
| 2022/0124693 | A1 | 4/2022 | Redlich et al. | |
| 2022/0140948 | A1 | 5/2022 | Kim et al. | |
| 2022/0140962 | A1 | 5/2022 | Park et al. | |
| 2022/0158773 | A1 | 5/2022 | Kim et al. | |
| 2022/0279562 | A1 | 9/2022 | Park et al. | |
| 2022/0322348 | A1 | 10/2022 | Park et al. | |
| 2022/0329471 | A1 | 10/2022 | Lim et al. | |
| 2023/0156780 | A1 | 5/2023 | Chen et al. | |
| 2023/0156781 | A1 | 5/2023 | Chen | |

FOREIGN PATENT DOCUMENTS

| | | |
|---|---|---|
| CN | 107820683 A | 3/2018 |
| EP | 3358776 A1 | 8/2018 |
| WO | WO-2014193547 | 12/2014 |
| WO | WO-2015009846 A1 | 1/2015 |
| WO | WO-2017007931 | 1/2017 |
| WO | WO-2017027573 A1 | 2/2017 |
| WO | 2021030233 A1 | 2/2021 |
| WO | 2021030234 A2 | 2/2021 |

OTHER PUBLICATIONS

Baik E (QUALCOMM): "TGah D1.0 LB200 Comment Resolutions on Section 24.3.8 S1G Preamble", IEEE Draft, 11-14-0108-01-00AH-LB200-PHY-CID-Resolutions-FOR-24-3-8, IEEE-SA Mentor, Piscataway, NJ USA, vol. 802, 11ah, No. 1, Jan. 20, 2014 (Jan. 20, 2014), pp. 1-41, XP068156337, Retrieved from the Internet: URL: https://mentor.ieee.org/802.11/dcn/14/11-14-0108-01-00ah-lb200-phy-cid-resolutions-for-24-3-8.docx [retrieved on Jan. 20, 2014] Tables 24-14 Tables 24-15.

Chatzimisios P., et al., "Past, Present and Future of IEEE 802.11 Toward Wireless Gigabit Experience", Jan. 1, 2014 (Jan. 1, 2014), XP055679735, pp. 1-151, Retrieved from the Internet: URL: https://jesusalonsozarate.files.wordpress.com/2014/12/chatzimisios-iossifides-alonso-future-of-wifi-tutorial-globecom2014.pdf, p. 58.

International Preliminary Report on Patentability—PCT/US2020/045549 The International Bureau of WIPO—Geneva, Switzerland, Feb. 17, 2022.

International Preliminary Report on Patentability—PCT/US2020/045550 The International Bureau of WIPO—Geneva, Switzerland, Feb. 17, 2022.

International Search Report and Written Opinion—PCT/US2020/045549—ISA/EPO—Feb. 3, 2021.

International Search Report and Written Opinion—PCT/US2020/045550—ISA/EPO—Mar. 31, 2021.

Lim D (LGE): "Discussion on the Preamble for 11be", IEEE Draft, 11-19-1142-00-00BE-Discussion-on-the-Preamble-for-11BE, IEEE-SA Mentor, Piscataway, NJ USA, vol. 802.11 EHT, 802.11be, Jul. 16, 2019 (Jul. 16, 2019), pp. 1-9, XP068153105, Retrieved from the Internet: URL:https://mentor.ieee.org/802.11/dcn/19/11-19-1142-00-00be-discussion-on-the-preamble-for-11be.pptx [retrieved on Jul. 16, 2019] p. 6.

Partial International Search Report13 PCT/US2020/045550—ISA/EPO—Feb. 3, 2021.

Redlich O., et al., (HUAWEI): "Improved Preamble Puncturing in 802.11be", IEEE Draft, 11-19-1190-00-00BE-Improved-Preamble-Puncturing-in-802-11BE. IEEE-SA Mentor, Piscataway, NJ USA, vol. 802.11 EHT, 802.11be, Jul. 14, 2019 (Jul. 14, 2019), pp. 1-10, XP068152925, Retrieved from the Internet: URL: https://mentor.ieee.org/802.11/dcn/19/11-19-1190-00-00be-improved-preamble-puncturing-in-802-11be.pptx [retrieved on Jul. 14, 2019] p. 2-p. 5.

Stacey R (Intel)., et al., "Presentation on Proposed TGac Draft Amendment, 11-10-1376-00-00ac-Presentation-on-Proposed-Tgac-Draft-Amendment", IEEE Draft, 11-10-1376r0-00-00AC-Presentation-on-Proposed-Tgac-Draft-Amendment, IEEE-SA Mentor, Piscataway, NJ USA, vol. 802.11ac, Nov. 11, 2010 (Nov. 11, 2010), XP017675801, pp. 1-32, [retrieved on Nov. 11, 2010], p. 21.

(56) References Cited

OTHER PUBLICATIONS

Vermani S (Qualcomm): "Preamble Design Harmonization", IEEE Draft, 11-19-1021-01-00BE-Preamble-Design-Harmonization, IEEE-SA Mentor, Piscataway, NJ USA, vol. 802.11 EHT, 802 , 11be, No. 1, Jun. 27, 2019 (Jun. 27, 2019), pp. 1-5, XP068151544, Retrieved from the Internet: URL:https://mentor.ieee.org/802.11/dcn/19/11-19-1021-01-00be-preamble-design-harmonization.pptx [retrieved on Jun. 27, 2019] p. 2-p. 5.

Yang R (Interdigital): "Preamble Design Consideration for 802.11be", IEEE Draft, 11-19-1214-00-00BE-Preamble-Design-Consideration-for-802-11BE, IEEE-SA Mentor, Piscataway, NJ USA, vol. 802.11 EHT, 802.11be, Jul. 15, 2019 (Jul. 15, 2019), pp. 1-8, XP068153019, Retrieved from the Internet: URL:https://mentor.ieee.org/802.11/dcn/19/11-19-1214-00-00be-preamble-design-consideration-for-802-11be.pptx [retrieved on Jul. 15, 2019] p. 2.

Yusuke A: "Advanced Progress in IEEE 802.11 WLAN Standardization", 2014 Asia-Pacific Microwave Conference, IEICE, Nov. 4, 2014 (Nov. 4, 2014), pp. 911-913, XP032750578, [retrieved on Mar. 25, 2015] Paragraph [0IIB].

LAN/MAN Standards Committee of the IEEE Computer Society: "IEEE P802.11ax™/D4.3 Draft Standard for Information Technology—Telecommunications and Information Exchange between Systems Local and Metropolitan Area networks—Specific Requirements, Part 11: Wireless LAN Medium Access Control (MAC) and Physical Layer (PHY) Specifications, Amendment 1: Enhancements for High Efficiency WLAN", IEEE Draft, Draft P802.11AX_D4.3, IEEE-SA., Piscataway, NJ USA, vol. 802.11ax drafts, No. D4.3, Aug. 5, 2019 (Aug. 5, 2019), pp. 1-782, XP058152234, Retrieved from the Internet: URL:http://www.ieee802.org/11/private/Draft_Standards/11ax/Draft%20P802.11ax_D4.3.pdf>http://www.ieee802.org/11/private/Draft_Standards/11ax/Draft%20P802.11ax_D4.3.pdf [retrieved on Aug. 5, 2019]p. 549 p. 555 p. 584 Paragraph [27.3.6.6]Paragraph [27.3.10.7.2] Figures 27-8 Figures 27-9 Figures 27-10 Figures 27-11 Figures 27-26 Figures 27-29 Figures 27-30 Figures 27-31 Tables 27-18 Tables 27-20 Tables 27-21 Tables 27-24.

* cited by examiner

| PPDU BW | CASES | # OF ENTRIES | NOTE |
|---|---|---|---|
| 80MHZ PPDU | NO PUNCTURING | 1 | |
| | 20MHZ PUNCTURED | 4 | ANY ONE OUT OF FOUR 20MHZ IS PUNCTURED |
| | TOTAL | 5 | |
| 160MHZ PPDU | NO PUNCTURING | 1 | |
| | 20MHZ PUNCTURED | 8 | ANY ONE OUT OF EIGHT 20MHZ IS PUNCTURED |
| | 40MHZ PUNCTURED | 4 | ANY ONE OUT OF FOUR 40MHZ IS PUNCTURED |
| | TOTAL | 13 | |
| 320MHZ PPDU | NO PUNCTURING | 1 | |
| | 40MHZ PUNCTURED | 8 | ANY ONE OUT OF FOUR 80MHZ IS PUNCTURED |
| | 80MHZ PUNCTURED | 4 | |
| | 320-80-40 | 12 | FOR EACH CONTIGUOUS 240MHZ (FORMED BY EITHER 1ST OR 4TH 80MHZ BEING PUNCTURED), ONE OUT OF SIX 40MHZ IS PUNCTURED |
| | 320-80-80 | 5 | [1 1 X X], [1 X 1 X], [X 1 1 X], [X 1 X 1], [X X 1 1], WHERE 1 OR X REPRESENTS 80MHZ UNPUNCTURED OR PUNCTURED |
| | TOTAL | 30 | |

*Figure 12A*

| PPDU BW | CASES | # OF ENTRIES | NOTE |
|---|---|---|---|
| 80 MHZ PPDU | NO PUNCTURING | 1 | |
| | 20MHZ PUNCTURED | 4 | ANY ONE OUT OF FOUR 20MHZ IS PUNCTURED |
| | 40MHZ PUNCTURED | 3 | [X X 1 1], [1 X X 1], [1 1 X X], WHERE 1 OR X REPRESENTS 20MHZ UNPUNCTURED OR PUNCTURED |
| | TOTAL | 8 | |
| 160 MHZ PPDU | NO PUNCTURING | 1 | |
| | 20MHZ PUNCTURED | 8 | ANY ONE OUT OF EIGHT 20MHZ IS PUNCTURED |
| | 40MHZ PUNCTURED | 4 | ANY ONE OUT OF FOUR 40MHZ IS PUNCTURED |
| | TOTAL | 13 | |
| 320 MHZ PPDU | NO PUNCTURING | 1 | |
| | 40MHZ PUNCTURED | 8 | ANY ONE OUT OF FOUR 80MHZ IS PUNCTURED |
| | 80MHZ PUNCTURED | 4 | ANY ONE OUT OF FOUR 80MHZ IS PUNCTURED TO FORM 240/160+80MHZ |
| | 320-80-40 | 12 | FOR EACH CONTIGUOUS 240MHZ (FORMED BY EITHER 1ST OR 4TH 80MHZ BEING PUNCTURED), ONE OUT OF SIX 40MHZ IS PUNCTURED |
| | 320-80-80 | 5 | [1 1 X X], [1 X 1 X], [X 1 1 X], [X 1 X 1], [X X 1 1], WHERE 1 OR X REPRESENTS 80MHZ UNPUNCTURED OR PUNCTURED |
| | TOTAL | 30 | |

*Figure 12B*

| | Single User | Multiple Users | |
|---|---|---|---|
| | | Non-OFDMA (MU-MIMO) | OFDMA |
| Full BW (No Puncturing) | Compression Mode 1 | | No compression |
| Puncturing | Compression Mode 2 | | |

| | Non-OFDMA | | OFDMA | |
|---|---|---|---|---|
| | Single User | MU-MIMO | With Partial BW MU-MIMO | No MU-MIMO |
| Full BW (No Puncturing) | Compression Mode 1 | | Mode 3 | Mode 4 |
| Puncturing | Compression Mode 2 | | | |

| RU type | CBW20 | CBW40 | CBW80 | CBW80+80 and CBW160 | CBW80x3, CBW160+80 and CBW240 | CBW80x4, CBW160+80x2, CBW160x2 and CBW320 |
|---|---|---|---|---|---|---|
| 26-tone RU | 9 | 18 | 37 | 74 | 111 | 148 |
| 52-tone RU | 4 | 8 | 16 | 32 | 48 | 64 |
| 78-tone RU | 2 | 4 | 4 | 8 | 12 | 16 |
| 106-tone RU | 2 | 4 | 8 | 16 | 24 | 32 |
| 132-tone RU | 2 | 4 | 4 | 8 | 12 | 16 |
| 242-tone RU | 1 | 2 | 4 | 8 | 12 | 16 |
| 484-tone RU | N/A | 1 | 2 | 4 | 6 | 8 |
| 726-tone RU | N/A | N/A | 4 | 8 | 12 | 16 |
| 996-tone RU | N/A | N/A | 1 | 2 | 3 | 4 |
| (996+484)-tone RU | N/A | N/A | N/A | 4 | 8 | 8 |
| 2x996 tone RU | N/A | N/A | N/A | 1 | 2 | 2 |
| (2x996+484)-tone RU | N/A | N/A | N/A | N/A | 6 | N/A |
| 3x996 tone RU | N/A | N/A | N/A | N/A | 1 | 4 |
| (3x996+484)-tone RU | N/A | N/A | N/A | N/A | N/A | 8 |
| 4x996 tone RU | N/A | N/A | N/A | N/A | N/A | 1 |
| Total # of RUs | 20 | 41 | 80 | 165 | 257 | 343 |
| # of MU-MIMO RUs (RU106+ for max) | 5 | 11 | 23 | 51 | 86 | 115 |
| Total # | 25 | 52 | 103 | 216 | 343 | 458 |
| # of bits in signaling | 5 | 6 | 7 | 8 | 9 | 9 |

*Figure 33*

PHYSICAL LAYER PREAMBLE AND SIGNALING FOR WIRELESS COMMUNICATION

CROSS-REFERENCE TO RELATED APPLICATIONS

The present application for patent is a Continuation of U.S. patent application Ser. No. 18/092,361 filed Jan. 2, 2023, which is a Continuation of U.S. patent application Ser. No. 16/988,631 filed Aug. 8, 2020, which claims priority to U.S. Provisional Patent Application No. 62/885,192, filed Aug. 9, 2019, U.S. Provisional Patent Application No. 62/926,406, filed Oct. 25, 2019, U.S. Provisional Patent Application No. 62/957,117, filed Jan. 3, 2020, U.S. Provisional Patent Application No. 62/978,297, filed Feb. 18, 2020, U.S. Provisional Patent Application No. 62/984,777, filed Mar. 3, 2020, U.S. Provisional Patent Application No. 63/003,812, filed Apr. 1, 2020, and U.S. Provisional Patent Application No. 63/013,530, filed Apr. 21, 2020, all of which are entitled "PHYSICAL LAYER PREAMBLE AND SIGNALING FOR WIRELESS COMMUNICATION," and each of which are assigned to the assignee hereof and each of which are expressly incorporated by reference in its entirety herein.

TECHNICAL FIELD

This disclosure relates generally to wireless communication, and more specifically, to physical layer preambles and signaling for wireless transmissions.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN. New WLAN communication protocols are being developed to enable enhanced WLAN communication features. As new WLAN communication protocols enable enhanced features, new preamble designs are needed to support signaling regarding features and resource allocations.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication. The method includes receiving, via a wireless channel, a packet including a preamble portion and a data portion. The preamble portion may include a universal signal field (U-SIG) followed by one or more version-specific signal fields. The one or more version-specific signal fields may include a third signal field (EHT-SIG) on one or more subchannels of the wireless channel. The method may include determining that the U-SIG includes at least a version identifier, frequency occupation information and a format information field. The method may include determining a format of the packet based, at least in part, on the format information field. The method may include determining one or more subchannels of the wireless channel that include the version-specific signal field based on the frequency occupation information. The method includes receiving at least part of the packet and decoding the version-specific signal field on the one or more subchannels based on the determined format Another innovative aspect of the subject matter described in this disclosure can be implemented as an apparatus. The apparatus may include a processor configured to perform any one of the above-mentioned methods.

Another innovative aspect of the subject matter described in this disclosure can be implemented as a computer-readable medium having stored therein instructions which, when executed by a processor, causes the processor to perform any one of the above-mentioned methods.

Another innovative aspect of the subject matter described in this disclosure can be implemented as a system having means for implementing any one of the above-mentioned methods.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 12A shows an example table with a 5 to 6 bit design for punctured channel indication options to indicate the non-OFDMA punctured channel pattern.

FIG. 12B shows an example table with a 5 to 6 bit design for punctured channel indication options to indicate the punctured channel pattern for both OFDMA and non-OFDMA.

FIG. 32A shows a first example table with different options for compression modes that may be used in the EHT-SIG including a no compression mode.

FIG. 32B shows a second example table with different options for compression modes that may be used in the EHT-SIG including a compression mode for a PPDU that includes partial bandwidth MU-MIMO.

FIG. 33 shows a table with quantity of per-user RU assignment options when using a self-contained user field in the EHT-SIG.

Like reference numbers and designations in the various drawings indicate like elements.

DETAILED DESCRIPTION

Figure 1:
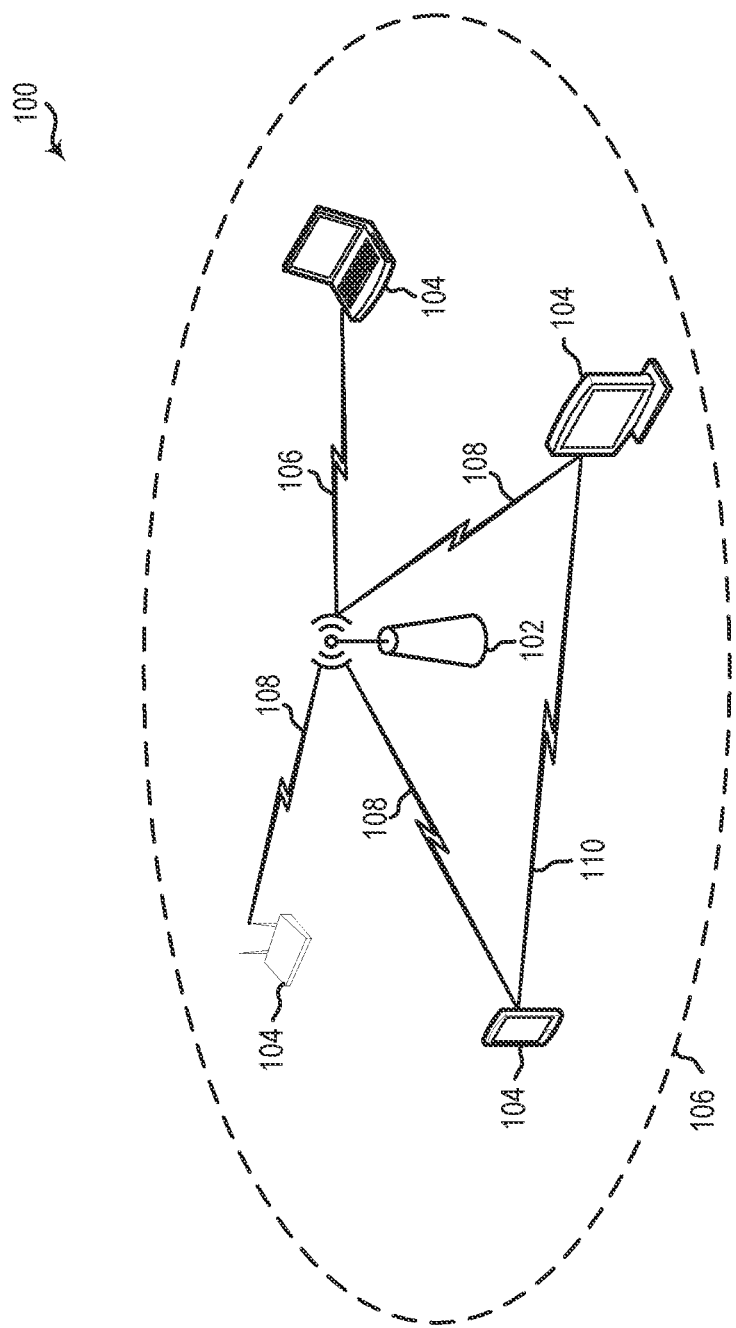
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

A physical layer convergence protocol (PLCP) protocol data unit (PPDU) may span multiple subchannels and may include a preamble portion and a data portion. Signaling refers to control fields or information in the preamble portion that can be used by a wireless communication device to interpret another field or portion of the preamble portion or the data portion of the PPDU. A wireless channel may be formed from multiple subchannels. Portions of the wireless channel bandwidth can be divided or grouped to form different resource units (RUs). Among other things, a preamble portion of a PPDU may include signaling to indicate which RUs are allocated to different devices. Other types of signaling include indicators regarding which subchannels include further signaling or which subchannels may be punctured. There are several formats of PPDUs (and related structures) defined for current wireless communication protocols. As new wireless communication protocols enable enhanced features, new preamble designs are needed support signaling regarding features and resource allocations.

Furthermore, it desirable to define a new preamble signaling protocol that can support future wireless communication protocols.

Various implementations relate generally to signaling included in a physical layer preamble that supports new wireless communication protocols. Some implementations more specifically relate to preamble designs for a PPDU in a wireless channel having up to (and potentially more than) 320 MHz bandwidth. In some implementations, the preamble designs are optimized to minimize a length of the preamble portion. Additionally, or alternatively, some implementations more specifically relate to preamble designs that accommodate signal fields of different types. Additionally, or alternatively, some implementations more specifically relate to preamble designs that accommodate parallelization of signaling among different content channels, subchannels, or subbands (which may include groups of subchannels) within a wireless channel. A subband may refer to a portion of the total bandwidth for the wireless channel and may include the use of multiple contiguous or non-contiguous subchannels.

In accordance with various implementations of this disclosure, the signaling may be included in various portions of a physical layer preamble of a wireless packet (for example, a PPDU). In some implementations, the physical layer preamble may be used to indicate puncturing of subchannels or content channels that may carry further signaling. The physical layer preamble signaling may be parallelized for different subchannels of a wireless channel that consists of multiple subchannels. Some implementations of the physical layer preambles may be used to multiplex different types of wireless local area network communications into different subsets of the subchannels that make up the channel.

In some implementations, a universal signal field (U-SIG) may follow legacy signal fields in a preamble portion of a PPDU. The U-SIG may include version independent fields and version dependent fields (that is, fields which depend on the version of the wireless communication protocol used to format or otherwise generate the PPDU). The U-SIG may precede one or more other signal fields that are specific to the wireless communication protocol version identified in the U-SIG. This disclosure includes several example version independent fields and version dependent fields which may be included in the U-SIG.

In some implementations, the information carried in the U-SIG may depend on a format of the PPDU being transmitted. Some or all of the format and contents of the U-SIG may differ for the different formats of PPDUs. The PPDU may be a trigger-based (TB) PPDU, a single-user (SU) PPDU, an extended range (ER) SU PPDU, or a multi-user (MU) PPDU. In some implementations, a unified format for the PPDU may support either SU or MU communications. For example, in some implementations, one format of the U-SIG may be used for PPDUs serving a single user or multiple users. This disclosure includes several example formats for U-SIG that may be used for various PPDU formats.

In some implementations, the U-SIG may be used to indicate a bandwidth, punctured channels, content channel structures, or any combination thereof. For example, the U-SIG may include indicators to indicate a bandwidth structure for the PPDU. The U-SIG may include punctured channel information associated with punctured portions of the bandwidth. In some implementations, the U-SIG may support the use of different content channel structures that include further signaling following the U-SIG.

Following the U-SIG, the PPDU may include one or more Extremely High Throughput (EHT) signal fields (EHT-SIG). In some preamble designs, the EHT-SIG may be different on different subchannels. The EHT-SIG may include overflow signaling information from the U-SIG as well as additional signaling regarding the data portion of the PPDU. For example, the EHT-SIG may include RU allocation information, spatial stream configuration information, and per-user signaling information, among other examples. This disclosure includes several preamble design options for the EHT-SIG, including optimizations for RU allocation information. The RU allocation information signaled in the EHT-SIG may be optimized for full bandwidth, partial bandwidth, or aggregated RU allocations. In some implementations, the RU allocation information may support divisions based on subchannels within the wireless channel as well as the use of different content channels for the PPDU.

The preamble design options in this disclosure may support flexible RU allocations for OFDMA communication during the data portion of the PPDU. Alternatively, or additionally, the preamble design options may enable MU MIMO based on new RU allocation tables. In some implementations, an RU allocation table may be optimized to provide for RU allocations that support OFDMA and MU MIMO while reducing the quantity of signaling bits to indicate the RU allocations for different users. For example, in some implementations, a signal field of 9 bits may include signaling for RU allocation and MU-MIMO options. In some implementations, the 9 bit signal field for RU allocation and MU-MIMO options may be included in one or more self-contained user fields of the EHT-SIG. Furthermore, the preamble design options in this disclosure may support up to (and potentially more than) 16 spatial streams. Some preamble design options may enable signaling for 16 spatial streams within a fixed preamble length.

This disclosure includes some design options for encoding and populating fields in an EHT-SIG to support different types of devices. For example, in some implementations, the content of the EHT-SIG may be modified to support OFDMA RU allocations in different 80 MHz portions of a wireless channel. Some options for determining the content and encoding scheme for the EHT-SIG may provide flexibility and increased spectral efficiency of the wireless channel.

Particular implementations of the subject matter described in this disclosure can be implemented to realize one or more of the following potential advantages. In some implementations, the described techniques can provide a universal signal field for new wireless communication protocols. The universal signal field may have a format and structure that supports future wireless communication protocols, particularly those in the IEEE 802.11 family. By defining a universal signal field, this disclosure enables the wireless communication protocols to add new features and greater bandwidth support compared to legacy wireless communication protocols.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS.

As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple channels (which may be used as subchannels of a larger bandwidth channel as described below). For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, MHz, 160 or 320 MHz by bonding together multiple 20 MHz channels (which may be referred to as subchannels).

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a first portion (or "legacy preamble") and a second portion (or "non-legacy preamble"). The first portion may be used for packet detection, automatic gain control and channel estimation, among other uses. The first portion also may generally be used to maintain compatibility with legacy devices as well as non-legacy devices. The format of, coding of, and information provided in the second portion of the preamble is based on the particular IEEE 802.11 protocol to be used to transmit the payload.

Figure 2:
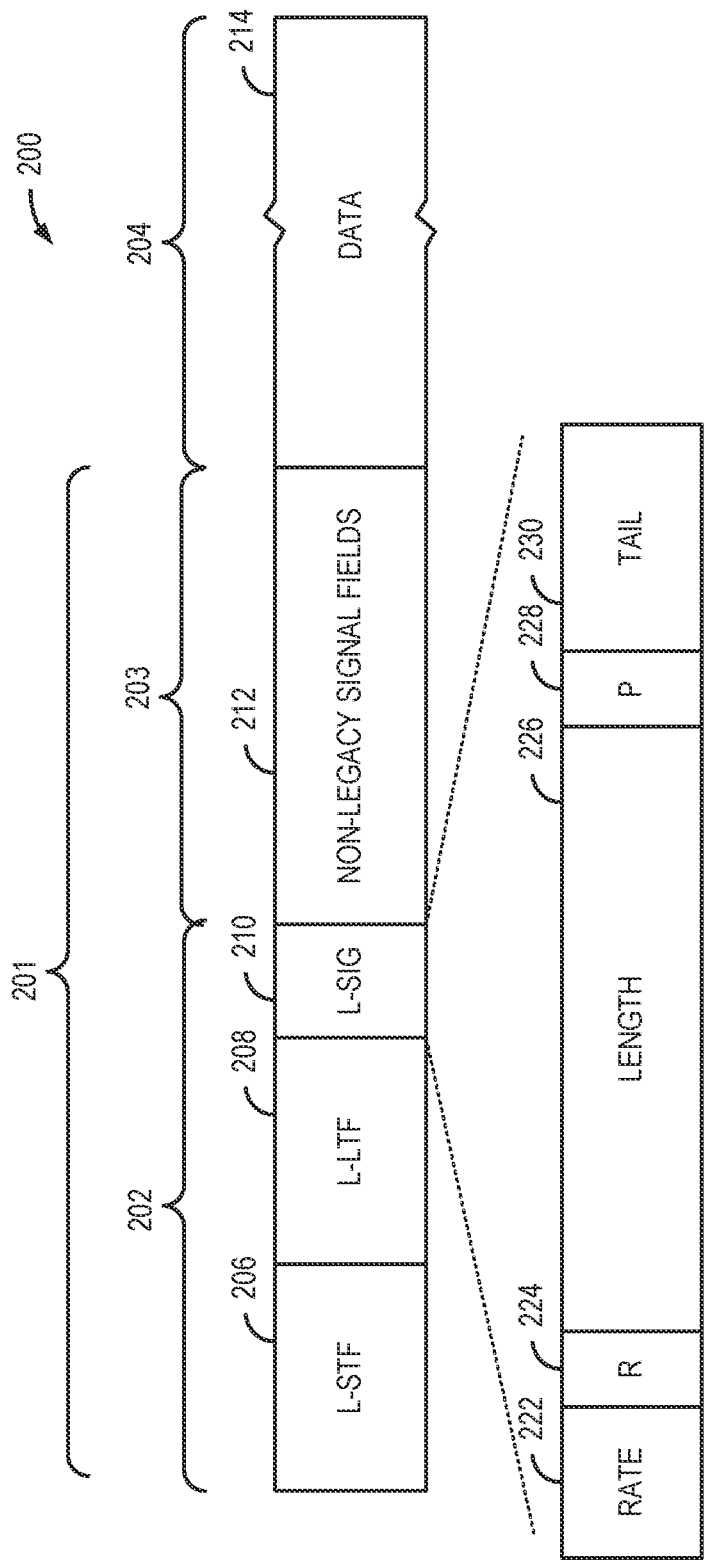
FIG. 2 shows an example protocol data unit (PDU) usable for communications between an access point (AP) and a number of stations (STAs).

FIG. 2 shows an example protocol data unit (PDU) 200 usable for wireless communication between an AP and a number of STAs. For example, the PDU 200 can be configured as a PPDU. As shown, the PDU 200 includes a preamble 201 and a payload 204. For example, the preamble 201 may include a first portion 202 that itself includes a legacy short training field (L-STF) 206, which may consist of two BPSK symbols, a legacy long training field (L-LTF) 208, which may consist of two BPSK symbols, and a legacy signal field (L-SIG) 210, which may consist of one BPSK symbol. The first portion 202 of the preamble 201 may be configured according to the IEEE 802.11a wireless communication protocol standard.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. FIG. 2 shows an example L-SIG 210 in the PDU 200. L-SIG 210 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

The preamble 201 may also include a second portion 203 including one or more non-legacy signal fields 212, for example, conforming to an IEEE wireless communication protocol such as the IEEE 802.11ac, 802.11ax, 802.11be or later wireless communication protocol standards. In some implementations, the second portion 203 of the preamble 201 may include a repeat of the L-SIG (RL-SIG, not shown) before the non-legacy signal fields 212. To accommodate later versions of the IEEE wireless communication protocols, some of the L-SIG 210 fields (such as the data rate field 222 and length field 226) have been redefined or overloaded with new definitions. For example, the data rate field 222 and the length field 226 may be populated with values to identify a type of non-legacy signal fields 212 that will follow. However, such a solution may not be scalable, and the redefined or overloaded L-SIG fields may become saturated as more wireless communication protocols are developed. As described further in this disclosure, the non-legacy signal fields 212 may include a universal signal field (U-SIG, not shown) that is constructed to indicate a type of PDU, a version of the wireless communication protocol associated with the PPDU, a bandwidth, puncturing, or any combination thereof.

Following the non-legacy signal fields 212, the PDU 200 may include a payload 204. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 3A:
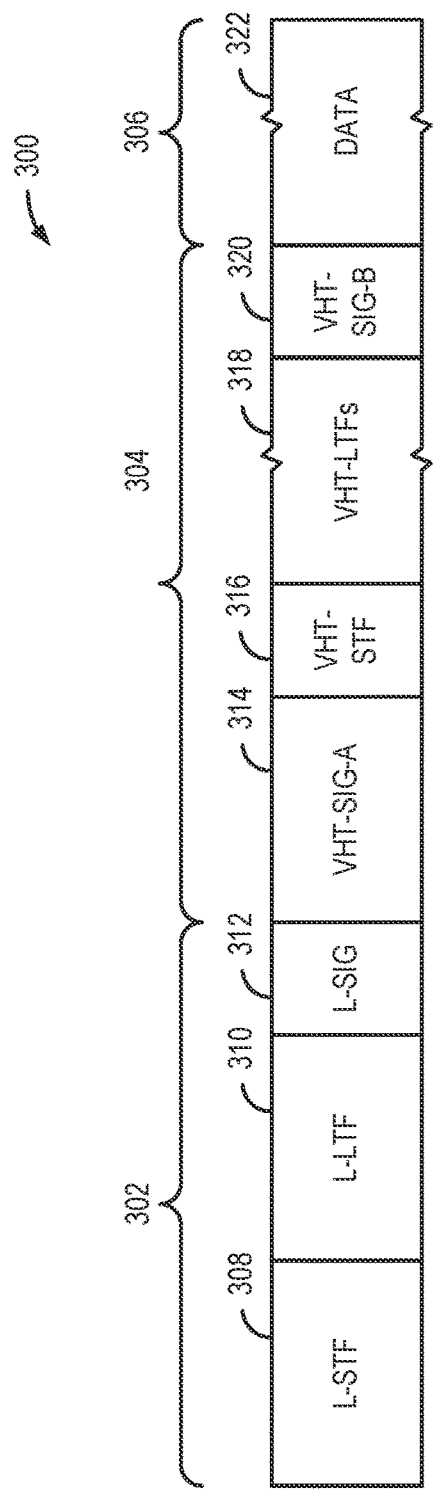
FIG. 3A shows an example PDU usable for communications between an AP and a number of STAs.

FIG. 3A shows another example PDU 300 usable for wireless communication between an AP and a number of STAs. The PDU 300 includes a PHY preamble including a first portion 302 and a second portion 304. The PDU 300 may further include a PHY payload 306 after the preamble, for example, in the form of a PSDU including a DATA field 322. The first portion 302 of the preamble includes L-STF 308, L-LTF 310, and L-SIG 312. The second portion 304 of the preamble and the DATA field 322 may be formatted as a Very High Throughput (VHT) preamble and frame, respectively, in accordance with the IEEE 802.11ac amendment to the IEEE 802.11 wireless communication protocol standard. The second portion 304 includes a first VHT signal field (VHT-SIG-A) 314, a VHT short training field (VHT-STF) 316, a number of VHT long training fields (VHT-LTFs) 318, and a second VHT signal field (VHT-SIG-B) 320 encoded separately from VHT-SIG-A 314. Like L-STF 308, L-LTF 310, and L-SIG 312, the information in VHT-SIG-A 314 may be duplicated and transmitted in each of the component 20 MHz subchannels in instances involving the use of a bonded channel.

VHT-STF 316 may be used to improve automatic gain control estimation in a MIMO transmission. VHT-LTFs 318 may be used for MIMO channel estimation and pilot subcarrier tracking. The preamble may include one VHT-LTF 318 for each spatial stream the preamble is transmitted on. VHT-SIG-A 314 may indicate to VHT-compatible APs 102 and STAs 104 that the PPDU is a VHT PPDU. VHT-SIG-A 314 includes signaling information and other information usable by STAs 104 to decode VHT-SIG-B 320. VHT-SIG-A 314 may indicate a bandwidth (BW) of the packet, the presence of space-time block coding (STBC), the number $N_{STS}$ (NSTS) of space-time streams per user, a Group ID indicating the group and user position assigned to a STA, a partial association identifier that may combine the AID and the BSSID, a short guard interval (GI) indication, a single-user/multi-user (SU/MU) coding indicating whether convolutional or LDPC coding is used, a modulation and coding scheme (MCS), an indication of whether a beamforming matrix has been applied to the transmission, a cyclic redundancy check (CRC) and a tail. VHT-SIG-B 320 may be used for MU transmissions and may contain the actual data rate and MPDU or A-MPDU length values for each of the multiple STAs 104, as well as signaling information usable by the STAs 104 to decode data received in the DATA field 322, including, for example, an MCS and beamforming information.

Figure 3B:
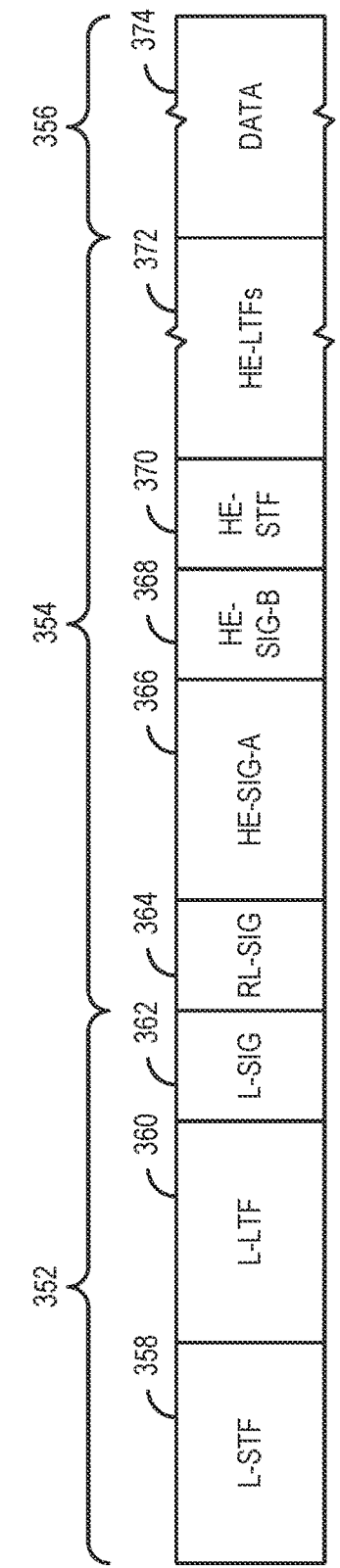
FIG. 3B shows another example PDU usable for communications between an AP and a number of STAs.

FIG. 3B shows another example PDU 350 usable for wireless communication between an AP and a number of STAs. The PDU 350 may be used for MU-OFDMA or MU-MIMO transmissions. The PDU 350 includes a PHY preamble including a first portion 352 and a second portion 354. The PDU 350 may further include a PHY payload 356 after the preamble, for example, in the form of a PSDU including a DATA field 374. The first portion 352 includes L-STF 358, L-LTF 360, and L-SIG 362. The second portion 354 of the preamble and the DATA field 374 may be formatted as a High Efficiency (HE) WLAN preamble and frame, respectively, in accordance with the IEEE 802.11ax amendment to the IEEE 802.11 wireless communication protocol standard. The second portion 354 includes a repeated legacy signal field (RL-SIG) 364, a first HE signal field (HE-SIG-A) 366, a second HE signal field (HE-SIG-B) 368 encoded separately from HE-SIG-A 366, an HE short training field (HE-STF) 370 and a number of HE long training fields (HE-LTFs) 372. Like L-STF 358, L-LTF 360, and L-SIG 362, the information in RL-SIG 364 and HE-SIG-A 366 may be duplicated and transmitted in each of the component 20 MHz subchannels in instances involving the use of a bonded channel. In contrast, HE-SIG-B 368 may be unique to each 20 MHz subchannel and may target specific STAs 104.

RL-SIG 364 may indicate to HE-compatible STAs 104 that the PPDU is an HE PPDU. An AP 102 may use HE-SIG-A 366 to identify and inform multiple STAs 104 that the AP has scheduled UL or DL resources for them. HE-SIG-A 366 may be decoded by each HE-compatible STA 104 served by the AP 102. HE-SIG-A 366 includes information usable by each identified STA 104 to decode an associated HE-SIG-B 368. For example, HE-SIG-A 366 may indicate the frame format, including locations and lengths of HE-SIG-Bs 368, available channel bandwidths, and modulation and coding schemes (MCSs), among other possibilities. HE-SIG-A 366 also may include HE WLAN signaling information usable by STAs 104 other than the number of identified STAs 104.

HE-SIG-B 368 may carry STA-specific scheduling information such as, for example, per-user MCS values and per-user RU allocation information. In the context of DL MU-OFDMA, such information enables the respective STAs 104 to identify and decode corresponding RUs in the associated data field. Each HE-SIG-B 368 includes a common field and at least one STA-specific field (also referred to as a "user field"). The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other possibilities. The common field may be encoded with common bits, CRC bits, and tail bits. The user fields are assigned to particular STAs 104 and may be used to schedule specific RUs and to indicate the scheduling to other WLAN devices. Each user field may include multiple user block fields (which may be followed by padding). Each user block field may include two user fields that contain information for two respective STAs to decode their respective RU payloads in DATA field 374.

Figure 4:
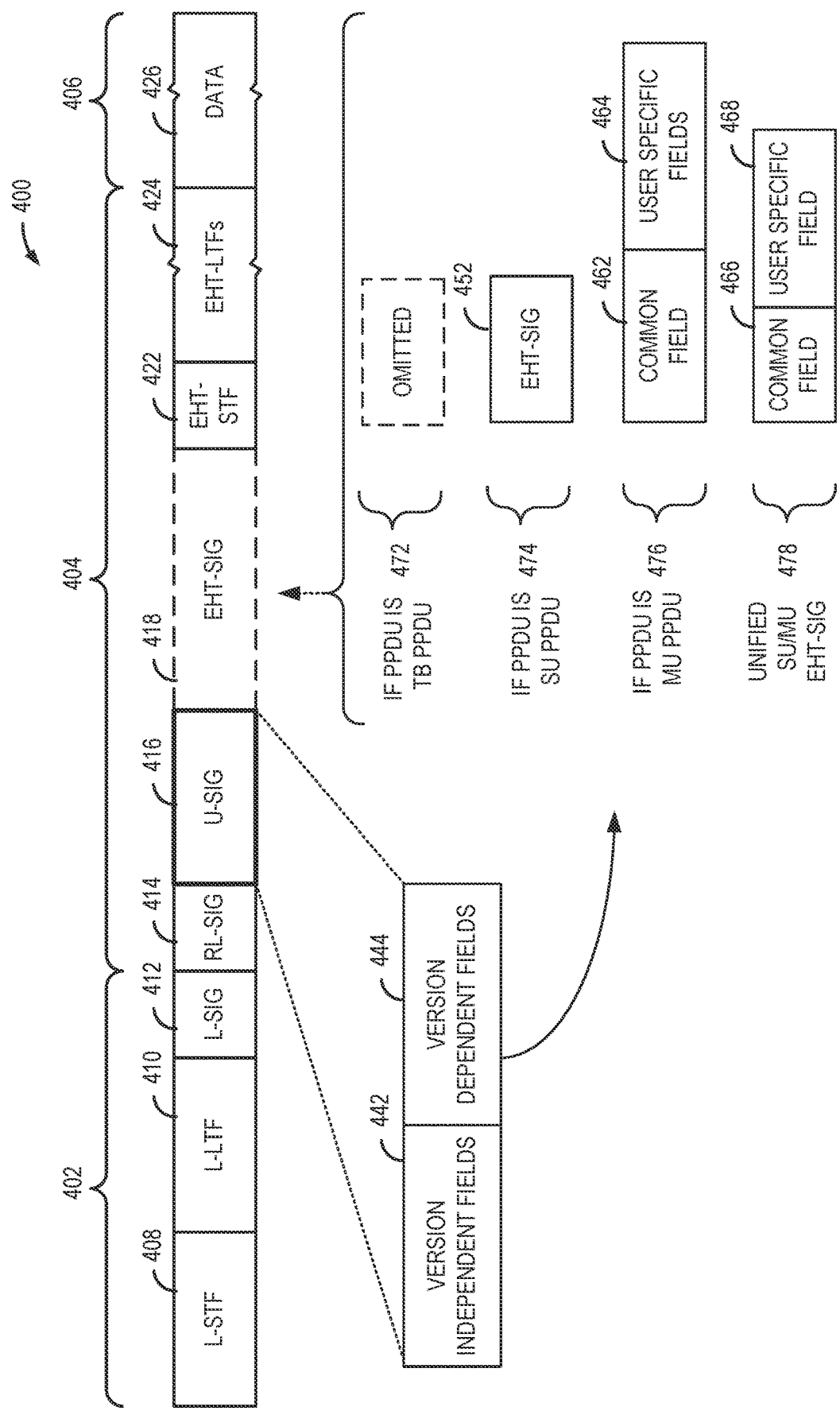
FIG. 4 shows an example PDU that includes a universal signal field (U-SIG) according to some implementations.

FIG. 4 shows an example PDU that includes a universal signal field (U-SIG) according to some implementations. For example, the PDU 400 can be configured as a PPDU. Recall that PDU 300 (FIG. 3A) was formatted in accordance with the IEEE 802.11ac amendment to the IEEE 802.11 wireless communication protocol standard and that PDU 350 (FIG. 3B) was formatted in accordance with the IEEE 802.11ax amendment to the IEEE 802.11 wireless communication protocol standard. In contrast to PDU 300 and PDU 350, the PDU 400 in FIG. 4 may support the IEEE 802.11be amendment as well as future amendments to the IEEE 802.11 wireless communication standard, each of which may be referred to herein as a version of the IEEE 802.11 wireless communication standard. In particular, the PDU 400 may include a universal signal field (U-SIG) 416 that, among other things, may indicate a format of the PPDU, a version of the wireless communication protocol (for example, the Extreme High Throughput (EHT) protocol defined in 802.11be), a bandwidth, puncturing, or any combination thereof. Thus, the U-SIG 416 may precede version-specific signaling that is formatted as an EHT portion of the preamble in accordance with the IEEE 802.11be amendment to the IEEE 802.11 wireless communication protocol standard, or may be formatted as a preamble and frame, respectively, conforming to any later (post-EHT) version of a new wireless communication protocol conforming to a future IEEE 802.11 wireless communication protocol standard or other standard. For brevity, the version-specific fields may be described in terms of EHT signaling.

The PDU 400 includes a PHY preamble including a first portion 402 and a second portion 404. The PDU 400 may further include a PHY payload 406 after the preamble, for example, in the form of a PSDU including DATA field 426. The first portion 402 includes L-STF 408, L-LTF 410, and L-SIG 412. The second portion 404 of the preamble includes a repeated legacy signal field (RL-SIG) 414. Following the RL-SIG 414, the second portion 404 of the preamble includes the U-SIG 416. Depending on the format of the PPDU, the PDU 400 may include a version-specific signal field, such as the EHT-SIG 418. The second portion 404 further includes an additional short training field (referred to herein as "EHT-STF" although it may be structured as, and carry version-dependent information for, other wireless communication protocol versions beyond EHT) 422 and a number of additional long training fields (referred to herein as "EHT-LTFs" 424 although they may be structured as, and carry version-dependent information for, other wireless communication protocol versions beyond EHT).

The U-SIG 416 may include version independent fields 442 and version dependent fields 444. Examples of the version independent fields 442 may include a version identifier, an indication of whether the PDU 400 is an uplink (UL) or a downlink (DL) PPDU, a BSS color, and a transmission opportunity (TxOP) duration, among other examples. The version identifier in the version independent fields 442 may indicate a version (and associated format) for the version dependent fields 444. In some implementations, the version dependent fields 444 may indicate a PPDU format (such as in a format information field). The PPDU format may determine which other indicators are included in the version dependent fields 444 as well as the format or contents of the rest of U-SIG 416 and the EHT-SIG 418. For example, depending on the value of the PPDU format field in the version dependent fields 444, the PDU 400 may include different formats 472, 474, 476, or 478 for the EHT-SIG 418. In some implementations, if the PPDU format field indicates that the PDU 400 is a trigger-based (TB)

PPDU, then the EHT-SIG may be omitted (as shown in format 472). If the PPDU format field indicates that the PDU 400 is a single user (SU) PPDU, then the EHT-SIG 452 may be formatted as shown in format 474. For example, the EHT-SIG 452 for the SU PPDU may be a single symbol length and may be modulated using a fixed MCS (such as rate 1/2, BPSK). If the PPDU format field indicates that the PDU 400 is a multi-user (MU) PPDU, there may be other format information fields, such as EHT-SIG MCS, EHT-DCM, EHT-SIG compression, number of EHT-SIG symbols or number of non-OFDMA users, among other examples, to interpret the EHT-SIG structure and content. Then the EHT-SIG may be formatted as shown in format 476. For example, the EHT-SIG may include a common field 462 and one or more user fields 464. The format 476 for MU PPDU may be multiple symbol lengths and may have a variable MCS as indicated in the U-SIG 416.

In some other implementations, a PPDU (which may be referred to as a unified SU/MU PPDU) may be formatted to support either single user (SU) or multiple users (MU) payload. The unified SU/MU PPDU may include a U-SIG 416 that has a consistent field structure regardless of whether the unified SU/MU PPDU is carrying SU or MU traffic. Furthermore, the U-SIG 416 may be followed by an EHT-SIG 418 having a unified SU/MU EHT-SIG format 478. In the unified approach, there may be not be a separate format 474 and 476 for the SU and MU PPDU formats. Rather the unified SU/MU PPDU may have a U-SIG 416 and EHT-SIG format 478 that supports MU specific signal field or SU specific signal fields. For example, when used for SU traffic, the EHT-SIG format 478 may have a compressed version of the EHT-SIG defined for the MU format 476. For example, the unified SU/MU EHT-SIG format 478 may include a compressed mode for the common field 466 and may include only one user specific field 468. For a PPDU that occupies the full bandwidth and is directed to a single user, the common field 466 may omit some unneeded information, such as resource unit (RU) allocations, among other examples. The U-SIG 416 may be a two-symbol length followed by an EHT-SIG 418 that has an adjustable MCS indicated by the U-SIG 416. The EHT-SIG for the unified SU/MU EHT-SIG format 478 may be multiple symbol lengths and may use a determinable MCS (such as rate-½, BPSK).

In some implementations, U-SIG 416 may include PPDU bandwidth (BW) and punctured channel information. The PPDU BW and punctured channel information may be referred to collectively as frequency occupation indications. The frequency occupation indications may permit WLAN devices on the wireless channel to determine the utilization of the various parts of the wireless channel. For example, the frequency occupation information may be used to indicate puncturing of some subchannels.

Figure 5A:
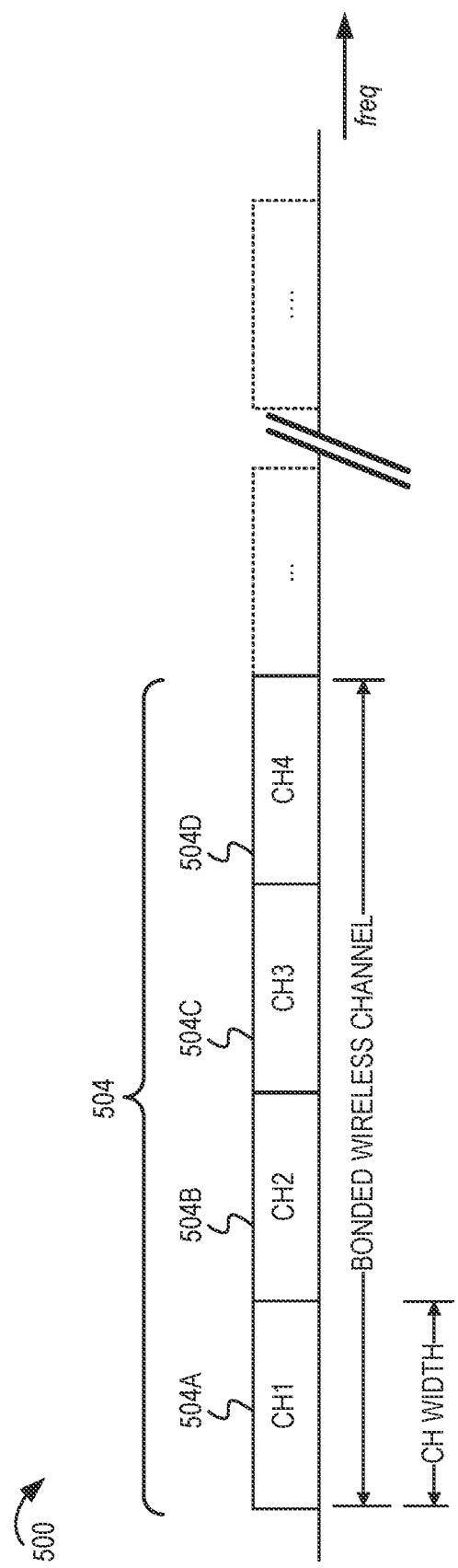
FIG. 5A shows an example bonded wireless channel that includes multiple subchannels.

FIG. 5A shows an example bonded wireless channel 500 that includes multiple subchannels. In FIG. 5, a channel map for a frequency band (such as the 2.5 GHz, 5 GHz, or 6 GHz frequency bands) may define multiple channels 504. In the example of FIG. 5A, each channel 504 has a uniform channel width W (such as 20 MHz, 40 MHz, or 80 MHz, among other examples). Some WLAN devices are capable of transmitting at higher bandwidths using a wireless channel that is made up of multiple channels (which may be referred to as subchannels when used as part of a larger wireless channel). In the example of FIG. 5A, the wireless channel 500 may be used to transmit an 80 MHz transmission by bonding together a group of four subchannels 504 (a first subchannel 504A, a second subchannel 504B, a third subchannel 504C, and a fourth subchannel 504D). Although depicted as contiguous subchannels in the channel map, in some implementations, the wireless channel 500 may contain subchannels 504 which are not adjacent in the channel map. Additionally, larger groups of channels 504 may be used in some implementations. For example, IEEE 802.11ax provides for the use of 8 subchannels, and later versions of IEEE 802.11 may provide for the use of 16 (or more) subchannels for higher bandwidth transmissions.

Figure 5B:
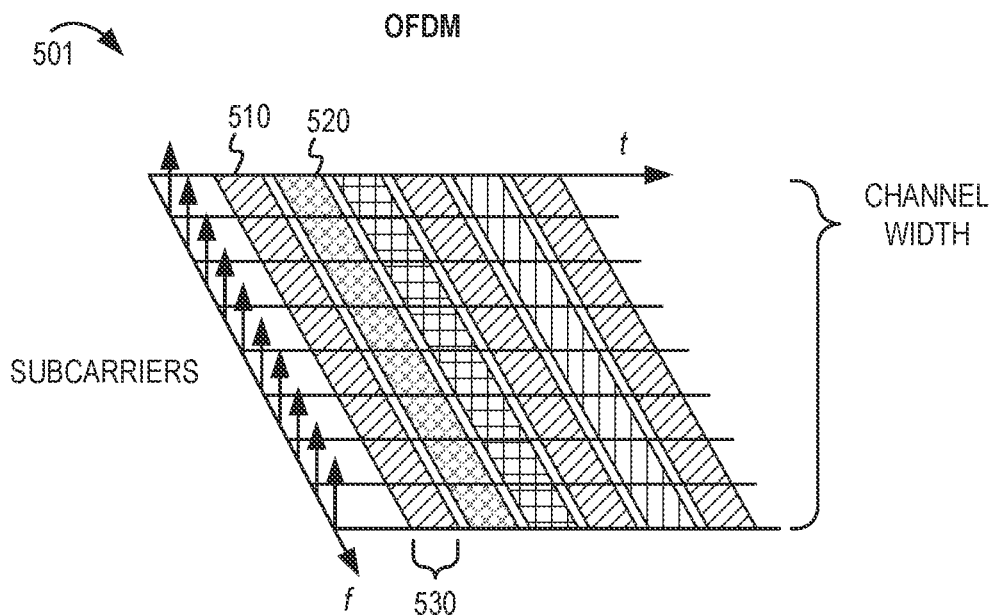
FIG. 5B shows a conceptual diagram of orthogonal frequency-division multiplexing (OFDM).

FIG. 5B shows a conceptual diagram of traditional OFDM 501. The OFDM channel width may include multiple subcarriers. A WLAN packet (also referred to as a PPDU) includes data that is encoded using the subcarriers of the channel width. For example, a first STA may transmit a first PPDU 510 during a first time period 530. During a second time period, a second STA may transmit a second PPDU 520. The time durations of the PPDUs 510 and 520 may be the same or different. Typically, the first STA and the second STA (and any other STAs in the BSS) will contend for access to the channel. Once the STA wins the contention, the STA can use the channel for transmission of a PPDU. As shown in FIG. 5B, the different shadings of the PPDUs indicate that different STAs may utilize the wireless channels sequentially, one at a time. However, this communication structure may be inefficient if a WLAN device does not have enough data to justify using the full channel bandwidth. The IEEE 802.11ax standard introduced the use of OFDMA in a WLAN.

Figure 5C:
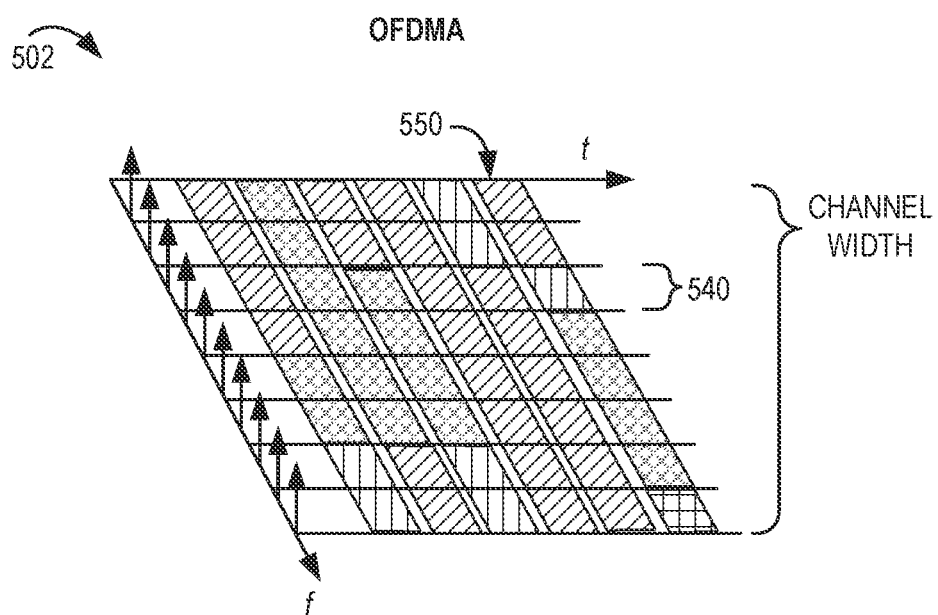
FIG. 5C shows a conceptual diagram of orthogonal frequency-division multiple access (OFDMA) illustrating resource assignments of a wireless channel.

FIG. 5C shows a conceptual diagram of OFDMA 502 illustrating resource assignments of a wireless channel. OFDMA breaks down the full channel width into a plurality of resource units (RUs). Each RU may include a different quantity of subcarriers. Using OFDMA, a first WLAN device (such as an AP) may allocate different RUs for different STAs. As shown in FIG. 5C, the different shadings indicate different RUs of PPDU that may be transmitted to (or allocated for the use by) different STAs. For example, a PPDU 550 may include different RUs allocated for a first STA, a second STA, a third STA, and a fourth STA. One RU 540 is allocated for a STA to transmit uplink data in the PPDU 550, while other RUs are allocated for different STAs. The allocation of RUs may be used for downlink transmissions or to schedule channel access.

Figure 6:
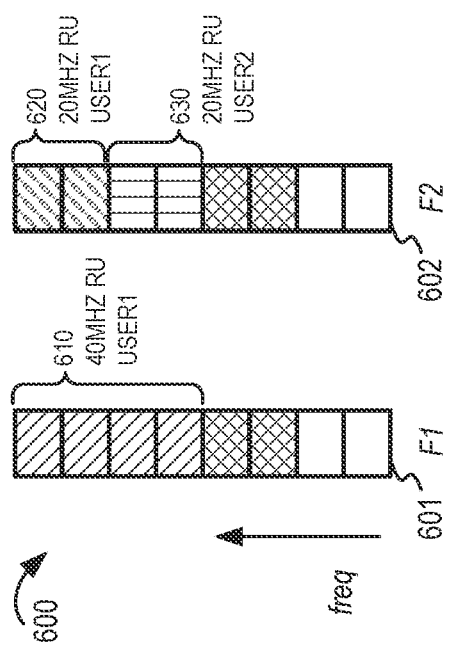
FIG. 6 depicts an example series of wireless frames using OFDMA.

FIG. 6 depicts an example series of wireless frames 600 using OFDMA. A first frame 601 (F1) includes a first RU 610 allocated to a first STA ("user1"). For example, the first RU 610 may be used for downstream traffic from an AP to a first STA (user1). In FIG. 5, the first RU 610 is a 40 MHz RU (684 tones). If there is more data to send to user1, the AP may allocate a second RU 620 in the next wireless frame (second frame 602, F2). In the second frame 602, a second RU 620 is allocated to the user1. The second RU 620 is a 20 MHz RU (242 tones) of the second frame 602 associated with the fourth subchannel. The second frame 602 also allocates a third RU 630 to a second STA ("user2").

The example shown and described with reference to FIG. 6 is didactic in nature and merely illustrates one of many examples that may be supported by aspects of this disclosure. For example, the RU allocation technique in this disclosure could be used with a 160 MHz wide channel and RU allocations with two or more users. In another example, a 320 MHz wide channel could support 240 MHz allocated to user1 (using a combination of smaller RU sizes) and 80 MHz allocated to user2. In some implementations, RUs may be allocated or combined in non-contiguous portions of the PPDU.

Figure 7:
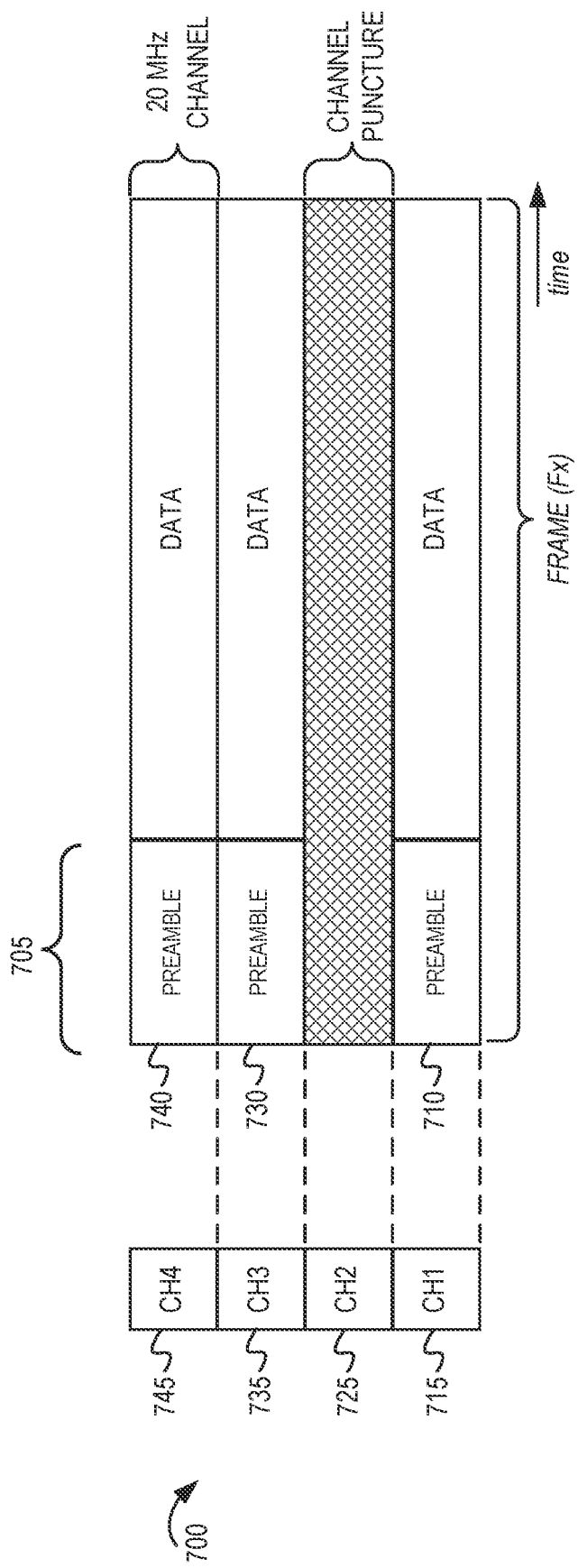
FIG. 7 depicts an example punctured transmission.

FIG. 7 depicts an example punctured transmission 700. In particular, FIG. 7 shows a conceptual time-based illustration of the transmissions that may be present on a first subchannel 715, a second subchannel 725, a third subchannel 735, and a fourth subchannel 745 of the wireless channel. For non-triggered transmissions, which are not prompted (or triggered) by a previous transmission, a WLAN device would perform a clear channel assessment (CCA, not shown) before sending the non-triggered transmission. The CCA is a type of collision avoidance technique. Other types may be referred to as carrier sense, carrier detect, listen-before-talk, among other examples. CCA is performed by a WLAN device to determine if the wireless communication medium (such as the group of subchannels) is available or busy (by another transmission). If the wireless communication medium is in use, the WLAN device may postpone transmission until the CCA is performed again and the wireless communication medium is not in use by another device.

In FIG. 7, there is an incumbent system transmission that occupies part of the second subchannel 725. Therefore, the wireless channel may be punctured to exclude the second subchannel 725 from the transmission. Thus, transmission 700 is sent only on the first subchannel 715, the third subchannel 735 and the fourth subchannel 745. The preamble 705 may include signaling 710, 730, and 740 on the non-punctured subchannels 715, 735, and 745, respectively. However, signaling may be omitted from the second subchannel 725.

Figure 8:
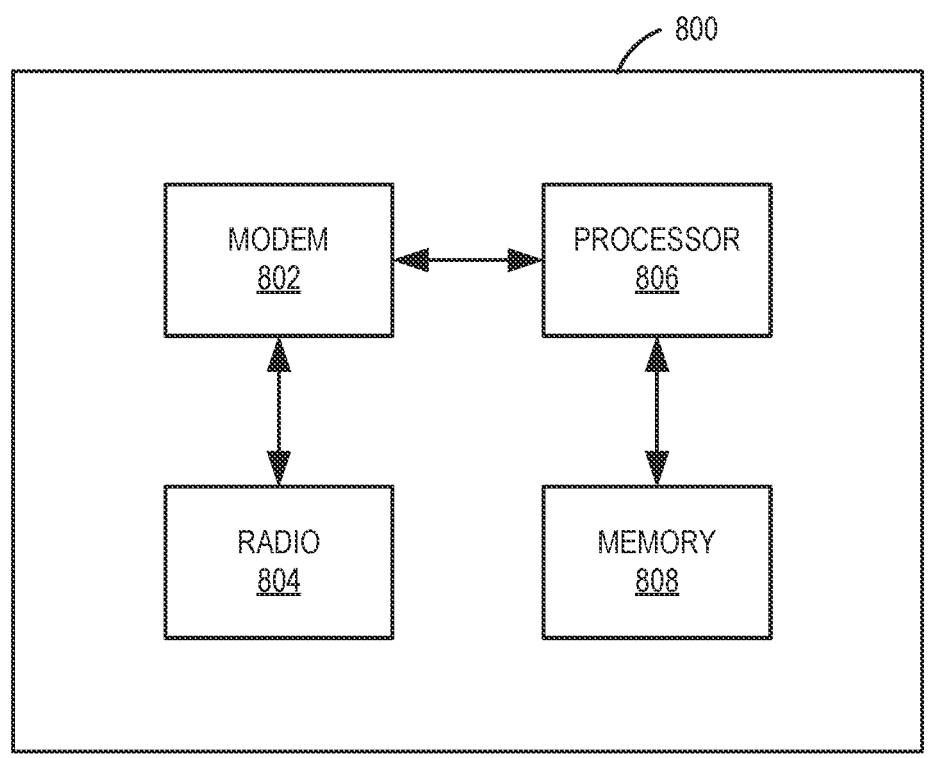
FIG. 8 shows a block diagram of an example wireless communication device.

FIG. 8 shows a block diagram of an example wireless communication device 800. In some implementations, the wireless communication device 800 can be an example of a device for use in a STA such as one of the STAs 104 described above with reference to FIG. 1. In some implementations, the wireless communication device 800 can be an example of a device for use in an AP such as the AP 102 described above with reference to FIG. 1. The wireless communication device 800 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 800 can be, or can include, a chip, system on chip (SoC), chipset, package or device that includes one or more modems 802, for example, a Wi-Fi (IEEE 802.11 compliant) modem. In some implementations, the one or more modems 802 (collectively "the modem 802") additionally include a WWAN modem (for example, a 3GPP 4G LTE or 5G compliant modem). In some implementations, the wireless communication device 800 also includes one or more radios 804 (collectively "the radio 804"). In some implementations, the wireless communication device 800 further includes one or more processors, processing blocks or processing elements 806 (collectively "the processor 806") and one or more memory blocks or elements 808 (collectively "the memory 808").

The modem 802 can include an intelligent hardware block or device such as, for example, an application-specific integrated circuit (ASIC) among other possibilities. The modem 802 is generally configured to implement a PHY layer. For example, the modem 802 is configured to modulate packets and to output the modulated packets to the radio 804 for transmission over the wireless medium. The modem 802 is similarly configured to obtain modulated packets received by the radio 804 and to demodulate the packets to provide demodulated packets. In addition to a modulator and a demodulator, the modem 802 may further include digital signal processing (DSP) circuitry, automatic gain control (AGC), a coder, a decoder, a multiplexer and a demultiplexer. For example, while in a transmission mode, data obtained from the processor 806 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 804. In implementations involving beamforming, the modulated symbols in the respective spatial streams are precoded via a steering matrix prior to their provision to the IFFT block.

While in a reception mode, digital signals received from the radio 804 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for UQ imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 806) for processing, evaluation, or interpretation.

The radio 804 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 800 can include, or be coupled with, multiple transmit antennas (each with a corresponding transmit chain) and multiple receive antennas (each with a corresponding receive chain). The symbols output from the modem 802 are provided to the radio 804, which then transmits the symbols via the coupled antennas.

Similarly, symbols received via the antennas are obtained by the radio 804, which then provides the symbols to the modem 802.

The processor 806 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 806 processes information received through the radio 804 and the modem 802, and processes information to be output through the modem 802 and the radio 804 for transmission through the wireless medium. For example, the processor 806 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 806 may generally control the modem 802 to cause the modem to perform various operations described above.

The memory 808 can include tangible storage media such as random-access memory (RAM) or read-only memory (ROM), or combinations thereof. The memory 808 also can store non-transitory processor- or computer-executable software (SW) code containing instructions that, when executed by the processor 806, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 9B:
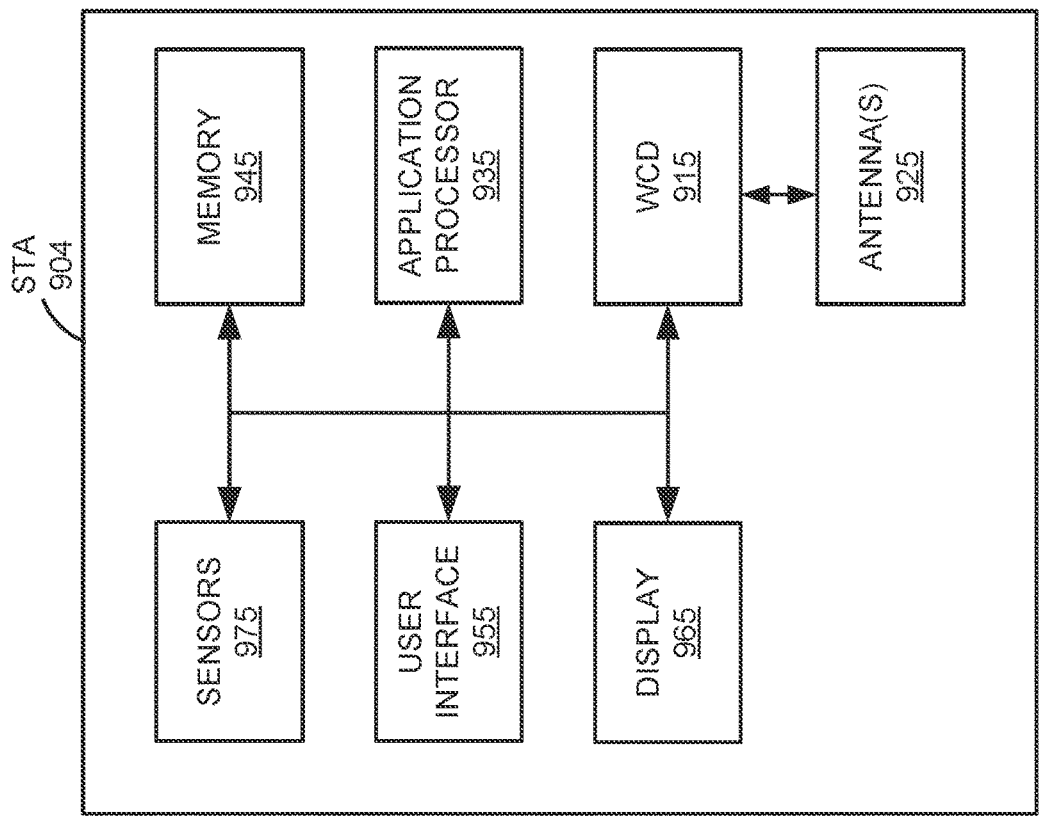
FIG. 9B shows a block diagram of an example STA.
Figure 9A:
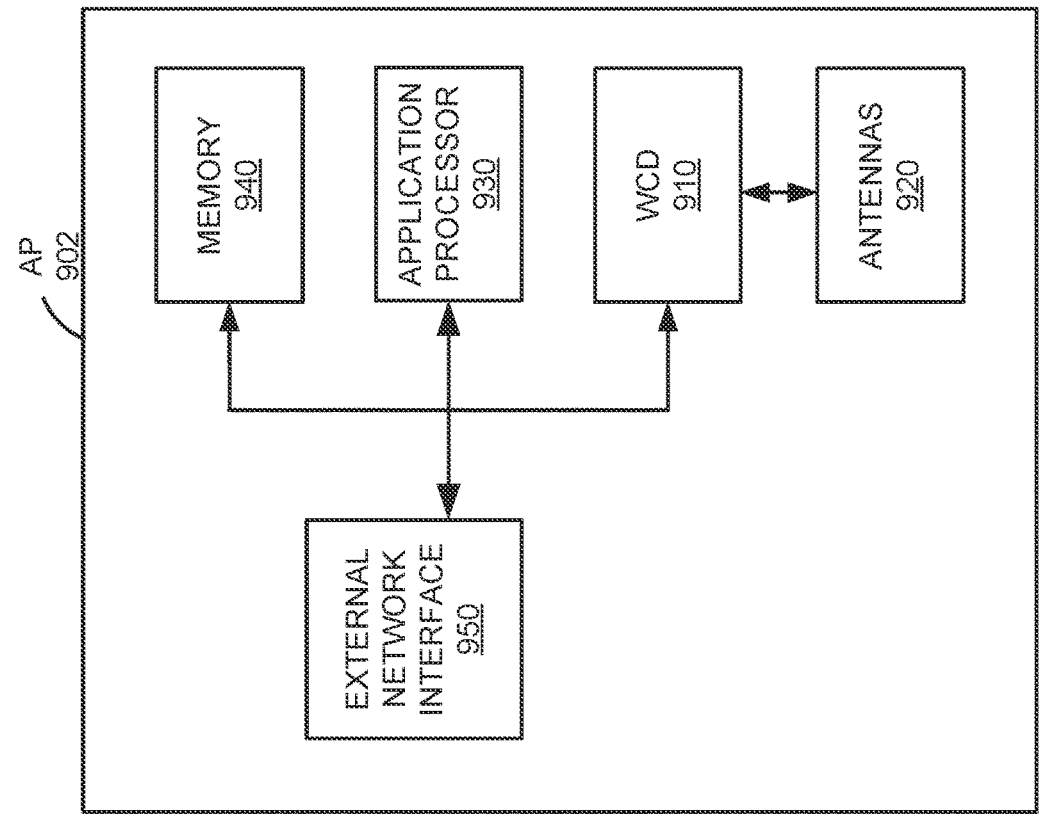
FIG. 9A shows a block diagram of an example AP.

FIG. 9A shows a block diagram of an example AP 902. For example, the AP 902 can be an example implementation of the AP 102 described with reference to FIG. 1. The AP 902 includes a wireless communication device (WCD) 910. For example, the wireless communication device 910 may be an example implementation of the wireless communication device 800 described with reference to FIG. 8. The AP 902 also includes multiple antennas 920 coupled with the wireless communication device 910 to transmit and receive wireless communications. In some implementations, the AP 902 additionally includes an application processor 930 coupled with the wireless communication device 910, and a memory 940 coupled with the application processor 930. The AP 902 further includes at least one external network interface 950 that enables the AP 902 to communicate with a core network or backhaul network to gain access to external networks including the Internet. For example, the external network interface 950 may include one or both of a wired (for example, Ethernet) network interface and a wireless network interface (such as a WWAN interface). Ones of the aforementioned components can communicate with other ones of the components directly or indirectly, over at least one bus. The AP 902 further includes a housing that encompasses the wireless communication device 910, the application processor 930, the memory 940, and at least portions of the antennas 920 and external network interface 950.

FIG. 9B shows a block diagram of an example STA 904. For example, the STA 904 can be an example implementation of the STA 104 described with reference to FIG. 1. The STA 904 includes a wireless communication device 915. For example, the wireless communication device 915 may be an example implementation of the wireless communication device 800 described with reference to FIG. 8. The STA 904 also includes one or more antennas 925 coupled with the wireless communication device 915 to transmit and receive wireless communications. The STA 904 additionally includes an application processor 935 coupled with the wireless communication device 915, and a memory 945 coupled with the application processor 935. In some implementations, the STA 904 further includes a user interface (UI) 955 (such as a touchscreen or keypad) and a display 965, which may be integrated with the UI 955 to form a touchscreen display. In some implementations, the STA 904 may further include one or more sensors 975 such as, for example, one or more inertial sensors, accelerometers, temperature sensors, pressure sensors, or altitude sensors. Ones of the aforementioned components can communicate with other ones of the components directly or indirectly, over at least one bus. The STA 904 further includes a housing that encompasses the wireless communication device 915, the application processor 935, the memory 945, and at least portions of the antennas 925, UI 955, and display 965.

As described above, as new wireless communication protocols enable enhanced features, new preamble designs are needed support signaling regarding features and resource allocations. Various implementations relate generally to signaling included in a physical layer preamble that supports new wireless communication protocols. Some implementations more specifically relate to preamble designs that do not significantly add to the preamble length. Additionally, or alternatively, some implementations more specifically relate to preamble designs that accommodate signal fields of different types. Additionally, or alternatively, some implementations more specifically relate to preamble designs that accommodate parallelization of signaling among different content channels, subchannels, or subbands (groups of subchannels) within a wireless channel.

Figure 10:
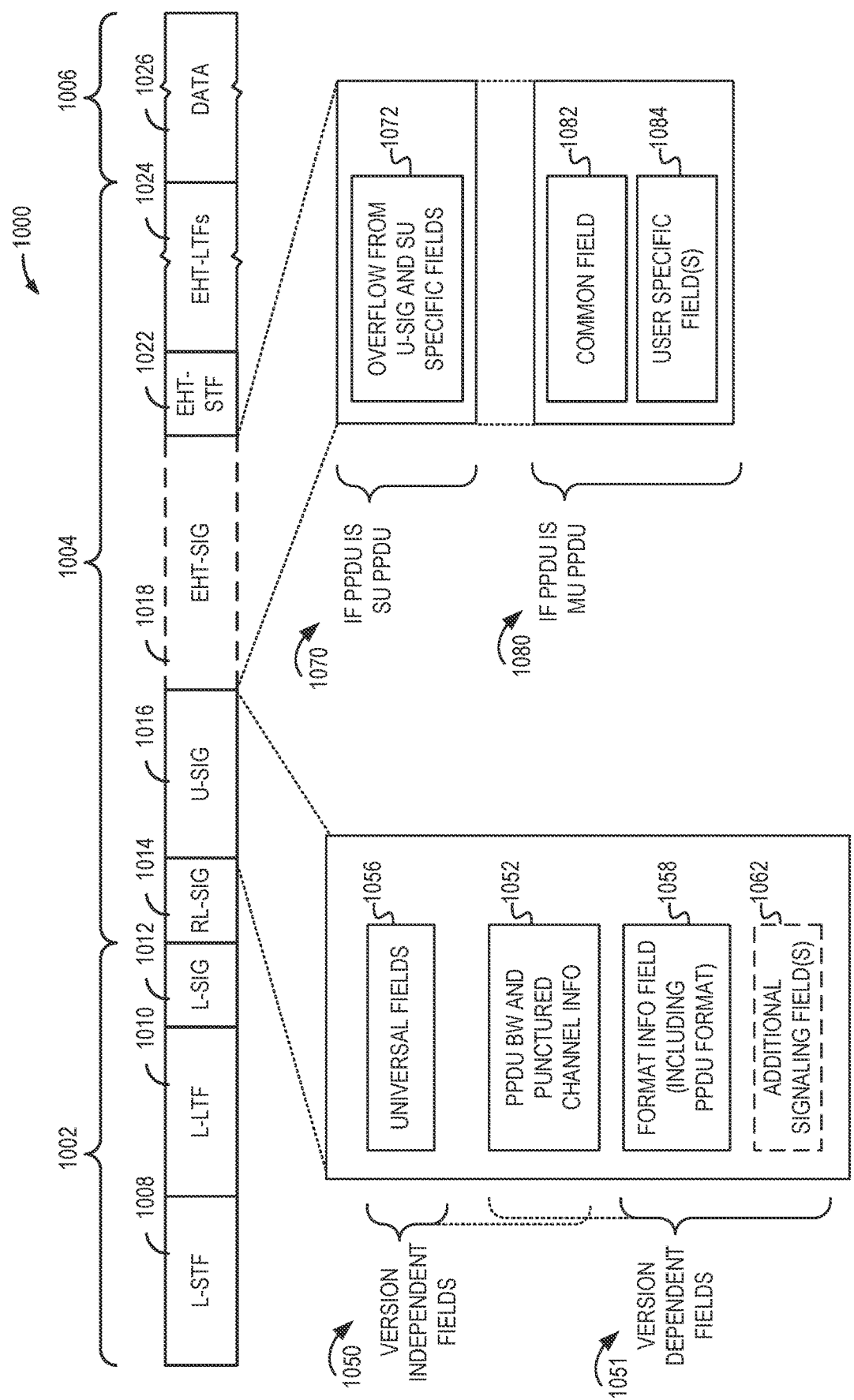
FIG. 10 shows an example physical layer convergence protocol (PLCP) protocol data units (PPDU) usable for communications between an AP and a number of STAs according to some implementations.

FIG. 10 shows an example PPDU 1000 usable for wireless communication between an AP and a number of STAs according to some implementations. The PPDU 1000 may be used for SU, MU-OFDMA or MU-MIMO transmissions. The PPDU 1000 includes a PHY preamble including a first portion 1002 and a second portion 1004. The PPDU 1000 may further include a PHY payload 1006 after the preamble, for example, in the form of a PSDU including DATA field 1026. The first portion 1002 includes L-STF 1008, L-LTF 1010, and L-SIG 1012. The second portion 1004 of the preamble and DATA field 1026 may be formatted as an Extreme High Throughput (EHT) WLAN preamble and frame, respectively, in accordance with the IEEE 802.11be amendment to the IEEE 802.11 wireless communication protocol standard, or may be formatted as a preamble and frame, respectively, conforming to any later (post-HE) version of a new wireless communication protocol conforming to a future IEEE 802.11 wireless communication protocol standard or other standard.

The second portion 1004 of the preamble includes a repeated legacy signal field (RL-SIG) 1014 and multiple wireless communication protocol version-dependent signal fields after RL-SIG 1014. For example, the second portion may include a second signal field (referred to herein as "U-SIG") 1016, and a third signal field (referred to herein as "EHT-SIG" although it may be structured as, and carry version-dependent information for, other wireless communication protocol versions beyond EHT) 1018. The second portion 1004 further includes an additional short training field (referred to herein as "EHT-STF" although it may be structured as, and carry version-dependent information for, other wireless communication protocol versions beyond EHT) 1022 and a number of additional long training fields (referred to herein as "EHT-LTFs" although they may be structured as, and carry version-dependent information for, other wireless communication protocol versions beyond EHT) 1024. Like L-STF 1008, L-LTF 1010, and L-SIG 1012, the information in RL-SIG 1014, the U-SIG 1016 and EHT-SIG 1018 may be duplicated and transmitted in each of the component 20 MHz subchannels (which may include content channels) in instances involving the use of a bonded channel. In some implementations, EHT-SIG 1018 may additionally or alternatively carry information in one or more non-primary 20 MHz channels that is different than the information carried in the primary 20 MHz subchannel In some implementations, the EHT-SIG may have some content that is the same in all 20 MHz subchannels and may have some other content that is different for one or more of the 20 MHz subchannels.

RL-SIG 1014 and U-SIG 1016 may indicate to EHT- or later version-compliant STAs 104 that the PPDU 1000 is an EHT PPDU or a PPDU conforming to another non-legacy wireless communication protocol version. For example, U-SIG 1016 may be used by a receiving device to interpret bits in one or more of EHT-SIG 1018 or DATA field 1026. In some implementations, U-SIG 1016 may include a reserved bit that indicates whether the PPDU 1000 is, for example, compliant with EHT or a later version (for example, after IEEE 802.11ax) of the IEEE 802.11 family of wireless communication protocol standards or other standards. In some implementations, U-SIG 1016 includes a version field that includes at least one bit indicating the particular wireless communication protocol version to which the PPDU 1000 conforms. In some implementations, U-SIG 1016 further includes at least one universal bit that is independent of the wireless communication protocol version.

A device receiving the PPDU 1000 may initially begin or continue its determination of the wireless communication protocol version used to transmit the PPDU 1000 based on the presence of RL-SIG 1014 and the modulation scheme used to modulate the symbols in U-SIG 1016. In some implementations, a receiving device may initially determine that the wireless communication protocol used to transmit the PPDU 1000 is an HE or later version based on the presence of RL-SIG 1014 (that is, a determination that the first symbol of the second portion of the preamble is identical to L-SIG 1012) and a determination that both the first symbol and the second symbol following RL-SIG 1014 are modulated according to a BPSK modulation scheme (for example, BPSK ½ as opposed to a Q-BPSK or other modulation scheme) like L-STF 1008, L-LTF 1010, L-SIG 1012 and RL-SIG 1014. In this way, STAs that are compliant with HE, but not compliant with EHT or later versions, may interpret the PPDU 1000 as an HE PPDU and may respect the duration of the PPDU 1000 indicated by L-SIG 1012. Furthermore, the ability of HE devices to interpret information, such as an indication of whether the PPDU 1000 is an uplink (UL) or a downlink (DL) PPDU, a BSS color, and a transmission opportunity (TxOP) duration, associated with EHT- or later version-compliant transmissions enables advanced deferral techniques.

Although the presence of RL-SIG 1014 and the modulation scheme may indicate that an HE or later IEEE 802.11 wireless communication protocol was used to transmit the PPDU 1000, in some implementations, to indicate that the PPDU is an EHT or later 802.11 wireless communication protocol version, the transmitting device sets the value of a reserved bit in U-SIG 1016 such that it is inverted (or "flipped") relative a value of a reserved bit in a corresponding bit location within HE-SIG-A (for example, the reserved bit may have a value of logic "0" instead of a logic "1" expected in HE-SIG-A). In some such implementations, the value of the reserved bit itself does not indicate the particular version, rather, it is the (for example, 16-bit) value of the version field that identifies the particular version of the set of possible versions. In some other implementations, more than one reserved bit may be used to indicate the version and a separate version field may not be used.

As described previously, in IEEE 802.11be, and future generations, new fields may be used to carry signaling information. For example, the new fields and signaling information may be included in the U-SIG 1016. Additionally, new fields and signaling information may be included in the EHT-SIG 1018 (or may overflow into the EHT-SIG 1018). If additional training signals are sent on other tones prior to U-SIG (such as additional training signals in L-SIG and RL-SIG in 11ax), then each symbol in U-SIG may carry more usable data for feature signaling rather than training signals. In some implementations, U-SIG 1016 includes two symbols, which may be jointly encoded together in a single block, and which may each carry at least twenty-four usable data (or "information") bits. In some implementations, the U-SIG 1016 may support 26 bits per symbol by using four extra tones for signaling. Thus, there may be a total 52 bits available from among the two symbols for the U-SIG 1016. This disclosure includes several options to enable the U-SIG 1016 and EHT-SIG 1018 could carry 2 more bits per symbol compared to L-SIG (which carries 24 bits). For example, the training signals on extra tones (such as [−28, −27, 27, 28]) may be sent on L-SIG and RL-SIG as in IEEE 802.11ax. The channel estimate of these 4 tones are ready after RL-SIG, so those extra four tones may be used for signaling starting from the U-SIG. In yet another option, the training signals on extra tones (such as [−28, −27, 27, 28]) may be sent on L-LTF and L-SIG. The receiver may attempt to use 52 data tones if the energy detection and comparing signals in those 4 tones in L-LTF & L-SIG indicate training. Then, those extra four tones may be enabled for signaling starting with the U-SIG.

The bits in the U-SIG 1016 may include signaling regarding types or formats of additional signal fields (such as the EHT-SIG 1018) that follow the U-SIG 1016. The U-SIG 1016 may include two types of content, such as version independent fields 1050 and version dependent fields 1051. In some implementations, the version independent fields 1050 includes universal fields 1056, such as a version identifier to indicate the WLAN protocol version of the packet (such as one value to indicate 802.11be), an indicator whether the PPDU is uplink or downlink (UL/DL indicator), a transmission opportunity (TX OP) field, or a BSS color, among other examples.

The U-SIG 1016 may include frequency occupation indications that permit any WLAN devices on the wireless channel to determine the utilization of the various parts of the wireless channel. For example, the U-SIG 1016 may include a PPDU BW and punctured channel information field 1052. The PPDU BW and punctured channel information field 1052 may include a PPDU BW value, punctured channel indicators, or any combination thereof. The PPDU BW and punctured channel information field 1052 may be included in the version independent fields 1050 or the version dependent fields 1051. The PPDU BW and punctured channel information field 1052 may be included in the version independent fields 1050 to explicitly indicate a full puncturing pattern of the specific 80 MHz so that bystanders will know the punctured channels. Alternatively, the PPDU BW and punctured channel information field 1052 may be included in the version dependent fields 1051 if there is no need to inform bystanders. Examples of the PPDU BW and punctured channel information field 1052 are further described in FIG. 11.

In addition to the version independent fields 1050, the U-SIG 1016 may include version dependent fields 1051. Examples of the version dependent fields 1051 may include a format information field 1058 and additional signaling field(s) 1062. The format information field 1058 may indicate a format of the remaining fields of the U-SIG 1016 as well as the format of EHT-SIG 1018 (if included). For example, the format information field 1058 may include a PPDU format field which indicates whether the PPDU 1000 is a trigger-based (TB) PPDU, a single user (SU) PPDU, or a multi-user (MU) PPDU. In some implementations, the format information field 1058 may alter how the rest of the U-SIG 1016 and the EHT-SIG 1018 are structured. For example, the format of the additional signaling fields 1062 and the EHT-SIG 1018 may depend on the value in the format information field 1058. In some implementations, the format information field 1058 may include a PPDU format field which indicates whether the PPDU is a TB PPDU, an SU PPDU, or an MU PPDU. For a TB PPDU, the EHT-SIG 1018 may not be present. For an SU PPDU, the EHT-SIG 1018 may have a first format 1070. And, for a MU PPDU, the EHT-SIG 1018 may have a second format 1080. The format and contents of the additional signaling fields 1062 and the EHT-SIG 1018 are described further below. A U-SIG 1016 also may include a CRC and a tail (not shown). The CRC may protect the earlier fields of the U-SIG 1016. In some implementations, the CRC may protect earlier fields of the U-SIG 1016 as well as all or part of the L-SIG.

EHT-SIG 1018 may include one or more jointly encoded symbols and may, in some implementations, be encoded in a different block from the block in which U-SIG 1016 is encoded. EHT-SIG 1018 may be used by an AP to identify and inform multiple STAs 104 that the AP has scheduled UL or DL resources. EHT-SIG 1018 may be decoded by each compatible STA 104 served by the AP 102. The U-SIG 1016 may include information usable by the identified STAs 104 to decode an EHT-SIG 1018. The U-SIG 1016 may generally be used by a receiving device to interpret bits in the EHT-SIG 1018 or the DATA field 1026. For example, the U-SIG 1016 may indicate a format of the EHT-SIG 1018 in the various component channels, available channel bandwidths, and modulation and coding schemes (MCSs), among other possibilities. EHT-SIG 1018 may further include a cyclic redundancy check (CRC) (for example, four bits) and a tail (for example, 6 bits) that may be used for binary convolutional code (BCC).

The EHT-SIG 1018 may carry STA-specific scheduling information such as, for example, per-user MCS values and per-user RU allocation information. EHT-SIG 1018 may generally be used by a receiving device to interpret bits in the DATA field 1026. In the context of DL MU-OFDMA, such information enables the respective STAs 104 to identify and decode corresponding RUs in the associated DATA field 1026. Each EHT-SIG 1018 includes a common field and at least one STA-specific field ("user field"). The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other possibilities. The common field may be encoded with common bits, CRC bits, and tail bits. The user fields are assigned to particular STAs 104 and may be used to schedule specific RUs and to indicate the scheduling to other WLAN devices. The common field may have a varying length. Each user field may include multiple user block fields (which may be followed by padding). Each user block field may include, for example, two user fields that contain information for two respective STAs to decode their respective RU payloads.

In some implementations, the EHT-SIG 1018 contents are duplicated in every content channel. In some other implementations, a parallelization design for EHT-SIG 1018 (or part of the EHT-SIG 1018) may include spreading different fields into different content channels. Table 1 summarizes how the U-SIG 1016 and the EHT-SIG 1018 may be formatted differently for different PPDU formats (such as different formats for a TB PPDU, an SU PPDU, or an MU PPDU).

TABLE 1

Examples of U-SIG and EHT-SIG

| PPDU Format | U-SIG | EHT-SIG |
|---|---|---|
| TB PPDU | Version independent fields: (17 bits)<br>- Version identifier: ~3 bits<br>- UL/DL: 1 bit<br>- TXOP: >=7 bits<br>- BSS color: >=6 bits<br>Version independent or dependent fields:<br>- PPDU BW and punctured channel information: >=4 bits<br>  - Option 1: 1 subfield to include both PPDU BW and punctured channel information: >=4 bits<br>  - Option 2: 2 subfields as following<br>    - PPDU BW: 3 bits<br>    - Punctured channel information: >=4 bits | not included |

TABLE 1-continued

Examples of U-SIG and EHT-SIG

| PPDU Format | U-SIG | EHT-SIG |
|---|---|---|
| | Version dependent fields:<br>- Format info field: 2 bits<br>    - PPDU format field: 1-2 bits<br>- Additional signal fields:<br>    - Spatial reuse field: 2 bits or 4 bits or 8 bits<br>    - Reserved<br>CRC: 4 bits<br>Tail: 6 bits | |
| SU PPDU | Version independent fields: (17 bits)<br>- Version identifier: ~3 bits<br>- UL/DL: 1 bit<br>- TXOP: >=7 bits<br>- BSS color: >=6 bits<br>Version independent or dependent fields:<br>- PPDU BW and punctured channel information: >=4 bits<br>    - Option 1: 1 subfield to include both PPDU BW and punctured channel information: >=4 bits<br>    - Option 2: 2 subfields as following<br>        - PPDU BW: 3 bits<br>        - Punctured channel information: >=4 bits<br>Version dependent fields:<br>- Format info field: 2 bits<br>    - PPDU format field: 2 bits<br>- Additional signal fields: (which may carry over into EHT-SIG)<br>    - SU specific fields:<br>        - MCS: 4 bits<br>        - DCM: 1 bit<br>        - Coding: 1 bit<br>        - Beamformed: 1 bit<br>- Spatial reuse: 4 bits<br>- GI+LTF size: 2 bits<br>- Number of EHT-LTF symbols and midamble periodicity (or NSTS and midamble periodicity): ~4 bits<br>- Doppler: 1 bit<br>- LDPC extra symbol segment: 1 bit<br>- STBC (space time block code): 1 bit<br>- Pre-FEC padding factor: 2 bits<br>- PE (packet extension) disambiguity: 1 bit<br>- Beam Change: 1 bit<br>CRC: 4 bits<br>Tail: 6 bits | 1 symbol EHT-SIG;<br>Includes bits overflowed to EHT-SIG from the U-SIG. May be encoded in 1 symbol using same coding rate and modulation as U-SIG, such as, rate 1/2 BCC encoded and BPSK modulated |
| MU PPDU | Version independent fields: (17 bits)<br>- Version identifier: ~3 bits<br>- UL/DL: 1 bit<br>- TXOP: >=7 bits<br>- BSS color: >=6 bits<br>Version independent or dependent fields:<br>- PPDU BW and punctured channel information: >=4 bits<br>    - Option 1: 1 subfield to include both PPDU BW and punctured channel information: >=4 bits<br>    - Option 2: 2 subfields as following<br>        - PPDU BW: 3 bits<br>        - Punctured channel information: >=4 bits<br>Version dependent fields: - One or more user<br>- Format info field: 12-13 bits (tentative)<br>    - PPDU format field: 2 bits<br>    - EHT-SIG MCS: 2-3 bits (tentative)<br>    - EHT-SIG DCM: 0-1 bit (tentative)<br>    - Number of EHT-SIG symbols (or number of MU-MIMO users): 5 bits (tentative)<br>    - EHT-SIG compression fields: 1-2 bits (tentative) | variable length EHT-SIG;<br>MCS of transmitting EHT-SIG may be indicated in the U-SIG<br>Further includes:<br><br>Common field: (size depends on bandwidth of the wireless channel)<br>- Additional info fields overflowed from U-SIG<br>- Resource allocation information<br>User Specific field:<br><br>block fields with per-STA and per-RU information |

TABLE 1-continued

Examples of U-SIG and EHT-SIG

| PPDU Format | U-SIG | EHT-SIG |
|---|---|---|
| | - Additional signal fields common to all users: (which may carry over into EHT-SIG)<br>    - Spatial reuse: 4 bits<br>    - GI+LTF size: 2 bits<br>    - Number of EHT-LTF symbols and midamble periodicity: ~4 bits<br>    - Doppler: 1 bit<br>    - LDPC extra symbol segment: 1 bit<br>    - STBC (space time block code): 1 bit<br>    - Pre-FEC padding factor: 2 bits<br>    - PE (packet extension) disambiguity: 1 bit<br>    - Beam Change: 1 bit<br>CRC: 4 bits<br>Tail: 6 bits | |
| Unified SU/MU PPDU Format | Version independent fields: (17 bits)<br>- Version identifier: ~3 bits<br>- UL/DL: 1 bit<br>- TXOP: >=7 bits<br>- BSS color: >=6 bits<br>Version independent or dependent fields:<br>- PPDU BW and punctured channel information: >=4 bits<br>    - Option 1: 1 subfield to include both PPDU BW and punctured channel information: >=4 bits<br>    - Option 2: 2 subfields as following<br>        - PPDU BW: 3 bits<br>        - Punctured channel information: >=4 bits<br>Version dependent fields:<br>- Format info field: 12-13 bits (tentative)<br>    - PPDU format field: 1-2 bits<br>    - EHT-SIG MCS: 2-3 bits (tentative)<br>    - EHT-SIG DCM: 0-1 bit (tentative)<br>    - Number of EHT-SIG symbols (or number of MU-MIMO users): 5 bits (tentative)<br>    - EHT-SIG compression fields: 1-2 bits (tentative)<br>- Additional signal fields common to all users (or SU): (which may carry over into EHT-SIG)<br>    - Spatial reuse: 0 or 2 or 4 bits<br>    - GI+LTF size: 2-3 bits<br>    - Number of EHT-LTF symbols and midamble periodicity: 3-4 bits<br>    - Doppler: 1 bit<br>    - LDPC extra symbol segment: 1 bit<br>    - STBC (space time block code): 0-1 bit<br>    - Pre-FEC padding factor: 2 bits<br>    - PE (packet extension) disambiguity: 1-2 bit<br>    - Beam Change: 1 bit<br>CRC: 4 bits<br>Tail: 6 bits | variable length EHT-SIG;<br>MCS of transmitting EHT-SIG may be indicated in the U-SIG<br>Further includes:<br>Common field: (size depends on bandwidth of the wireless channel)<br>- Additional info fields overflowed from U-SIG<br>- Resource allocation information (which may be omitted for SU)<br>User Specific fields:<br>- One or more user block fields with per-STA and per-RU information |

For a TB PPDU, the additional signaling fields 1062 may include one or more indicators regarding spatial reuse. For example, in some implementations, the additional signaling fields 1062 may include a spatial reuse field that includes 4-bits. The 4-bit field may indicate spatial reuse for the entire PPDU BW, or for an 80 MHz portion of the wireless channel. The spatial reuse field may be different for each 80 MHz portion of the wireless channel. In some other implementations, the spatial reuse field may include 8-bits and may indicate spatial reuse for each half BW of the entire PPDU BW, or each 40 MHz portion within an 80 MHz portion of the wireless channel. As indicated above, the EHT-SIG 1018 may not be present in a TB PPDU.

For an SU PPDU, the additional signaling fields 1062 may include one or more of the following indicators: a guard interval and long training field size (GI+LTF, such as 2 bits), a number of EHT-LTF symbols and midamble periodicity (or NSTS and midamble periodicity) (such as 4 bits), a doppler indicator (such as 1 bit), an LDPC extra symbol segment (such as 1 bit), a space time block code (STBC, such as 1 bit), a Pre-FEC padding factor (such as 2 bits), a packet extension (PE) disambiguity indicator (such as 1 bit), and a beam change (such as 1 bit), among other examples. Note that some of these aforementioned indicators may carry over into part of the EHT-SIG 1018 or may be signaled in the EHT-SIG 1018 (rather than the U-SIG 1016). For example, the EHT-SIG 1018 may include overflow from the U-SIG and SU specific fields 1072. The SU specific fields may include an MCS indicator (such as 4 bit), a DCM indicator (such as 1 bit), a coding indicator (such as 1 bit), a beamform indicator (such as 1 bit), or a spatial reuse (such as 4 bits or 8 bits), among other examples.

For an MU PPDU, the additional signaling fields 1062 may include one or more of the following indicators: a spatial reuse (such as 4 bits), a guard interval and long training field size (GI+LTF, such as 2 bits), a number of EHT-LTF symbols and midamble periodicity (such as 4 bits), a doppler indicator (such as 1 bit), an LDPC extra symbol segment (such as 1 bit), a space time block code (STBC, such as 1 bit), a Pre-FEC padding factor (such as 2 bits), a packet extension (PE) disambiguity indicator (such as 1 bit), and a beam change (such as 1 bit), among other examples. Note that some of these aforementioned indicators may carry over into part of the EHT-SIG 1018 or may be signaled in the EHT-SIG 1018 (rather than the U-SIG 1016). For example, a common field 1082 may include the overflow bits from the additional signaling fields 1062. Furthermore, the common field 1082 may include resource allocation information (such as RU allocations for one or more STAs). A user specific field 1084 may include one or more user block fields. For example, there may be a different user block field for each resource allocation indicated in the common field 1082. In some implementations, the EHT-SIG compression field (such as 2 bits) may be used to indicate one unpunctured non-OFDMA compression mode, one punctured non-OFDMA compression mode and one uncompressed mode (for OFDMA). In some implementations, the EHT-SIG compression field (such as 1 bit) may be used to indicate one (punctured or unpunctured) non-OFDMA compression mode, and one uncompressed mode (for OFDMA).

For a unified SU/MU PPDU format, the additional signaling fields 1062 may include fields that are used for either SU or MU transmissions, including one or more of the following indicators: a spatial reuse (such as 4 bits), a guard interval and long training field size (GI+LTF, such as 2 bits), a number of EHT-LTF symbols and midamble periodicity (such as 4 bits), a doppler indicator (such as 1 bit), an LDPC extra symbol segment (such as 1 bit), a space time block code (STBC, such as 1 bit), a Pre-FEC padding factor (such as 2 bits), a packet extension (PE) disambiguity indicator (such as 1 bit), and a beam change (such as 1 bit), among other examples. Note that some of these aforementioned indicators may carry over into part of the EHT-SIG 1018 or may be signaled in the EHT-SIG 1018 (rather than the U-SIG 1016). For example, a common field 1082 may include the overflow bits from the additional signaling fields 1062. If the unified SU/MU PPDU is directed to multiple users, the common field 1082 may include resource allocation information (such as RU allocations for one or more STAs). Alternatively, if the unified SU/MU PPDU is directed to a single user and there is no preamble puncturing, the RU allocation information may be omitted. In some uses of the SU/MU PPDU, such as when SU preamble puncturing is used, the RU allocation information may be included (optionally, in a compressed version compared to the RU allocation subfield for a traditional multi-user transmission). A user specific field 1084 may include one or more user block fields. For example, if the unified SU/MU PPDU is directed to multiple users, there may be a different user block field for each resource allocation indicated in the common field 1082. Alternatively, if the unified SU/MU PPDU is directed to a single user, there may be only one user field (of non-MU-MIMO format) in which the SU specific fields (such as MCS, DCM, coding, beamformed, among other examples) may be merged. Compared to the SU specific fields, there are additional fields, such as STA ID field (11 bits) and NSTS (4 bits) that may be included in the user field.

The unified MU/SU PPDU format may support either MU or SU traffic. For a full BW SU transmission, the cost of using the unified MU/SU PPDU format U-SIG is an additional 26 bits (other format info fields (11 bits) in U-SIG for MU PPDU, STA ID field (11 bits) and NSTS field (4 bits) in the user field) as compared to an SU PPDU format. However, it may be desirable to use the unified MU/SU PPDU format for higher bandwidth communication protocols, such as IEEE 802.11be and beyond. The total size of the U-SIG and EHT-SIG for the unified MU/SU PPDU would be >=73 bits (for the PPDU formatted for a single user transmission), which could be populated in a 2-symbol U-SIG and a tightly fit 2-symbol EHT-SIG (of BPSK, rate 1/2). In some implementations, a 3-symbol EHT-SIG of (BPSK, rate 1/2) may be used if the PPDU BW & puncturing info field(s) use >4 bits, or if there is signaling for additional features. In some implementations, the EHT-SIG compression field (such as 2 bits) may be used to indicate one unpunctured non-OFDMA compression mode, one punctured non-OFDMA compression mode and one uncompressed mode (for OFDMA). In some implementations, the EHT-SIG compression field (such as 1 bit) may be used to indicate one (punctured or unpunctured) non-OFDMA compression mode, and one uncompressed mode (for OFDMA). In some implementations, the EHT-SIG compression field (such as 2 bits) may be used to indicate one (punctured or unpunctured) SU compression mode (to support a single user transmission), one (punctured or unpunctured) non-OFDMA compression mode (for MU-MIMO transmission to support more than one user), and one uncompressed mode (for OFDMA transmission).

Some fields of the EHT-SIG may be transmitted in a specific 20 MHz subchannel of a first content channel, and different fields may be transmitted in a different 20 MHz subchannel of a second content channel. While the contents or values within the EHT-SIG may be different for different content channels, the format and field structures of the EHT-SIG may be consistent for all content channels. The content channel (including the EHT-SIG) may be eliminated for subchannels that are punctured (as indicated in the PPDU BW and punctured channel information field 1052).

Figure 11:
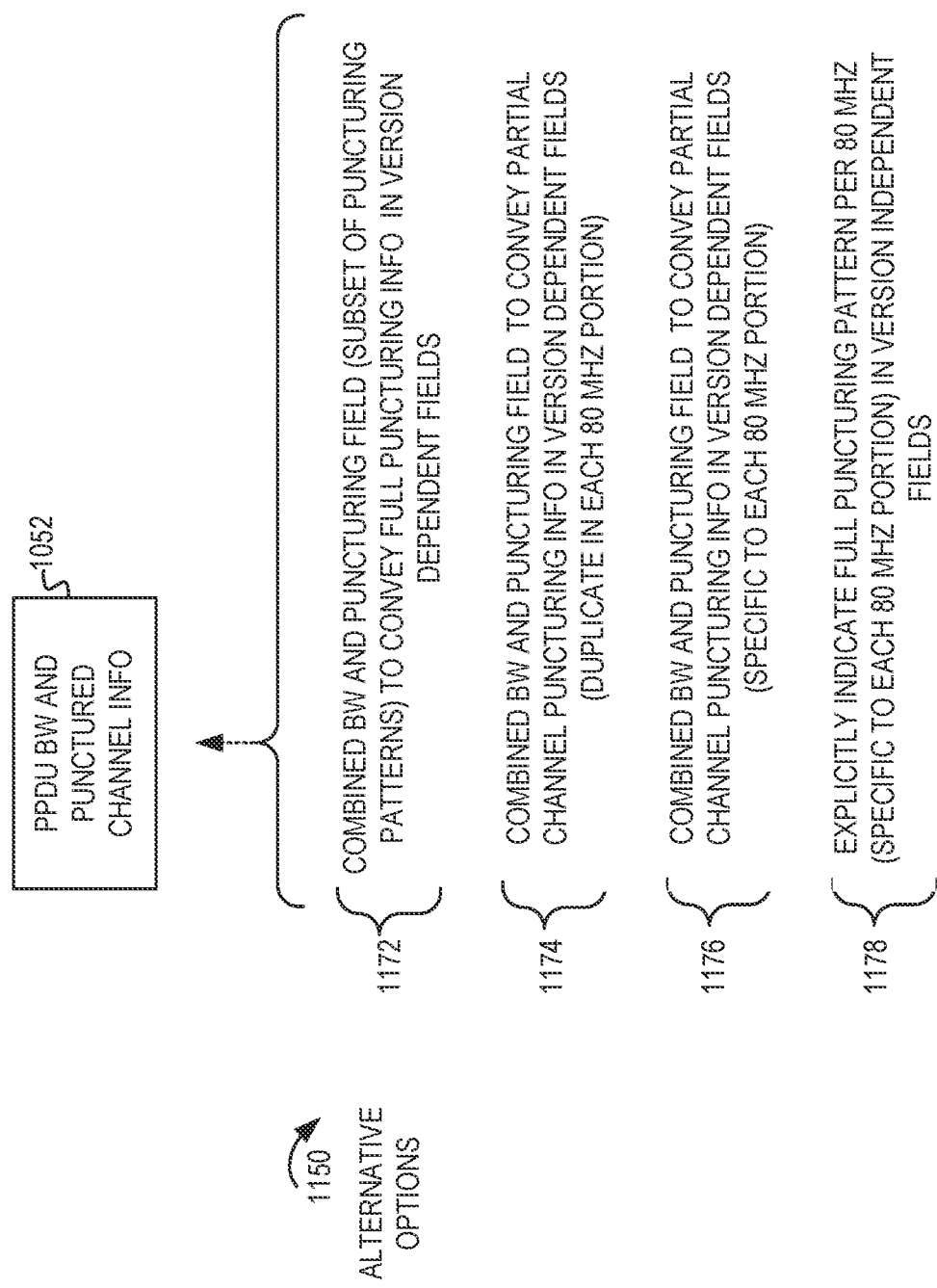
FIG. 11 shows example options for PPDU bandwidth (BW) and punctured channel information according to some implementations.

The fields and field sizes in Table 1 are provided as illustrative examples. Some implementations may include additional fields or different sizes FIG. 11 shows example options for PPDU BW and punctured channel information according to some implementations. As indicated above, there may be alternative options 1150 for the content and format of the PPDU BW and punctured channel information field 1052. In some options 1172, 1174, and 1176, the PPDU BW and punctured channel information field 1052 may be included in the version dependent fields of the U-SIG. For example, these options may be used if there is no need to inform bystanders. In another option 1178, the PPDU BW and punctured channel information field 1052 may be included in the version independent fields.

In a first option 1172, the PPDU BW and punctured channel information field 1052 may include a value representing a combined BW and puncturing configuration to convey full puncturing information. The value may be determined from a table in which different bit values (possibly up to 8 bits or more) represent different combinations of BW and puncturing.

In a second option 1174, the PPDU BW and punctured channel information field 1052 may convey partial channel puncturing information (at the content channel level). The PPDU BW and punctured channel information field 1052 may represent the puncturing for the primary 80 MHz subchannel and the value of the PPDU BW and punctured channel information field 1052 may be duplicated in each 80 MHz subchannel that makes up the full channel.

In a third option 1176, the PPDU BW and punctured channel information field 1052 may convey partial channel puncturing information (at the content channel level). However, different from option 1174, the third option 1176 utilizes different values for each different 80 MHz subchannel of the full channel. Thus, the PPDU BW and punctured channel information field 1052 includes a value in each 80 MHz subchannel that is specific to that 80 MHz subchannel.

In a fourth option 1178, the PPDU BW and punctured channel information field 1052 may explicitly indicate the full puncturing pattern per 80 MHz. This option 1178 may be used, in some implementations, to inform bystanders of the punctured 20 MHz subchannels in each specific 80 MHz subchannel, and to inform intended recipients so that recipients know the content channel locations in each specific 80 MHz subchannel.

In some implementations, the PPDU BW and punctured channel information field 1052 may include a punctured channel bitmap to indicate the punctured channels. In one option, the PPDU BW and punctured channel information field 1052 may be a 4-bit value that includes a value selected from a lookup table. Each potential value of the PPDU BW and punctured channel information field 1052 in the lookup table may relate to a particular bandwidth of the channel. Additionally, some values may further indicate a fixed set of puncturing configurations. In another option, the PPDU BW and punctured channel information field 1052 may be a 3-bit value that indicates a value selected from the lookup table for a particular bandwidth. In such an example, U-SIG may further include a punctured channel bitmap (not shown) that follows the 3-bit value. The punctured channel bitmap (if included) may indicate puncturing at different granularities. For example, in some implementations, the punctured channel bitmap may be a per 80 MHz bitmap in which each bit indicates puncturing (or not) of a respective one of the 80 MHz subchannels of the wireless channel. In some other implementations, the punctured channel bitmap may be a per 20 MHz bitmap in which each bit indicates puncturing (or not) of a 20 MHz subchannel. In some implementations, parallelization may be used to prepare different punctured channel bitmaps for each 80 MHz subchannel of the wireless channel. For example, the punctured channel bitmap may be a per 20 MHz bitmap in which each bit indicates puncturing (or not) of a 20 MHz subchannel within a respective one of the 80 MHz portions of the wireless channel. Thus, the punctured channel bitmap may be different for each 80 MHz portion and may include bits that are specific to that 80 MHz portion.

In some implementations, the PPDU BW and punctured channel information are separate subfields. The PPDU BW subfield may use 3 bits to indicate the PPDU BW, including but not limited to the following: 20 MHz, 40 MHz, 80 MHz, 160 MHz (or 160/80+80 MHz), 320 MHz (or 320/160+160 MHz). The indication of 320 MHz (or 320/160+160 MHz) may be just one entry, or two entries to indicate both the PPDU BW as well as how the channelization of the 320 MHz for disambiguity. For example, one entry may be 320 MHz (lower 160 MHz) to indicate the PPDU BW is 320 MHz and the current 160 MHz subchannel is the lower 160 MHz channel of the PPDU BW; the other entry may be 320 MHz (upper 160 MHz) to indicate the PPDU BW is 320 MHz and the current 160 MHz subchannel is the upper 160 MHz channel of the PPDU BW.

In some implementations, the punctured channel information may use 5 to 6 bits to indicate the punctured channel information, which may depend on the PPDU BW as well as the EHT-SIG compression field (which indicates whether the PPDU is OFDMA or non-OFDMA, which may include the SU transmission and the non-OFDMA MU-MIMO transmission). For example, if the EHT-SIG compression field indicates that it is an uncompressed mode (for example, OFDMA transmission), 4 bits out of the 5-6 bit field are used to indicate the per 20 MHz punctured channel bitmap of the current 80 MHz. If the EHT-SIG compression field indicates that it is a non-OFDMA compressed mode, the 5-6 bits field is used to indicate the non-OFDMA punctured channel pattern.

FIG. 12A shows an example table 1201 with a 5 to 6 bit design for punctured channel indication options to indicate the non-OFDMA punctured channel pattern. Each entry of the table 1201 may provide information about the puncturing information including the non-OFDMA punctured channel pattern.

FIG. 12B shows an example table 1202 with a 5 to 6 bit design for punctured channel indication options to indicate the punctured channel pattern for both OFDMA and non-OFDMA. Each entry of the table 1202 may provide information about the PPDU BW and puncturing information including the OFDMA or non-OFDMA punctured channel pattern. If the EHT-SIG compression field indicates that it is an uncompressed mode (for example, OFDMA transmission), the 5-6 bit field is used to indicate the punctured channel information of the current 80 MHz by using the rows of the table 1202 corresponding "80 MHz/segment". If the EHT-SIG compression field indicates that it is a non-OFDMA compressed mode, the 5-6 bits field is used to indicate the non-OFDMA punctured channel pattern, by looking at the rows corresponding to the PPDU BW.

Spatial Reuse (SR) Field

Recall that in IEEE 802.11ax, there are 4 bits for each spatial reuse (SR) field. For SU and MU PPDUs, the SR field is for entire PPDU BW. For a TB PPDU, each spatial reuse field is for a 20 MHz subband if the total BW is <=80 MHz, or a 40 MHz subband if the total BW is 160 MHz. However, a bystander only needs to know the spatial reuse info of the particular 80 MHz, instead of entire PPDU BW. Therefore, the SR field may be modified for use with IEEE 802.11be and beyond. For example, for SU/MU PPDUs, the SR field may be for the particular 80 MHz. For a TB PPDU, the SR field may be a 4 bit value representing SR for a particular 80 MHz. The SR field may carry different values in different 80 MHz subchannels. In another option, for a TB PPDU, the SR field (or SR fields) may include a total of 8 bits per 80 MHz, where there are 4 bits for each SR field for a 40 MHz channel. Each SR field may be for a 40 MHz subband within the particular 80 MHz and may carry different values in different 80 MHz channels. In some implementations, the SR field may use 2 bits to indicate including a subset of states that the flax 4-bit SR field could indicate.

Content Channels

In IEEE 802.11be, the 320 MHz bandwidth may be divided into sixteen 20 MHz subchannels. The sixteen 20 MHz subchannels may be referenced (or labeled) based on the frequency. Thus, from the lowest to the highest frequency the sixteen 20 MHz subchannels may be labelled as the 1st to the 16th 20 MHz subchannels. Similarly, the 160

MHz bandwidth may be divided into eight 20 MHz subchannels, referenced (or labeled) from the lowest to the highest frequency as the 1st to the 8th 20 MHz subchannels. The 80 MHz bandwidth may be divided into four 20 MHz subchannels, referenced (or labeled) from the lowest to the highest frequency as the 1st to the 4th 20 MHz subchannels. The 40 MHz bandwidth may be divided into two 20 MHz subchannels, referenced (or labeled) from the lowest to the highest frequency as the 1st to the 2nd 20 MHz subchannels.

In some implementations, the content channels of 320 MHz bandwidth include 20 MHZ subchannels in either the upper or the lower 160 MHz subbands of a wireless channel, and thus each content channel may carry RU allocation for either the upper or the lower 160 MHz subband, depending on the content channel location (such as depending on the [1, 2, 1, 2] or [1, 2, 3, 4] content channel structure). In other words, just as the 20 MHz subchannels are split into either upper or lower 160 MHz subbands of the entire bandwidth, the RU allocation for a 320 MHz channel or a 160+160 MHz channel is split into two parts, the upper and the lower 160 MHz subbands. The sizes of the subbands and quantities of divisions described are examples. Other divisions and sizes of subbands may be possible. For example, a channel may be split into three subbands of 80 MHz, 80 MHz, and 160 MHz bandwidths.

In IEEE 802.11ax, only SIG-B (which has the RU allocation info as common field, and user specific field) uses content channel structure, but SIG-A does not. Similar to IEEE 802.11ax, the EHT-SIG (which includes common field and user specific field) may use the content channel structure. However, the U-SIG does not use the content channel structure. Furthermore, the common field in the EHT-SIG may include the RU allocation in the common field as well as fields overflowed from U-SIG. In some implementations, a content channel structure for all bandwidth modes, including 20 MHz, 40 MHz, 80 MHz, 160 MHz (and 80+80 MHz), 240 MHz (and 160+80 MHz), 320 MHz (and 160+160 MHz), and even higher bandwidth modes, (such as, 480 MHz or 640 MHz, among other examples) may use a [1, 2, 1, 2] content channel structure. In some implementations, a content channel structure for legacy bandwidth modes (up to 160 MHz) may use a [1, 2, 1, 2] content channel structure as described in IEEE 802.11ax. Higher bandwidth modes (such as 320 MHz or greater) may use a different content channel structure.

For a wireless channel of 320 MHz bandwidth (or 160 MHz+160 MHz bandwidth), a first option for content channel structure may use a [1, 2, 1, 2] structure. For example, each 20 MHz subchannel in the wireless channel may be labeled (from lowest to highest frequency) as a 1st to 16th 20 MHz subchannel and grouped into two groups of subchannels to form two content channels. For example, a first content channel may include the 1st, 3rd, 5th, and so on to 15th 20 MHz subchannels. A second content channel may include the 2nd, 4th, 6th, and so on, to the 16th 20 MHz subchannel. Each 20 MHz subchannel in the content channel may carries signaling for every other 20 MHz in the content channel.

For a wireless channel of 320 MHz bandwidth (or 160 MHz+160 MHz bandwidth), a second option for content channel structure may split the wireless channel into an upper 160 MHz bandwidth portion and a lower 160 MHz bandwidth portion. Each of the upper and lower 160 MHz bandwidth portions may use a [1, 2, 1, 2] structure. For example, a first content channel in the lower 160 MHz bandwidth portion may include the 1st, 3rd, 5th, and 7th 20 MHz subchannels. A second content channel in the lower 160 MHz bandwidth portion may include the 2nd, 4th, 6th, and 8th 20 MHz subchannels. A third content channel in the upper 160 MHz bandwidth portion may include the 9th, 11th, 13th, and 15th 20 MHz subchannels. A fourth content channel in the upper 160 MHz bandwidth portion may include the 10th, 12th, 14th, and 16th 20 MHz subchannels.

As described herein, various options for content channel structure may be implemented. In one option, a [1, 2, 1, 2] content channel structure may be used, where a transmitter separates all of the 20 MHz subchannels into either an even subchannel index or an odd subchannel index. A first content channel may carry the signaling information for all of the odd subchannels. For example, the first content channel carries the signaling information for the 1st, 3rd, 5th, 7th, 9th, 11th, 13th, and 15th 20 MHz subchannels. A second content channel may carry the signaling information for all of the even subchannels. For example, the second content channel carries the signaling information for the 2nd, 4th, 6th, 8th, 10th, 12th, 14th, and 16th 20 MHz subchannels. Thus, there may exist two groups of subchannels and each group corresponds to a content channel. Each of the 20 MHz subchannels in each group may carry the same signaling information. For example, the odd subchannels may have a first content channel for the EHT-SIG, and the even subchannels may have a second content channel for the EHT-SIG. It is noted that the content channel may not be present if a subchannel is punctured.

In another option, a [1, 2, 3, 4] content channel structure may be used, where the transmitter divides all of the 20 MHz subchannels into four groups associated with four content channels. For example, every 4th 20 MHz subchannel may be grouped together, and thus the 20 MHz subchannels of a content channel are separated by multiples of 80 MHz. A first content channel may carry the signaling information for the 1st, 5th, 9th, and 13th 20 MHz subchannels. A second content channel may carry the signaling information for the 2nd, 6th, 10th, and 14th 20 MHz subchannels. A third content channel may carry the signaling information for the 3rd, 7th, 11th, and 15th 20 MHz subchannels. A fourth content channel may carry the signaling information for the 4th, 8th, 12th, and 16th 20 MHz subchannels. In some implementations, the group of 20 MHz subchannels associated with a content channel that correspond to every 4th 20 MHz subchannel may have the same EHT-SIG.

In another option, the 20 MHz subchannels of the total 320 MHz bandwidth may be divided into a number of portions of bandwidth, and [1, 2, 1, 2] content channel structure may be used in each portion. One portion may be one 80 MHz segment or 160 MHz subchannel. The content channels in one portion of bandwidth (such as content channels in one 80 MHz segment) may carry signaling information different from the content channels in another portion of bandwidth (such as content channels in another 80 MHz segment). The content channels in one portion (such as content channels in one 80 MHz segment) may carry signaling information of entire PPDU bandwidth, or alternatively, signaling information of the 20 MHz subchannels within the current portion of bandwidth (such as the current 80 MHz segment). For example, the 20 MHz subchannels of the total 320 MHz bandwidth may be divided into an upper 160 MHz portion (which also may be referred to as an upper 160 MHz subband) that includes eight upper 20 MHz subchannels, and a lower 160 MHz portion (which also may be referred to as a lower 160 MHz subband) that includes eight lower 20 MHz subchannels. For example, the lower 20 MHz subchannels for the lower 160 MHz may include the 1st through the 8th 20 MHz subchannels, and the upper 20

MHz subchannels for the upper 160 MHz may include the 9th through the 16th 20 MHz subchannels. In this option, a [1, 2, 1, 2] content channel structure may be used both within the lower 160 MHz and the upper 160 MHz, which results in a total of four content channels. A first content channel in the lower 160 MHz may carry the signaling information for the 1st, 3rd, 5th, and 7th 20 MHz subchannels. A second content channel in the lower 160 MHz may carry the signaling information for the 2nd, 4th, 6th, and 8th 20 MHz subchannels. A third content channel in the upper 160 MHz may carry the signaling information for the 9th, 11th, 13th, and 15th 20 MHz subchannels. A fourth content channel in the upper 160 MHz may carry the signaling information for the 10th, 12th, 14th, and 16th 20 MHz subchannels. In some implementations, the group of 20 MHz subchannels associated with each content channel may have the same EHT-SIG.

In another option, the 20 MHz subchannels of the total 320 MHz bandwidth also may be divided into an upper 160 MHz portion that includes eight upper 20 MHz subchannels, and a lower 160 MHz portion that includes eight lower 20 MHz subchannels. For example, the lower 20 MHz subchannels for the lower 160 MHz may include the 1st through the 8th 20 MHz subchannels, and the upper 20 MHz subchannels for the upper 160 MHz may include the 9th through the 16th 20 MHz subchannels. In this option, a [1, 2, 3, 4] content channel structure may be used both within the lower 160 MHz and the upper 160 MHz, which results in a total of eight content channels. A first content channel in the lower 160 MHz may carry the signaling information for the 1st and 5th 20 MHz subchannels. A second content channel in the lower 160 MHz may carry the signaling information for the 2nd and 6th 20 MHz subchannels. A third content channel in the lower 160 MHz may carry the signaling information for the 3rd and 7th 20 MHz subchannels. A fourth content channel in the lower 160 MHz may carry the signaling information for the 4th and 8th 20 MHz subchannels. A fifth content channel in the upper 160 MHz may carry the signaling information for the 9th and 13th 20 MHz subchannels. A sixth content channel in the upper 160 MHz may carry the signaling information for the 10th and 14th 20 MHz subchannels. A seventh content channel in the upper 160 MHz may carry the signaling information for the 11th and 15th 20 MHz subchannels. An eighth content channel in the upper 160 MHz may carry the signaling information for the 12th and 16th 20 MHz subchannels. In some implementations, the group of 20 MHz subchannels associated with each content channel may have the same EHT-SIG.

For another example, the 20 MHz subchannels of the total 160 MHz bandwidth may be divided into two 80 MHz portions (segments). For example, the 20 MHz subchannels of the total 320 MHz bandwidth may be divided into four 80 MHz portions (segments). The 1st 80 MHz segment includes the 1st, 2nd, 3rd and 4th 20 MHz subchannels, and may carry the signaling information of the entire PPDU bandwidth, or alternatively, the signaling information of the 1st 80 MHz segment; the 2nd 80 MHz segment includes the 5th, 6th, 7th and 8th 20 MHz subchannels, and may carry the signaling information of the entire PPDU bandwidth, or alternatively, the signaling information of the 2nd 80 MHz segment; the 3rd 80 MHz segment includes the 9th, 10th, 11th and 12th 20 MHz subchannels, and may carry the signaling information of the entire PPDU bandwidth, or alternatively, the signaling information of the 3rd 80 MHz segment; the 4th 80 MHz segment includes the 13th, 14th, 15th and 16th 20 MHz subchannels, and may carry the signaling information of the entire PPDU bandwidth, or alternatively, the signaling information of the 4th 80 MHz segment. In this option, a [1, 2, 1, 2] content channel structure may be used both within each 80 MHz segment. If the same signaling information of the entire PPDU bandwidth is carried in the content channels in different 80 MHz segments, it results in a total of two content channels. If different signaling information, of the entire PPDU bandwidth or partial bandwidth, is carried in the content channels in different 80 MHz segments, it results in a total of eight content channels.

In some implementations, parallelization may be used on U-SIG and the EHT-SIG. Parallelization may involve not duplicating signaling in all 20 MHz subchannels. Parallelization may involve using same field structure in all 20 MHz subchannels, but using different values in some signaling field in different 20 MHz subchannels. In contrast, different signaling may be carried in different subchannels, such as the different subchannels in the different content channels, as described previously herein.

In some implementations, a parallelization design for U-SIG may include using same field structure in all 20 MHz subchannels. All U-SIG in the 20 MHz subchannels within one 80 MHz segment carry same signaling information. Particular fields in U-SIG may carry different values in different 80 MHz segments.

In some implementations, a parallelization design for EHT-SIG may include spreading different fields into different content channels. For example, some fields may be transmitted in a specific 20 MHz subchannel of a first content channel, and different fields may be transmitted in a different 20 MHz subchannel of a second content channel. In some other implementations, parallelization may not be applied to EHT-SIG and the contents are repeated for every content channel.

In some implementations, a parallelization design for EHT-SIG may include content channels on 20 MHz subchannels in both the upper and lower 160 MHz subbands, and thus each content channel may carry RU allocations for both the upper and lower 160 MHz subbands, depending on the content channel location (such as depending on the [1, 2, 1, 2] or [1, 2, 3, 4] content channel structure). In some implementations, the content channels include 20 MHz subchannels of either the upper or lower 160 MHz subbands. In such implementations, each content channel may carry RU allocations for either the upper or lower 160 MHz subbands, depending on the content channel location (such as depending on the [1, 2, 1, 2] or [1, 2, 3, 4] content channel structure). In other words, just as the 20 MHz subchannels may be split into either upper or lower 160 MHz subbands, the RU allocations for 320 MHz and 160+160 MHz may be split into two parts, the upper and the lower 160 MHz.

In another option, the content channel structure may depend on the EHT-SIG compression field. In some implementations, for the (punctured or unpunctured) SU compression mode, for all PPDU bandwidths, EHT-SIG may not use parallelization design and carry same signaling information in all 20 MHz subchannels, which results in [1, 1, 1, 1] content channel structure. For the (punctured or unpunctured) non-OFDMA compression mode (for MU-MIMO transmission) and the uncompressed mode (for OFDMA transmission), EHT-SIG may use parallelization design. For another example, the 20 MHz subchannels of the total 160 MHz bandwidth may be divided into two 80 MHz portions (segments). For example, the 20 MHz subchannels of the total 320 MHz bandwidth may be divided into four 80 MHz portions (segments). The 1st 80 MHz segment includes the 1st, 2nd, 3rd and 4th 20 MHz subchannels, and may carry the signaling information of the entire PPDU bandwidth, or alternatively, the signaling information of the 1st 80 MHz segment; the 2nd 80 MHz segment includes the 5th, 6th, 7th and 8th 20 MHz subchannels, and may carry the signaling information of the entire PPDU bandwidth, or alternatively, the signaling information of the 2nd 80 MHz segment; the 3rd 80 MHz segment includes the 9th, 10th, 11th and 12th 20 MHz subchannels, and may carry the signaling information of the entire PPDU bandwidth, or alternatively, the signaling information of the 3rd 80 MHz segment; the 4th 80 MHz segment includes the 13th, 14th, 15th and 16th 20 MHz subchannels, and may carry the signaling information of the entire PPDU bandwidth, or alternatively, the signaling information of the 4th 80 MHz segment. In this option, a [1, 2, 1, 2] content channel structure may be used both within each 80 MHz segment. If the same signaling information of the entire PPDU bandwidth is carried in the content channels in different 80 MHz segments, it results in a total of two content channels. If different signaling information, of the entire PPDU bandwidth or partial bandwidth, is carried in the content channels in different 80 MHz segments, it results in a total of eight content channels.

Figure 13:
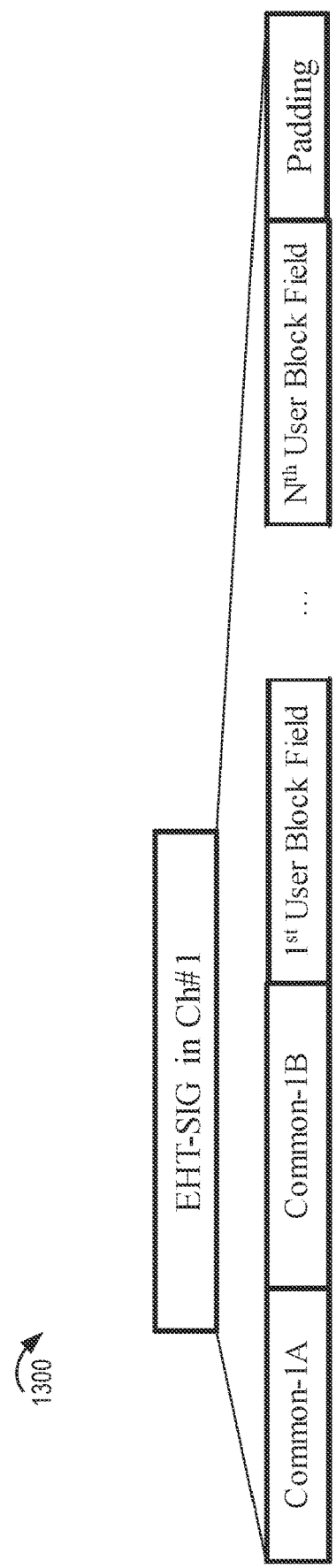
FIG. 13 shows a conceptual diagram of an Extremely High Throughput (EHT) signal field (EHT-SIG) in a content channel of a first example content channel structure according to some implementations.
Figure 14:
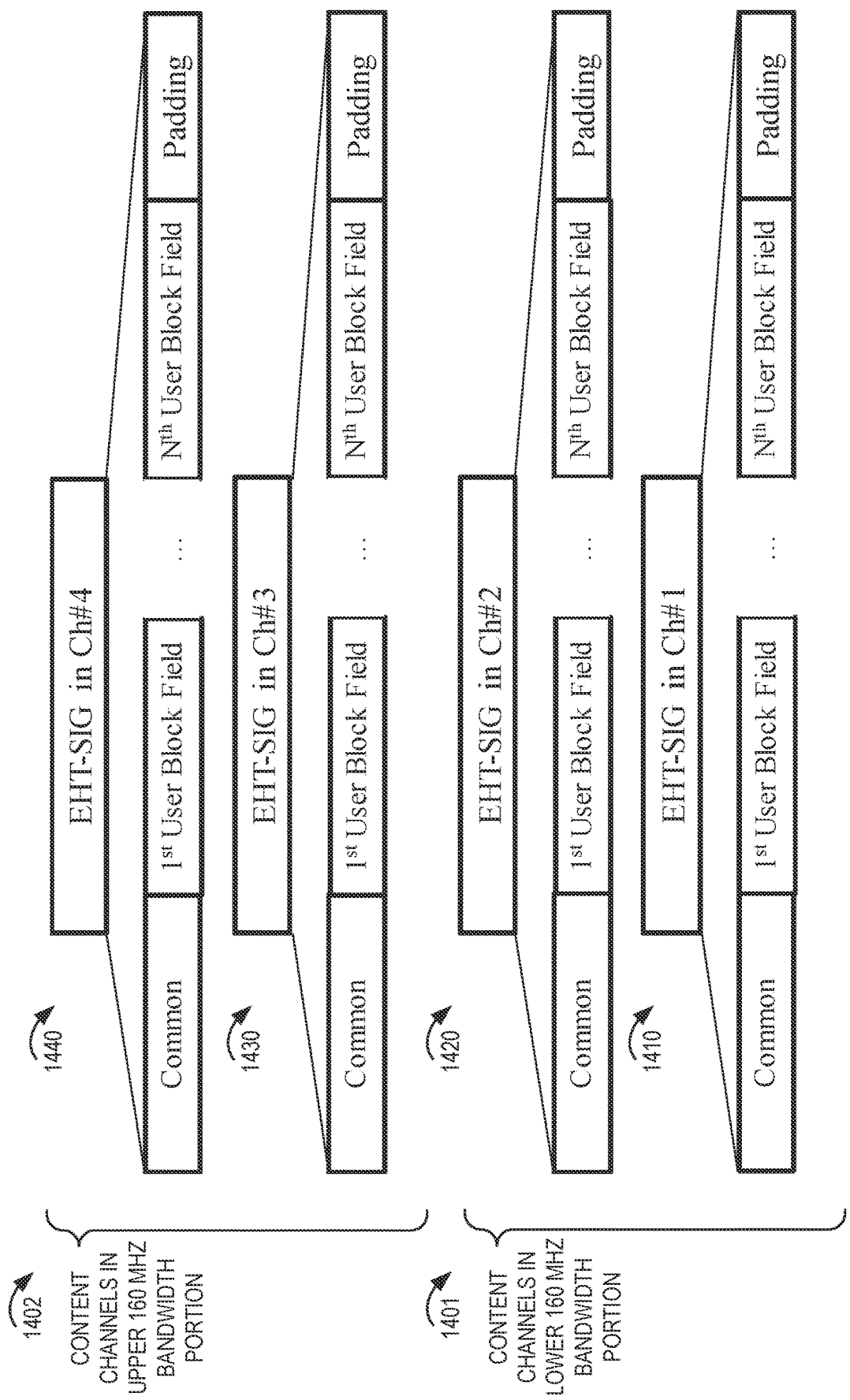
FIG. 14 shows a conceptual diagram of different EHT-SIGs in different content channels of a second example content channel structure according to some implementations.

For different content channel structures, there may be different common field design options, as described in FIGS. 13 and 14.

FIG. 13 shows a conceptual diagram of an EHT-SIG 1300 in a content channel of a first example content channel structure according to some implementations. For example, when the content channel structure uses a [1, 2, 1, 2] structure that spans the entire 320 MHz bandwidth wireless channel, the common field (shown as common-1A and common-1B) may use multiple coding blocks for the common field in each content channel. The EHT-SIG 1300 shown in FIG. 13 is an example of the EHT-SIG that may be included on a first content channel.

FIG. 14 shows a conceptual diagram of EHT-SIGs in different content channels of a second example content channel structure according to some implementations. For example, FIG. 14 may be used to describe an example in which a 320 MHz bandwidth wireless channel is divided into an upper 160 MHz bandwidth portion and a lower 160 MHz bandwidth portion. A [1, 2, 1, 2] content channel structure may be used for the lower 160 MHz bandwidth portion 1401 and a [3, 4, 3, 4] content channel structure may be used for the upper 160 MHz bandwidth portion 1402.

In some implementations, the common field may be parallelized among the different content channels. There are 4 content channels (2 for the upper 160 MHz bandwidth portion and 2 for the lower 160 MHz bandwidth portion). Therefore, there may be one common field per content channel. The encoded block of common field may have 44 information bits plus a 4 bit CRC and a 6 bit tail, for a total of 54 bits. FIG. 14 shows an example of an EHT-SIG 1410 in content channel #1, an EHT-SIG 1420 in content channel #2, an EHT-SIG 1430 in content channel #3, and an EHT-SIG 1440 in content channel #4.

In some implementations, the coding block structure of EHT-SIG may depend on the EHT-SIG compression field and PPDU bandwidth. In one option, in the punctured non-OFDMA compression mode (for SU and MU-MIMO transmission) and the unpunctured non-OFDMA compression mode (for SU and MU-MIMO transmission), or the (punctured and unpunctured) non-OFDMA compression mode (for SU and MU-MIMO transmission), the EHT-SIG common field in each content channel uses one encoded block to encode all subfields. In the uncompressed mode (for OFDMA transmission), if the PPDU bandwidth is 20 MHz, 40 MHz, or 80 MHz, the EHT-SIG common field in each content channel may use one encoded block to encode all subfields; if the PPDU bandwidth is 160 MHz and above (such as 240 MHz, 320 MHz, 480 MHz, 640 MHz, among other examples), the EHT-SIG common field in each content channel may use multiple encoded blocks to encode different subfields, and each encode block has at most 64 information bits before encoding (such as 54 signaling bits, 4-bit CRC and 6-bit tail). For example, for PPDU bandwidth of 160 MHz and 320 MHz, the EHT-SIG common field may use 2 encoded blocks. The EHT-SIG user specific field in each content channel uses one encoded block to encode every two user fields, until the last encoded block may have only one user field, or two user fields.

In another option, for some compression modes, the EHT-SIG common field and the first user field in the User Specific field in one content channel are jointly encoded into one encoded block. For example, EHT-SIG common field and the first user field may be jointly encoded for one or more of the following compression modes: the punctured non-OFDMA compression mode (for SU and MU-MIMO transmission), the unpunctured non-OFDMA compression mode (for SU and MU-MIMO transmission), the (punctured and unpunctured) non-OFDMA compression mode (for SU and MU-MIMO transmission), the (punctured and unpunctured) SU compression mode (for SU transmission), or the (punctured and unpunctured) non-OFDMA MU-MIMO compression mode (for MU-MIMO transmission). After the jointly encoded EHT-SIG common field and the first user field, the remaining user fields in the content channel may be encoded using one encoded block to encode every two user fields. The last encoded block may have only one user field or two user fields. In the uncompressed mode (for OFDMA transmission), if the PPDU bandwidth is 20 MHz, 40 MHz, or 80 MHz, the EHT-SIG common field in each content channel may use one encoded block to encode all subfields. If the PPDU bandwidth is 160 MHz and above (such as 240 MHz, 320 MHz, 480 MHz, 640 MHz, among other examples), the EHT-SIG common field in each content channel may use multiple encoded blocks to encode different subfields, and each encode block has at most 64 information bits before encoding (such as at most 54 signaling bits, 4-bit CRC and 6-bit tail). For example, for PPDU bandwidth of 160 MHz and 320 MHz, the EHT-SIG common field may use 2 encoded blocks. In the uncompressed mode (for OFDMA transmission), the EHT-SIG user specific field in each content channel uses one encoded block to encode every two user fields, until the last encoded block which may have only one user field or two user fields.

Figure 15:
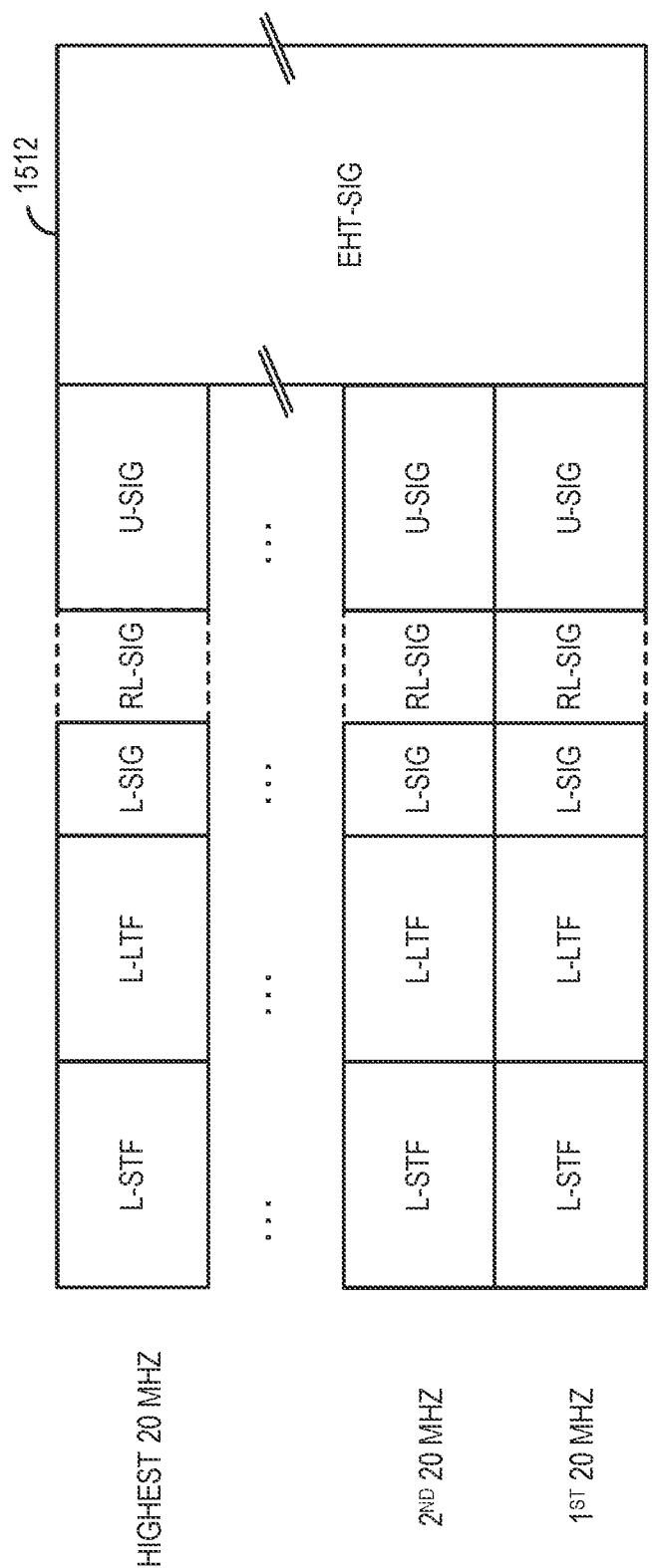
FIG. 15 shows an example frame structure in which a U-SIG is followed by an EHT-SIG field according to some implementations.

FIG. 15 shows an example frame structure in which a U-SIG is followed by an EHT-SIG field 1512 according to some implementations. In some implementations, the U-SIG may be duplicated every 20 MHz subchannel followed by the EHT-SIG field 1512. In some other implementations, the U-SIG may has same field structure in all 20 MHz subchannels, but the values of some fields are different every 80 MHz or 160 MHz subband and specific to that 80 MHz or 160 MHz subband. For example, the U-SIG is duplicated for every 20 MHz subchannel within each 80 MHz or 160 MHz subband. Thus, the U-SIG may contain different signaling information for different subbands. In some implementations, the EHT-SIG field 1512 may contain different signaling information for each 80 MHz bandwidth portion of the wireless channel. In some implementations, the content of the EHT-SIG may be based on a per-80 MHz bandwidth basis or for the total bandwidth of the wireless channel. In some implementations, the content of the EHT-SIG may be based on which devices are parked on an 80 MHz bandwidth portion and may support signaling of RU allocations for other 80 MHz bandwidth portions.

Figure 16:
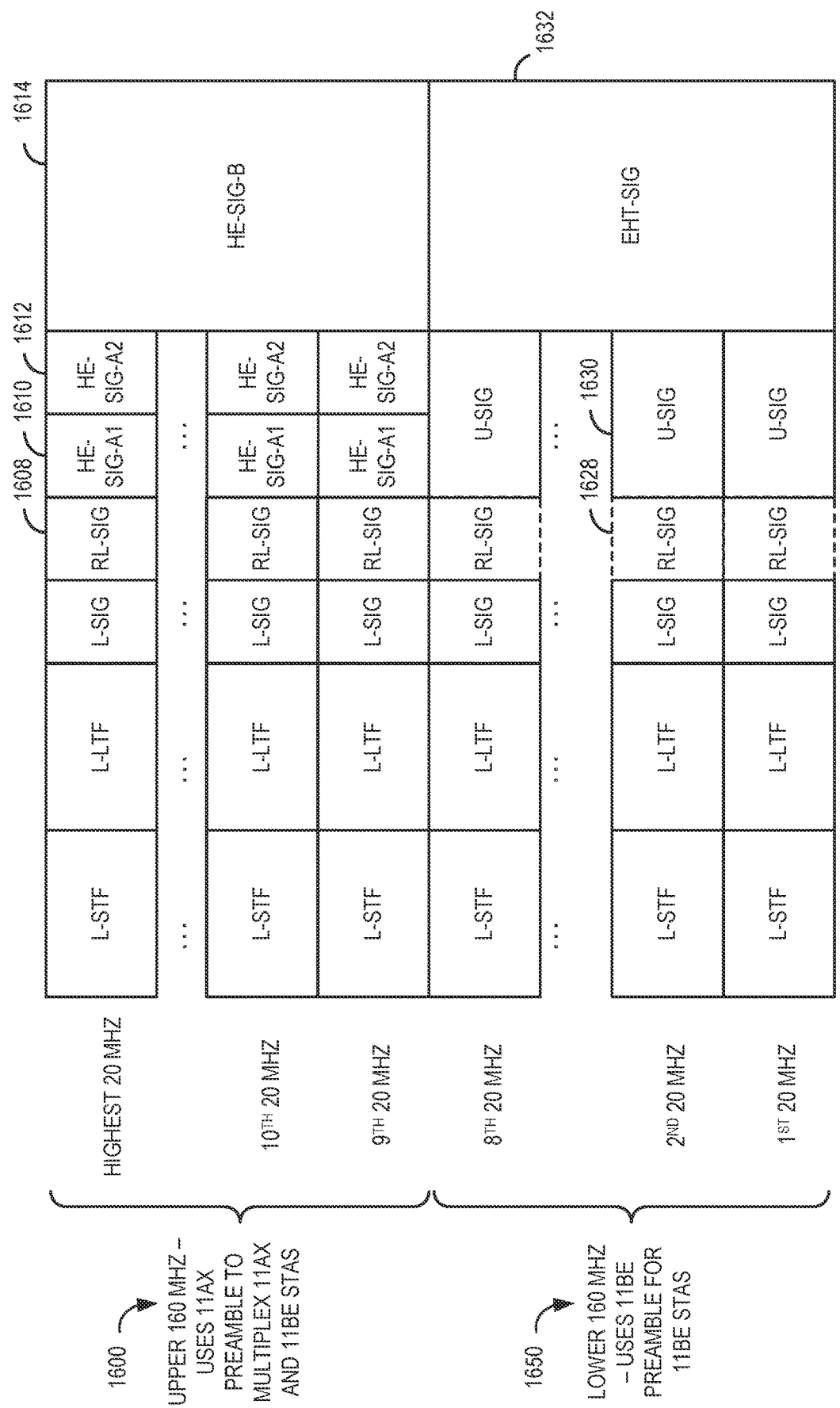
FIG. 16 shows an example frame structure in which different types of signal fields follow the RL-SIG on different subchannels according to some implementations.

FIG. 16 shows an example frame structure in which different types of signal fields follow the RL-SIG on different subchannels according to some implementations. For example, an upper subband 1600 of the total channel bandwidth (such as 320 MHz) may be used for flax transmissions while a lower subband 1650 of the total channel bandwidth may be used for 11be transmissions. This may be referred to as mixed mode transmission because it may include a mix of communication protocols in a same packet. Following the RL-SIG 1608, the upper subband 1600 may include HE-SIG-A1 1610, HE-SIG-A2 1612 and HE-SIG-B 1614. The HE-SIG-B 1614 may span multiple 20 MHz subchannels that make up the upper subband 1600. Meanwhile, in the lower subband 1650, the RL-SIG 1628 may be followed by the U-SIG 1630 and the EHT-SIG 1632. The EHT-SIG 1632 may span multiple 20 MHz subchannels that make up the lower subband 1650. The examples of which type of transmission is included in the upper and lower subbands are intended as an illustrative example, but other sizes of subbands and other types of protocol signaling may be used for other examples.

Thus, according to this technique, 11ax STAs can be multiplexed in an 80 MHz or 160 MHz subband (using 11ax preamble), while 11be STAs can be multiplexed in the rest of channel bandwidth (using 11be preamble). In some implementations, the signal fields (such as HE-SIG-B and EHT-SIG) may end at the same symbol boundary even though the other signal fields in the second portion of the preamble may have different sizes (as shown in FIG. 16). The signal fields may end at same time for all subchannels and all subbands, such that the next symbol after RL-SIG to end of SIG-B have the same number of OFDM SIG symbols (4 μs each) for all subchannels and all subbands. Following the SIGs, there may be other fields (such as an EHT short training field (EHT-STF), an EHT long training field (EHT-LTF), and data) following the end of the SIG. Thus, the EHT-STF and the EHT-LTF are aligned in time for all subchannels and all subbands.

In some implementations, the HE-Data of the subchannels starting with 11ax preamble and the EHT-Data of the subchannels starting with 11be preamble do not need to end at same time. Furthermore, the L_LENGTH value in L-SIG for the subchannels starting with 11ax preamble and that for the subchannels starting with 11be preamble do not need to be the same. And TXOP value in the HE-SIG-A in the flax preamble and the EHT-SIG-A in the 11be preamble do not need to be the same. 11ax devices are in 11ax mode, while 11be devices parked in the subband starting with 11ax preamble will be in 11ax mode, using 1 RU each. When a device is parked in the subband, the device processes the 20 MHz legacy preamble signal within that subband, and then moves on to process possibly wider bandwidth or other subbands if signaling (such as PPDU BW indication and punctured channel indication) indicates that the device should process signaling in other subbands. 11be devices parked in the subband starting with 11be preamble will be in 11be mode, and may utilize multiple RUs, including RUs in the subband starting with 11ax preamble.

In addition to the formats of the signal fields described in the previous figures, this disclosure includes various types of information that may be included in the signal fields. For example, punctured channel information may be indicated in one or more signal fields.

Punctured Channel Indicators

In some implementations, punctured channel information may be indicated in a PPDU bandwidth (BW) field. The punctured channel information may indicate which channels in the total bandwidth (such as 160 MHz or 320 MHz) are punctured, as well as the puncturing mode, such that the receiving STA knows which channels to process for information (such as the content channel information that will be described further herein) and which channels are punctured and thus not available or otherwise not including information for processing by the STA. In some implementations, the PPDU BW field may be included in the U-SIG field. In some other implementations, the PPDU BW field may be included in the EHT-SIG-A field. The PPDU BW field may be a 4-bit or a 5-bit field for indicating the punctured channels and the puncturing mode. In some implementations, the PPDU BW field also may indicate which EHT-SIG content channel to demodulate.

In some implementations, for a 4-bit PPDU BW field, a PPDU BW field value of may indicate 20 MHz channel bandwidth (and no preamble puncturing). A PPDU BW field value of 1 may indicate 40 MHz channel bandwidth (and no preamble puncturing). A PPDU BW field value of 2 may indicate 80 MHz channel bandwidth (and no preamble puncturing). A PPDU BW field value of 3 may indicate 160 MHz channel bandwidth or MHz subband bandwidths (and no preamble puncturing). A PPDU BW field value of 4 may indicate 320 MHz channel bandwidth or 160+160 MHz subband bandwidths (and no preamble puncturing). A PPDU BW field value of 5 may indicate 80 MHz channel bandwidth and that only the secondary 20 MHz subchannel is punctured. A PPDU BW field value of 6 may indicate 80 MHz channel bandwidth and that the primary 40 MHz subchannel is not punctured. A PPDU BW field value of 7 may indicate 160 MHZ channel bandwidth or MHz subband bandwidths and that only the secondary 20 MHz subchannel is punctured in the primary 80 MHz subband. A PPDU BW field value of 8 may indicate 160 MHz channel bandwidth or 80+80 MHz subband bandwidths and that the primary 40 MHz subchannel is not punctured in the primary 80 MHz subband. A PPDU BW field value of 9 may indicate 320 MHz channel bandwidth or 160+160 MHz subband bandwidths and that only the secondary 20 MHz subchannel is punctured in the primary 80 MHz subband. A PPDU BW field value of 10 may indicate 320 MHz channel bandwidth or 160+160 MHz subband bandwidths and that the primary 40 MHz subchannel is not punctured in the primary 80 MHz subband.

In some implementations, for a 5-bit PPDU BW field, a PPDU BW field value of 0 may indicate 20 MHz channel bandwidth (and no preamble puncturing). A PPDU BW field value of 1 may indicate 40 MHz channel bandwidth (and no preamble puncturing). A PPDU BW field value of 2 may indicate 80 MHz channel bandwidth (and no preamble puncturing). A PPDU BW field value of 3 may indicate 160 MHz channel bandwidth or 80+80 MHz subband bandwidths (and no preamble puncturing). A PPDU BW field value of 4 may indicate 320 MHz channel bandwidth or 160+160 MHz subband bandwidths (and no preamble puncturing). A PPDU BW field value of 5 may indicate 80 MHz channel bandwidth and that only the secondary 20 MHz subchannel is punctured. A PPDU BW field value of 6 may indicate 80 MHz channel bandwidth and that the primary 40 MHz subchannel is not punctured. A PPDU BW field value of 7 may indicate 160 MHz channel bandwidth or 80+80 MHz subband bandwidths and that only the secondary 20 MHz subchannel is punctured in the primary 80 MHz subband. A PPDU BW field value of 8 may indicate 160 MHz channel bandwidth or 80+80 MHz subband bandwidths and that the primary 40 MHz subchannel is not punctured in the primary 80 MHz subband. A PPDU BW field value of 9 may indicate 320 MHz channel bandwidth or 160+160 MHz subband bandwidths and that only the secondary 20 MHz subchannel is punctured in the primary 80 MHz subband. A PPDU BW field value of 10 may indicate 320 MHz channel bandwidth or 160+160 MHz subband bandwidths and that the primary 40 MHz subchannel is not punctured in the primary 80 MHz subband. A PPDU BW field value of 11 may indicate 80 MHz channel bandwidth and that only the primary 40 MHz subchannel is punctured (secondary 20 MHz subchannel is punctured). A PPDU BW field value of 12 may indicate 80 MHz channel bandwidth and that the secondary 20 MHz subchannel and tertiary 20 MHz subchannel are not punctured, but the primary 20 MHz subchannel is punctured (secondary 20 MHz subchannel is not punctured). A PPDU BW field value of 13 may indicate 160 MHz channel bandwidth or 80+80 MHz subband bandwidths and that only the primary 40 MHz subchannel is punctured in the primary 80 MHz subband. A PPDU BW field value of 14 may indicate 160 MHz channel bandwidth or 80+80 MHz subband bandwidths and that the secondary 20 MHz subchannel and tertiary 20 MHz subchannel are not punctured, but the primary 20 MHz subchannel is punctured. A PPDU BW field value of 15 may indicate 320 MHz channel bandwidth and that only the primary 40 MHz subchannel is punctured in the primary 80 MHz subband. A PPDU BW field value of 16 may indicate 320 MHz channel bandwidth and that the secondary 20 MHz subchannel and tertiary 20 MHz subchannel are not punctured, but the primary 20 MHz subchannel is punctured.

In some implementations, instead of the PPDU BW field, a punctured channel bitmap may be used to indicate the punctured subchannels and the puncturing mode. In some implementations, the punctured channel bitmap may be included in an N-bit field of the U-SIG. In some implementations, the punctured channel bitmap may be included in an N-bit field of the EHT-SIG. In some implementations, the number of bits (N) of the N-bit field may be based on the total bandwidth and the puncturing granularity (B), where the product of N and B equals the total bandwidth. For example, if the total bandwidth is 320 MHz, and the granularity is 20 MHz, then 16 bits will be used (N=16). Thus, every 80 MHz or 160 MHz subband may have the 16-bit field to indicate a punctured channel bitmap. In some implementations, the puncturing granularity (B) may be signaled using one bit, in order to indicate either a 20 MHz or a 40 MHz granularity. In some implementations, the PPDU BW field value may indicate the puncturing granularity (B) without additional signaling.

In some implementations, the N-bit field with the punctured channel bitmap is not duplicated for each subband (such as the 80 MHz or 160 MHz subbands), and instead each subband may include a different N-bit field with its own punctured channel bitmap. In some implementations, for each subband, the number of bits (N) of the N-bit field may be based on the subband bandwidth and the puncturing granularity (B), where the product of N and B equals the subband bandwidth. For example, if the subband bandwidth is 80 MHz, and the granularity is 20 MHz, then 4 bits will be used (N=4). If the subband bandwidth is 160 MHz, and the granularity is 20 MHz, then 8 bits will be used (N=8). In some implementations, an intended receiving STA may look at all of the 80 MHz or 160 MHz subbands for the pertinent punctured channel bitmaps due to parallelization.

Multi-AP Transmissions and Beamforming

In some implementations, signaling for multi-AP coordinated beamforming (CBF) and joint transmission may be included. In some implementations, sounding and feedback may be provided in advance for both signaling for multi-AP CBF and for joint transmission. In some implementations, multi-AP CBF may form nulls to unintended receivers via precoding. Each CBF PPDU may act like a single BSS PPDU without OBSS interference. The beamformed portion of the PPDU may be protected by nulling of OBSS interference. In some implementations, beamforming may be performed from the beginning of the packet (including the legacy portion of preamble), and the beam change bit may be set to zero to indicate the beamforming was performed from the beginning of packet. When the beam change bit is set to one, then it indicates the legacy portion and the non-legacy portion are using different beams and different beamforming. In some implementations, in 11be, the beam change bit may be included in the U-SIG or in the EHT-SIG. In some implementations, Multi-AP joint transmission uses beamforming from multiple APs to intended receivers. The Multi-AP JT sequence may be triggered-based and makes sure all participating APs and STAs (in responding packets) are synchronized in time, frequency, and phase. Each JT PPDU may use a triggered PPDU, where a lot of signaling information is known from trigger. The beamformed portion of the PPDU may have JT gain benefits. A special BSS color may be assigned to the JT sequence so that all participating APs use this BSS color. In some implementations, beamforming may be performed from the beginning of the packet (including the legacy part), and there may not be a beam change bit in the signaling.

Figure 17:
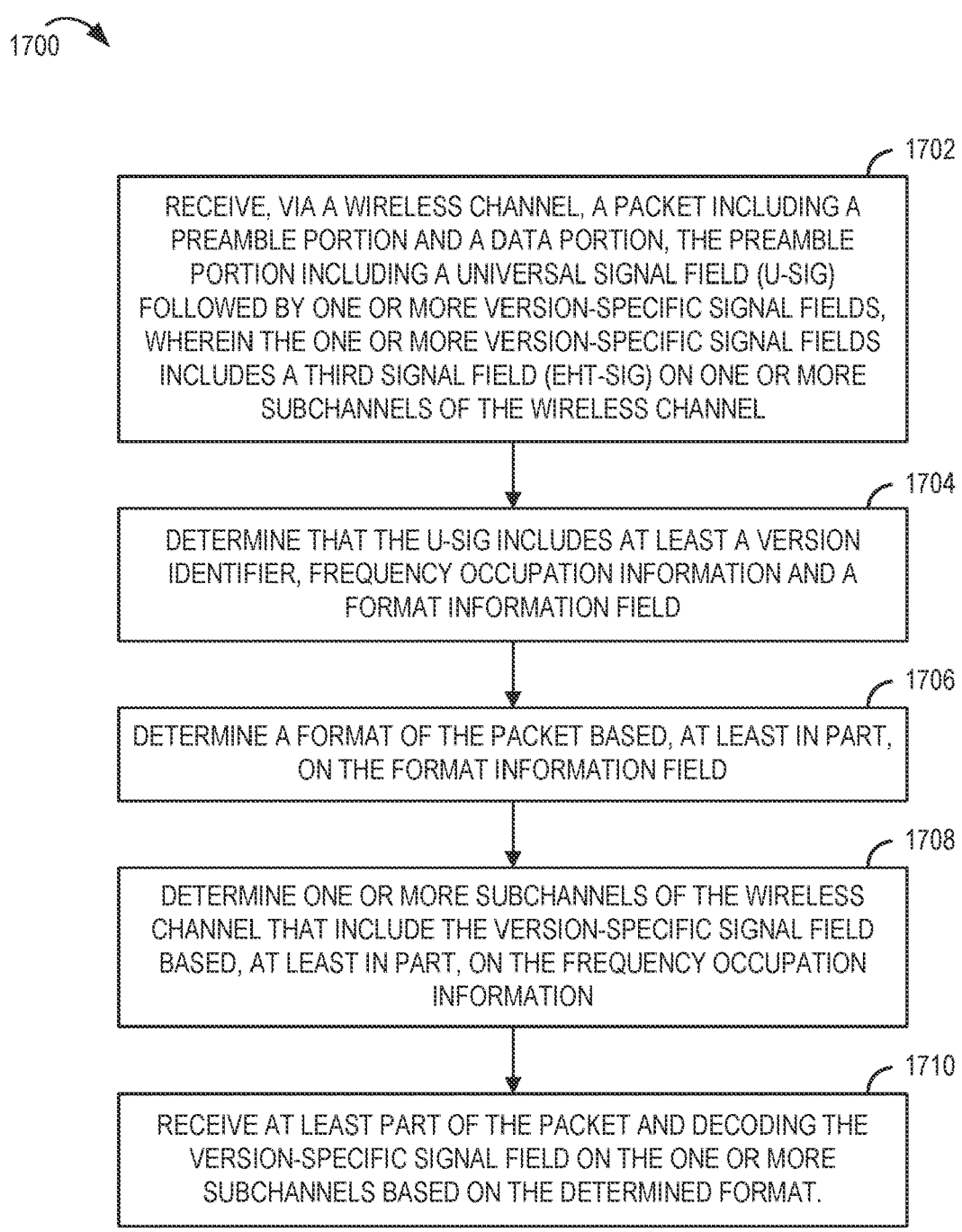
FIG. 17 shows a flowchart illustrating an example process for receiving a wireless communication according to some implementations.

FIG. 17 shows a flowchart illustrating an example process 1700 for receiving a wireless communication according to some implementations. The process 1700 may be performed by a wireless communication device such as the wireless communication device 800 described above with reference to FIG. 8. In some implementations, the process 1700 may be performed by a wireless communication device operating as or within an AP, such as one of the APs 102 and 902 described above with reference to FIGS. 1 and 9A, respectively. In some implementations, the process 1700 may be performed by a wireless communication device operating as or within a STA, such as one of the STAs 104 and 904 described above with reference to FIGS. 1 and 9B, respectively.

In some implementations, the process 1700 begins in block 1702 with receiving, via a wireless channel, a packet including a preamble portion and a data portion. The preamble portion including a universal signal field (U-SIG) followed by one or more version-specific signal fields. The one or more version-specific signal fields includes a third signal field (EHT-SIG) on one or more subchannels of the wireless channel.

In block 1704, the process 1700 proceeds with determining that the U-SIG includes at least a version identifier, frequency occupation information and a format information field.

In block 1706, the process 1700 proceeds with determining a format of the packet based, at least in part, on the format information field.

In block 1708, the process 1700 proceeds with determining one or more subchannels of the wireless channel that include the version-specific signal field based, at least in part, on the frequency occupation information.

In block 1710, the process 1700 proceeds with receiving at least part of the packet and decoding the version-specific signal field on the one or more subchannels based on the determined format.

Figure 18:
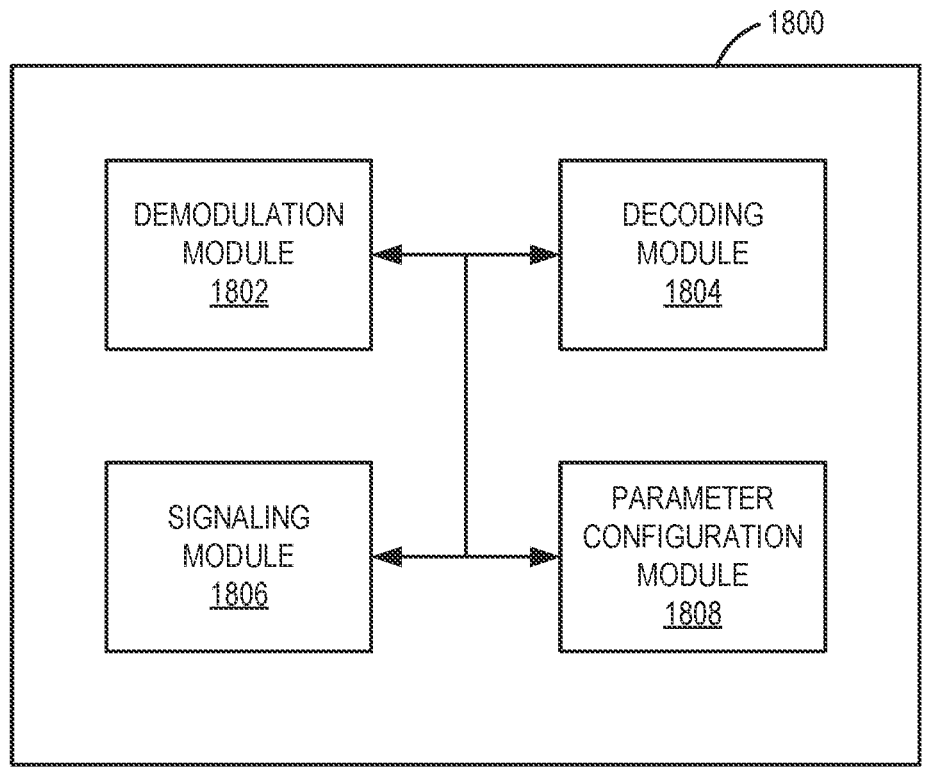
FIG. 18 shows a block diagram of an example wireless communication device according to some implementations.

FIG. 18 shows a block diagram of an example wireless communication device 1800 according to some implementations. In some implementations, the wireless communication device 1800 is configured to perform one or more of the processes described above. The wireless communication device 1800 may be an example implementation of the wireless communication device 800 described above with reference to FIG. 8. For example, the wireless communication device 1800 can be a chip, SoC, chipset, package or device that includes at least one processor and at least one modem (for example, a Wi-Fi (IEEE 802.11) modem or a cellular modem). In some implementations, the wireless communication device 1800 can be a device for use in an AP, such as one of the APs 102 and 902 described above with reference to FIGS. 1 and 9A, respectively. In some implementations, the wireless communication device 1800 can be a device for use in a STA, such as one of the STAs 104 and 904 described above with reference to FIGS. 1 and 9B, respectively. In some other implementations, the wireless communication device 1800 can be an AP or a STA that includes such a chip, SoC, chipset, package or device as well as at least one transmitter, at least one receiver, and at least one antenna.

The wireless communication device 1800 includes a demodulation module 1802, a decoding module 1804, a signaling module 1806 and a parameter configuration module 1808. Portions of one or more of the modules 1802, 1804, 1806 and 1808 may be implemented at least in part in hardware or firmware. For example, the demodulation module 1802, the decoding module 1804, the signaling module 1806 and the parameter configuration module 1808 may be implemented at least in part by a modem (such as the modem 802). In some implementations, portions of some of the modules 1802, 1804, 1806 or 1808 may be implemented at least in part as software stored in a memory (such as the memory 808). For example, portions of one or more of the modules 1802, 1804, 1806 or 1808 can be implemented as non-transitory instructions (or "code") executable by a processor (such as the processor 806) to perform the functions or operations of the respective module.

The demodulation module 1802 is configured to receive a packet including a physical layer preamble that includes a first portion and a second portion following the first portion. The packet may further include a payload after the preamble. The demodulation module 1802 is configured to demodulate the symbols in the received packet and to determine the modulation scheme that was used to module the symbols. In some implementations, the packet may be an example of the PPDU 1000 described with reference to FIG. 10. As described above, in such implementations, the first portion includes a first signal field (L-SIG) and the second portion includes a repeat of L-SIG (RL-SIG) that immediately follows L-SIG. In some implementations, RL-SIG may be masked with a masking sequence and the demodulation module 1802 is further configured to unmask RL-SIG before demodulating it. The second portion further includes at least one additional signal field after RL-SIG. For example, the second portion of the preamble may include a new signal field (U-SIG), such as U-SIG 1016. The second portion may further include additional third signal fields such as EHT-SIG.

The decoding module 1804 is configured to decode the bits in the demodulated symbols and to interpret bits in the decoded bits based on a WLAN communication protocol.

The signaling module 1806 is configured to interpret signal fields of the packet in accordance with the implementations described above. For example, the signaling module 1806 may interpret signal fields using parallelization for different subbands or different subchannels of the wireless channel. The signaling module 1806 may interpret signaling regarding different content channels that follow the RL-SIG or the U-SIG. The signaling module 1806 may interpret an EHT-SIG based on a format information field in the U-SIG.

The parameter configuration module 1808 is configured to set, based on at least one interpreted bit received from the decoding module 1804, at least one reception parameter for the packet. For example, the parameter configuration module 1808 may set parameters including one or more of a channel bandwidth parameter, a spatial stream setting, and a modulation order for receiving the packet.

Figure 19:
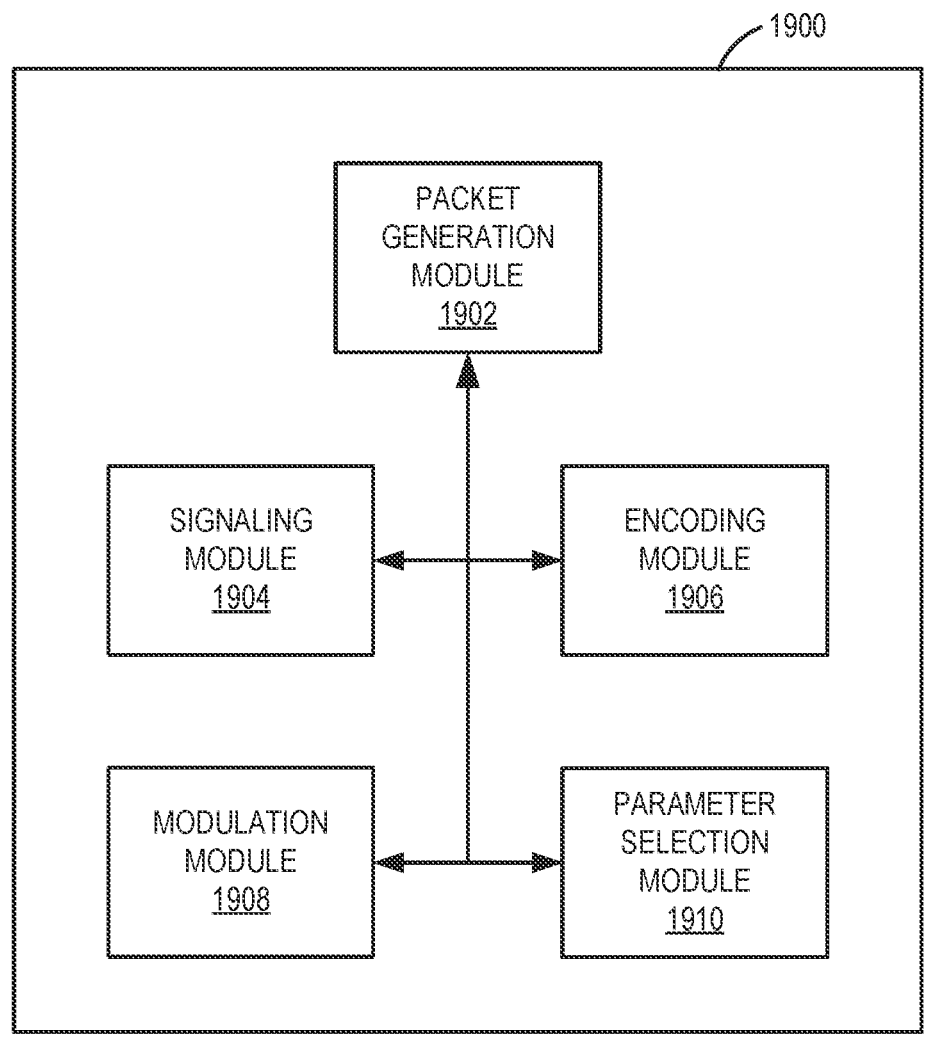
FIG. 19 shows a block diagram of an example wireless communication device according to some implementations.

FIG. 19 shows a block diagram of an example wireless communication device 1900 according to some implementations. In some implementations, the wireless communication device 1900 is configured to perform one or more of the processes described above. The wireless communication device 1900 may be an example implementation of the wireless communication device 800 described above with reference to FIG. 8. For example, the wireless communication device 1900 can be a chip, SoC, chipset, package or device that includes at least one processor and at least one modem (for example, a Wi-Fi (IEEE 802.11) modem or a cellular modem). In some implementations, the wireless communication device 1900 can be a device for use in an AP, such as one of the APs 102 and 902 described above with reference to FIGS. 1 and 9A, respectively. In some implementations, the wireless communication device 1900 can be a device for use in a STA, such as one of the STAs 104 and 904 described above with reference to FIGS. 1 and 9B, respectively. In some other implementations, the wireless communication device 1900 can be an AP or a STA that includes such a chip, SoC, chipset, package or device as well as at least one transmitter, at least one receiver, and at least one antenna.

The wireless communication device 1900 includes a packet generation module 1902, a signaling module 1904, an encoding module 1906, a modulation module 1908 and a parameter selection module 1910. Portions of one or more of the modules 1902, 1904, 1906, 1908 and 1910 may be implemented at least in part in hardware or firmware. For example, the packet generation module 1902, the signaling module 1904, the encoding module 1906, the modulation module 1908 and the parameter selection module 1910 may be implemented at least in part by a modem (such as the modem 802). In some implementations, portions of some of the modules 1902, 1904, 1906, 1908 or 1910 may be implemented at least in part as software stored in a memory (such as the memory 808). For example, portions of one or more of the modules 1902, 1904, 1906 or 1908 can be implemented as non-transitory instructions (or "code") executable by a processor (such as the processor 806) to perform the functions or operations of the respective module.

The packet generation module 1902 is configured to generate a packet including a physical layer preamble that includes a first portion and a second portion following the first portion. The packet may further include a payload after the preamble. In some implementations, the packet may be an example of the PPDU 1000 described with reference to FIG. 10. As described above, in such implementations, the first portion includes a first signal field (L-SIG) and the second portion includes a repeat of L-SIG (RL-SIG) that immediately follows L-SIG. In some implementations, the packet generation module 1902 may be configured to mask RL-SIG with a masking sequence. The second portion further includes at least one additional signal field after RL-SIG. For example, the second portion of the preamble may include a new signal field (U-SIG), such as U-SIG 1016. The second portion may further include additional third signal field such as the EHT-SIG).

The signaling module 1904 is configured to prepare signal fields for the packet in accordance with the implementations described above. For example, the signaling module 1904 may prepare signal fields using parallelization for different subbands or different subchannels of the wireless channel. The signaling module 1904 may determine and prepare signaling regarding different content channels that follow the RL-SIG or the U-SIG.

The modulation module 1908 is configured to modulate the symbols in the generated packet. The parameter selection module 1910 is configured to select at least one transmit parameter for the packet. For example, the parameter selection module 1910 may set parameters including one or more of a channel bandwidth, a spatial stream setting, and a modulation order for transmitting the packet.

Figure 20:
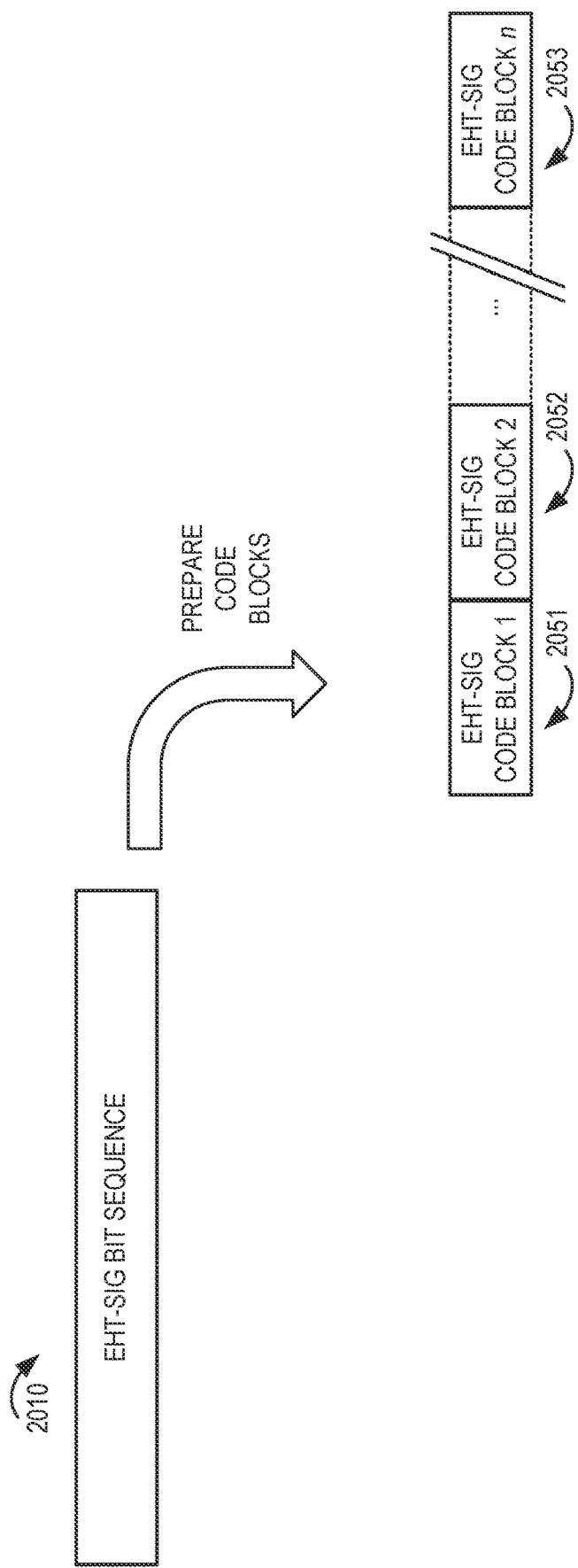
FIG. 20 shows an example of encoding an EHT-SIG using code blocks according to some implementations.

FIG. 20 shows an example of encoding an EHT-SIG using code blocks according to some implementations. An EHT-SIG bit sequence 2010 may be prepared according to any of the example EHT-SIG options described herein. For example, the EHT-SIG bit sequence 2010 may include the EHT-SIG common bits, including bits overflowed from the U-SIG and RU allocation information. The EHT-SIG bit sequence 2010 also may include the user specific fields. The EHT-SIG bit sequence 2010 may be divided into code blocks (also referred to as chunks) that are separately encoded to form EHT-SIG code blocks, such as EHT-SIG Code blocks 1-n 2051, 2052, and 2053. In some implementations, the encoding process for each code block may include adding a CRC and tail. The code block sizes of different code blocks may vary. A receiver may retrieve the code blocks and decode each code block separately, combining them at the receiver to recover the EHT-SIG bit sequence 2010.

One reason for preparing EHT-SIG code blocks is to enable the use of existing 20 MHz decoders used for preamble processing. The use of EHT-SIG code blocks also may enable different options for painting the EHT-SIG over a bandwidth portion of the wireless channel. FIGS. 21-25 provide some example painting schemes and variations based on the EHT-SIG code blocks 1-n described in FIG. 20.

Figure 21:
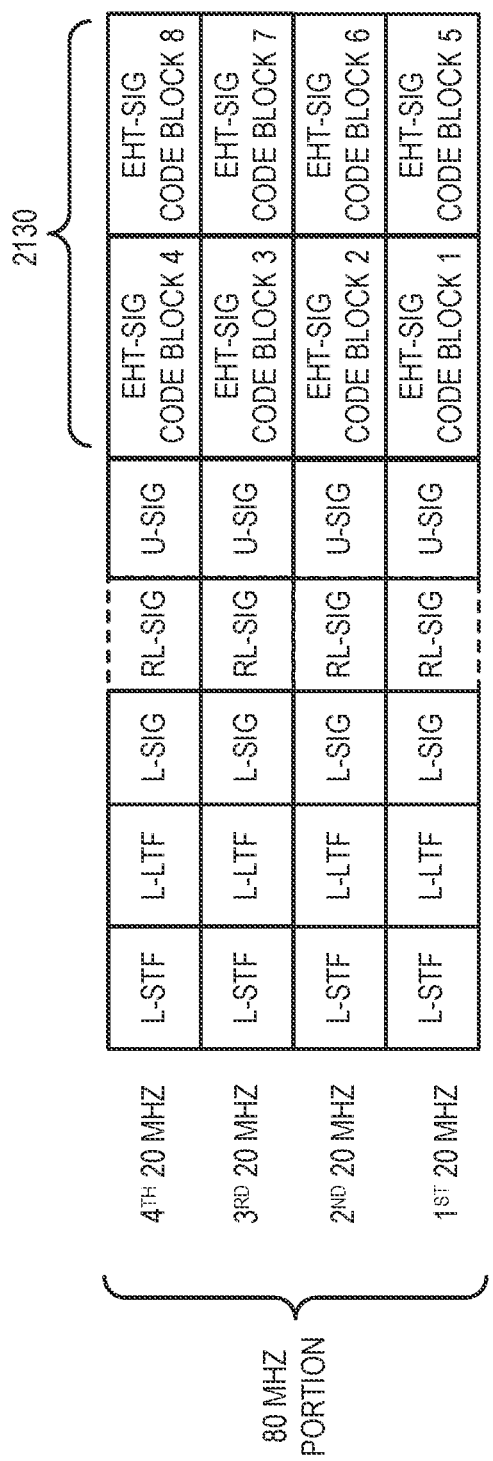
FIG. 21 shows an example painting scheme with EHT-SIG code blocks according to some implementations.

FIG. 21 shows an example painting scheme with EHT-SIG code blocks according to some implementations. Each 80 MHz portion may have different EHT-SIG bit sequences that are used to generate EHT-SIG code blocks for that 80 MHz portion. A first EHT-SIG code block 1 2151 may begin at a lowest 20 MHz bandwidth subchannel of the 80 MHz portion. From that starting point, the EHT-SIG code blocks may be painted sequentially to populate the remaining 20 MHz bandwidth subchannels. Once the fourth 20 MHz bandwidth subchannel is populated with EHT-SIG code block 4, the next EHT-SIG code block 5 may be painted in the first 20 MHz bandwidth subchannel and the pattern repeats until all the EHT-SIG code blocks have been painted into the available subchannels within each 80 MHz BW portion. The collection of all the EHT-SIG code blocks 1-n (1-8 in the example shown in FIG. 21) may collectively carry the EHT-SIG signaling 2130 for that MHz portion of the wireless channel.

Figure 22:
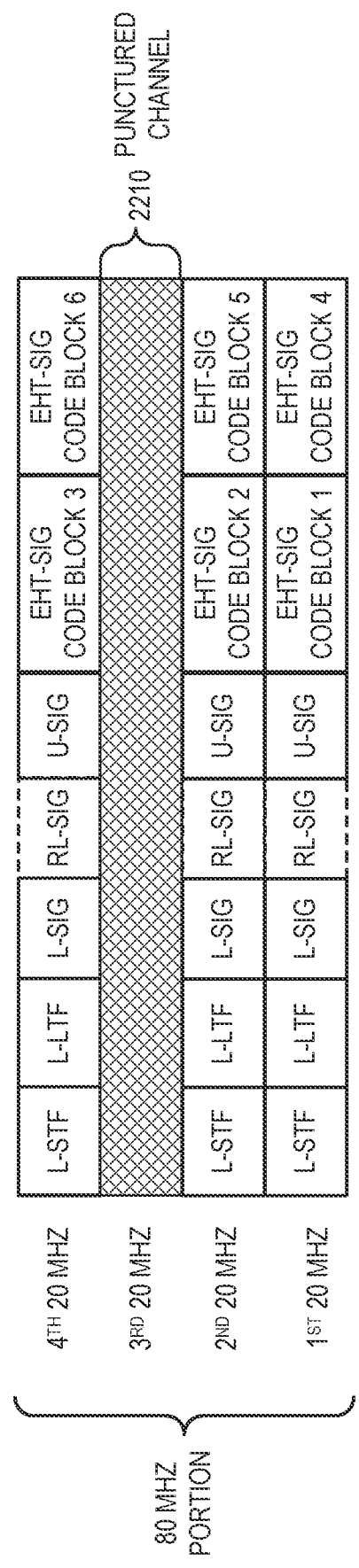
FIG. 22 shows an example painting scheme with EHT-SIG code blocks when a subchannel is punctured according to some implementations.

FIG. 22 shows an example painting scheme with EHT-SIG code blocks when a subchannel is punctured according to some implementations. In the example of FIG. 22, the third 20 MHz subchannel is punctured (shown as punctured channel 2210). In this example, the painting scheme may skip the punctured channel 2210. For example, the EHT-SIG code block 3 would skip the punctured channel 2210 and would be painted in the 4th 20 MHz subchannel. Then the painting pattern would return to the first 20 MHz subchannel to paint the EHT-SIG code block 4.

Figure 23:
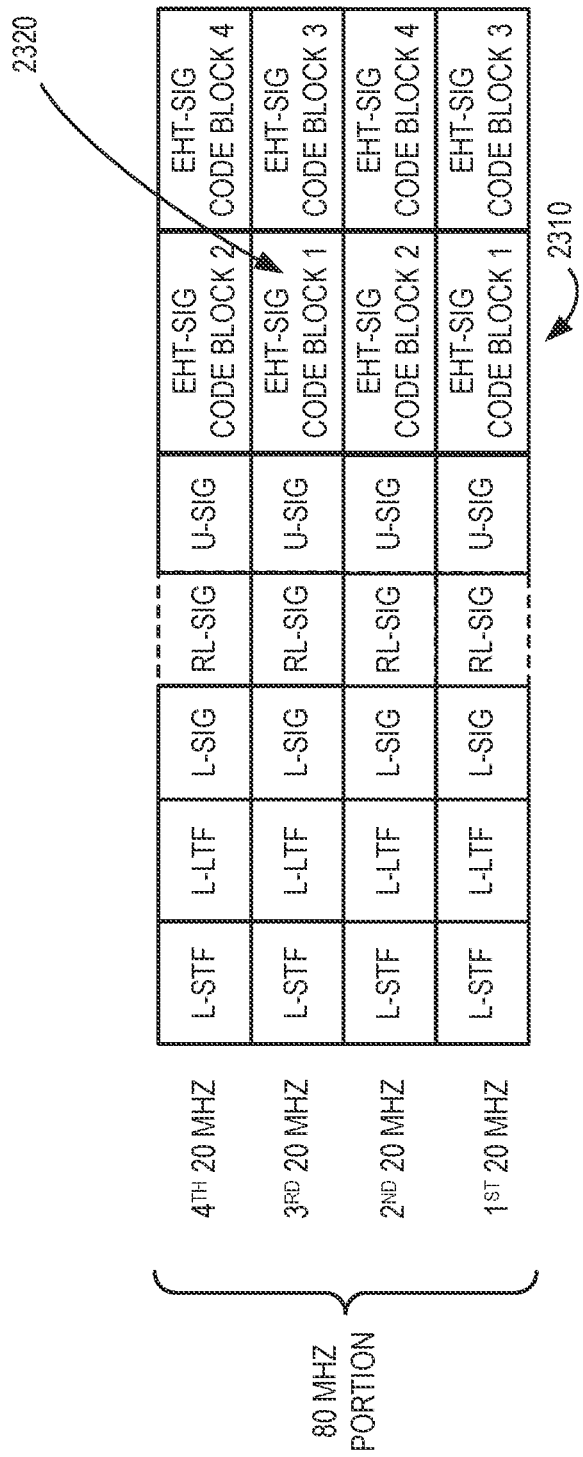
FIG. 23 shows an example painting scheme with EHT-SIG code blocks using two content channels according to some implementations.

FIG. 23 shows an example painting scheme with EHT-SIG code blocks using two content channels according to some implementations. This example is similar to a [1 2 1 2] content channel structure. The EHT-SIG code block 1 may be painted in the first 20 MHz bandwidth subchannel (shown as code block 2310) and the third 20 MHz bandwidth subchannel (shown as code block 2320). Then the next code block (EHT-SIG code block 2) may be painted in the second 20 MHz bandwidth subchannel and the fourth 20 MHz bandwidth subchannel. Following that set of code blocks, the pattern would repeat for the remaining EHT-SIG code blocks. For example, the EHT-SIG code block 3 may be painted in the first 20 MHz bandwidth subchannel and the third 20 MHz bandwidth subchannel. Then, the next code block (EHT-SIG code block 4) may be painted in the second 20 MHz bandwidth subchannel and the fourth 20 MHz bandwidth subchannel. The [1 2 1 2] content channel structure may be used to transmit the EHT-SIG code blocks in two content channels. For example, a first content channel may include a first and third 20 MHz bandwidth subchannel, and a second content channel may include a second and fourth 20 MHz bandwidth subchannel. This structure may be useful, for example, for a receiver configured to use two 20 MHz decoders to decode the EHT-SIG code blocks in an 80 MHz portion of the wireless channel.

Figure 24:
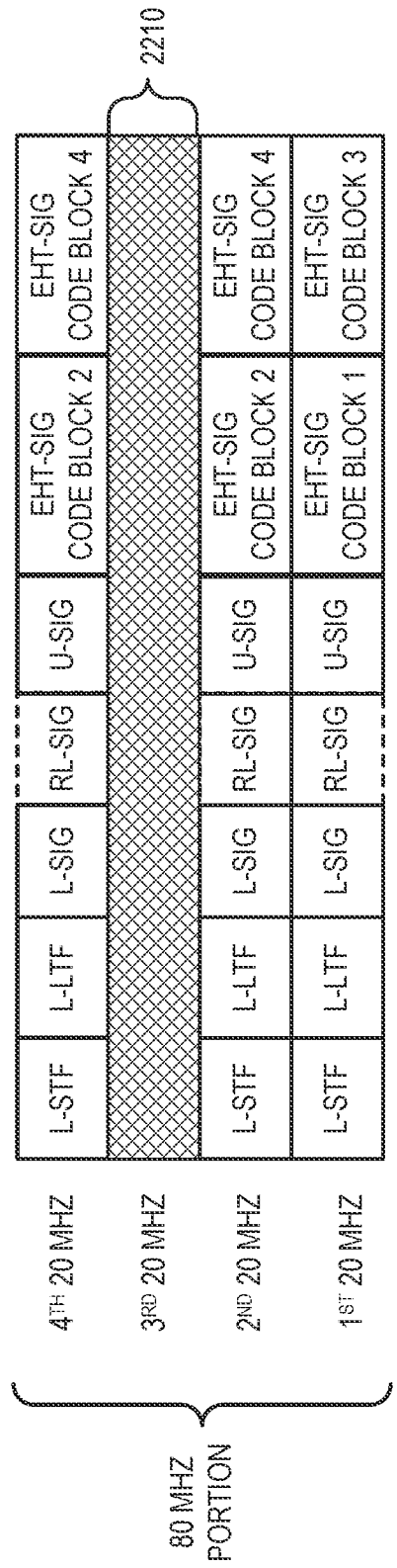
FIG. 24 shows an example painting scheme with EHT-SIG code blocks when a content channel includes a punctured subchannel according to some implementations.

FIG. 24 shows an example painting scheme with EHT-SIG code blocks when a content channel includes a punctured subchannel according to some implementations. Using the [1 2 1 2] content channel structure, the EHT-SIG code blocks may be painted in their expected subchannel regardless of the punctured channel 2210. The EHT-code blocks that would otherwise be painted in the punctured channel 2210 may be omitted.

Figure 25:
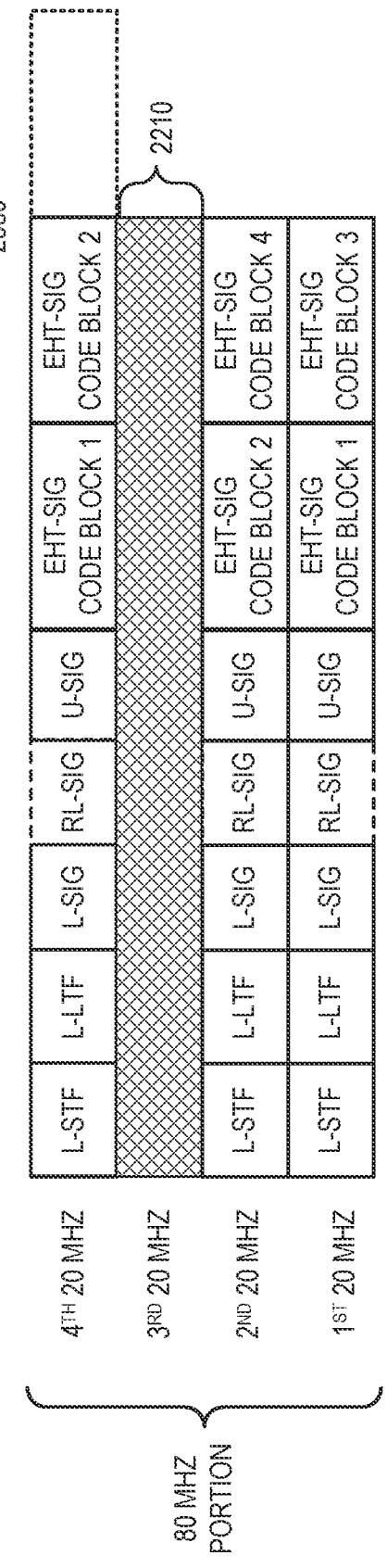
FIG. 25 shows another example painting scheme with EHT-SIG code blocks when a content channel includes a punctured subchannel according to some implementations.

FIG. 25 shows another example painting scheme with EHT-SIG code blocks when a content channel includes a punctured subchannel according to some implementations. In this example, the punctured channel 2210 may be skipped when painting the EHT-SIG code blocks within the [1 2 1 2] content channel structure. The painting of EHT-SIG code blocks 1-4 in the first pair of content channels (the first and second 20 MHz subchannels) is the same as described in FIGS. 23 and 24. However, because the first content channel in the second pair of content channels has a punctured channel 2210 in this example, the painting for the EHT-SIG code blocks may be different for that second content channel in that second pair of content channels. Rather than omit the punctured EHT-SIG code blocks (as described in FIG. 24), the EHT-SIG code blocks may be painted into the available second content channel. For example, EHT-SIG code block 1 followed by the EHT-SIG code block 2 are shown painted in the fourth 20 MHz bandwidth subchannel.

Due to the punctured channel 2210, the painting of EHT-SIG code blocks in the fourth 20 MHz bandwidth subchannel may extend 2580 the length of the EHT-SIG portion of the preamble. Thus, in some implementations, padding or repetition of code blocks may be added to the first pair of content channels so that the EHT-SIG portions for both pairs of content channels end at the same block.

Figure 26:
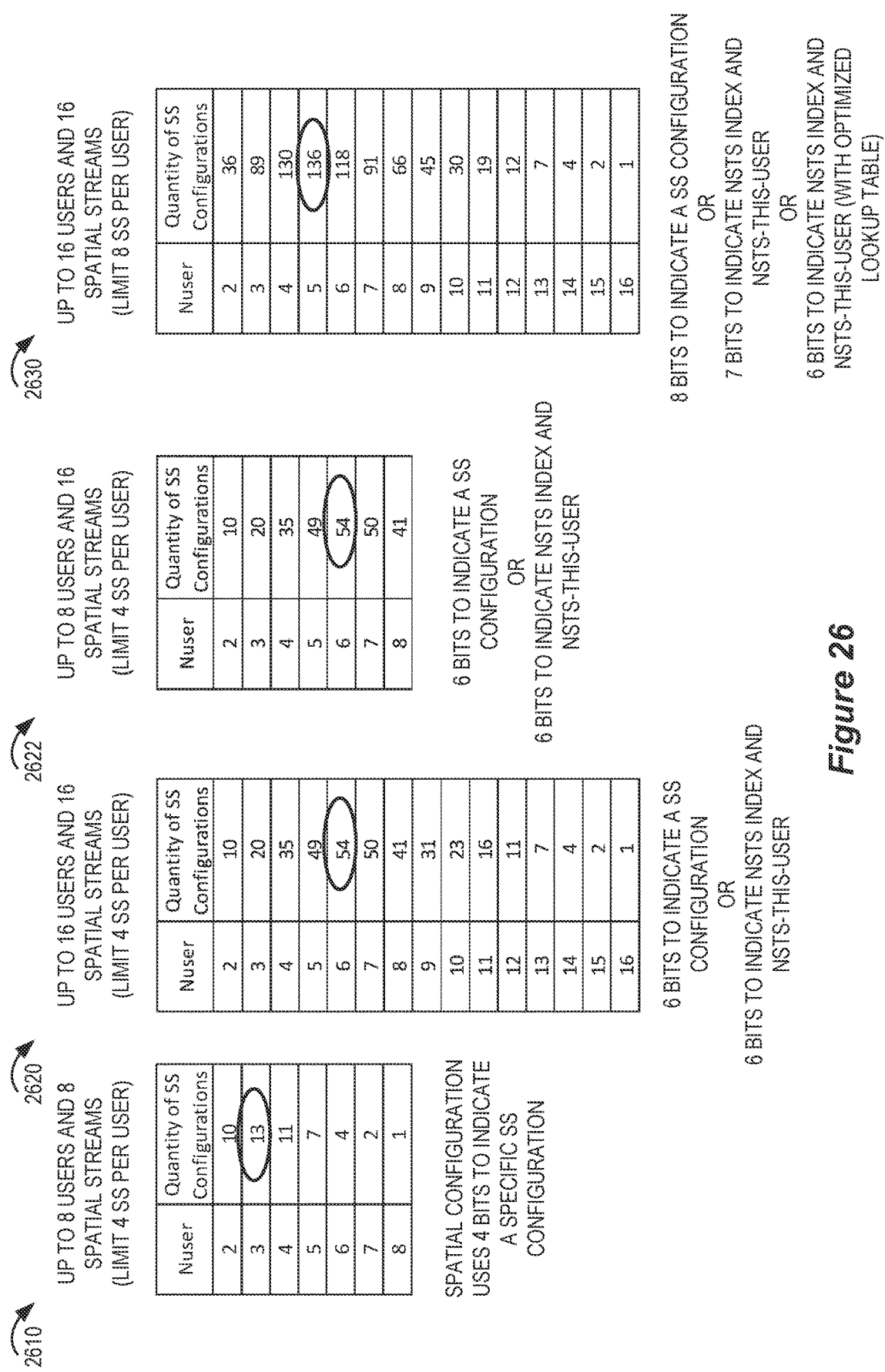
FIG. 26 shows example spatial stream scenarios that support up to 16 spatial streams according to some implementations.

FIG. 26 shows example spatial stream scenarios that support up to 16 spatial streams according to some implementations. The spatial stream scenarios may be used for MU-MIMO spatial stream configurations within RUs allocated in the EHT-SIG. A first table 2610 shows a legacy implementation in 11ax that supports up to 8 users and 8 spatial streams (with a limit of up to 4 spatial streams to an MU-MIMO user). The spatial configuration subfield may use a non-increasing order of NSTS for MU-MIMO users (for example, NSTS[i+1]<=NSTS[i], where i is the MU-MIMO user index). Depending on the number of users, there are a variety of configurations that the spatial streams can support. For example, if there are 8 users and 8 available spatial streams, there is only 1 possible configuration (each user gets 1 spatial stream). When there are 7 users and 8 available spatial streams, there are only 2 possible combinations (6 users each get 1 spatial stream, and 1 user gets either 1 or 2 spatial streams). The highest number of combinations occurs when there are 3 users and 8 available spatial streams.

Thus, for the first table 2610, since the maximum number of configurations that might be used with 8 spatial streams (depending on quantity of users) is 13, a 4 bit value can be used to identify which configuration is being used in a spatial stream configuration subfield in a user field of an EHT-SIG. By observing the number of devices and the spatial stream configuration, a device can determine which configuration is indicated. Further by observing the order of user fields in the EHT-SIG, the device can determine how many SS is allocated for it (from NSTS[1] for the first listed device, NSTS[2] for the second listed device, and so on).

Because IEEE 802.11be is expected to support up to 16 spatial streams, the quantity of spatial stream configurations increases significantly. For example, the second table 2620 shows the quantity of spatial stream configurations that may be possible when up to 16 users share up to 16 spatial streams and there is a maximum limit of up to 4 spatial streams per user. In a similar example, a third table 2622 shows the quantity of spatial stream configurations that may be possible when up to 8 users share up to 16 spatial streams and there is a maximum limit of up to 4 spatial streams per user. Table 16 provides an example of a spatial stream configuration with the entries associated with the third table 2622. The spatial configuration subfield may use a non-increasing order of NSTS for MU-MIMO users (for example, NSTS[i+1]<=NSTS[i], where i is the MU-MIMO user index). The highest quantity of spatial stream configurations may be 54 in a lookup table that supports up to 4 spatial streams per user and up to 8 users. To signal a value for the spatial stream configuration, 6 bits would be used in the spatial stream configuration subfield in the user field of the EHT-SIG. In yet another option, 6 bits would be used in the spatial configuration subfield in the user field of the EHT-SIG. The 6 bits include 4 bits (with value from 1 to 16) to indicate a starting spatial stream index (starting NSTS index) and then 2 bits (with value from 1 to 4) to indicate the number of spatial streams of this user (NSTS-this-user).

The fourth table 2630 shows the quantity of spatial stream configurations that may be possible with up to 16 users share up to 16 spatial stream and there is a maximum limit of up to 8 spatial streams per user. The spatial configuration subfield may use a non-increasing order of NSTS for MU-MIMO users (for example, NSTS[i+1]<=NSTS[i], where i is the MU-MIMO user index). The highest quantity of spatial stream configurations is 136, when there are 5 users sharing up to 16 available spatial streams. To signal a value for the spatial stream configuration, 8 bits would be used in the spatial stream configuration subfield in the user field of the EHT-SIG. In yet another option, 7 bits would be used in the spatial configuration subfield in the user field of the EHT-SIG. The 7 bits may include 4 bits (with value from 1 to 16) to indicate a starting spatial stream index (starting NSTS index) and then 3 bits (with value from 1 to 8) to indicate the number of spatial streams of this user (NSTS-this-user). In yet another option, the quantity of bits used to signal the spatial stream configuration may be reduced by optimizing the lookup table of spatial stream configurations in the previous option using 7 bits. For example, the lookup table may indicate all combinations of starting NSTS Index and NSTS-this-user, and the number of spatial streams may be arranged in a non-increasing order for the users (for example, NSTS[i+1]<=NSTS[i]). By doing so, it may be possible to use 6 bits in the spatial stream configuration subfield in the user field of the EHT-SIG to indicate the spatial stream configuration and NSTS for a particular user.

Figure 27:
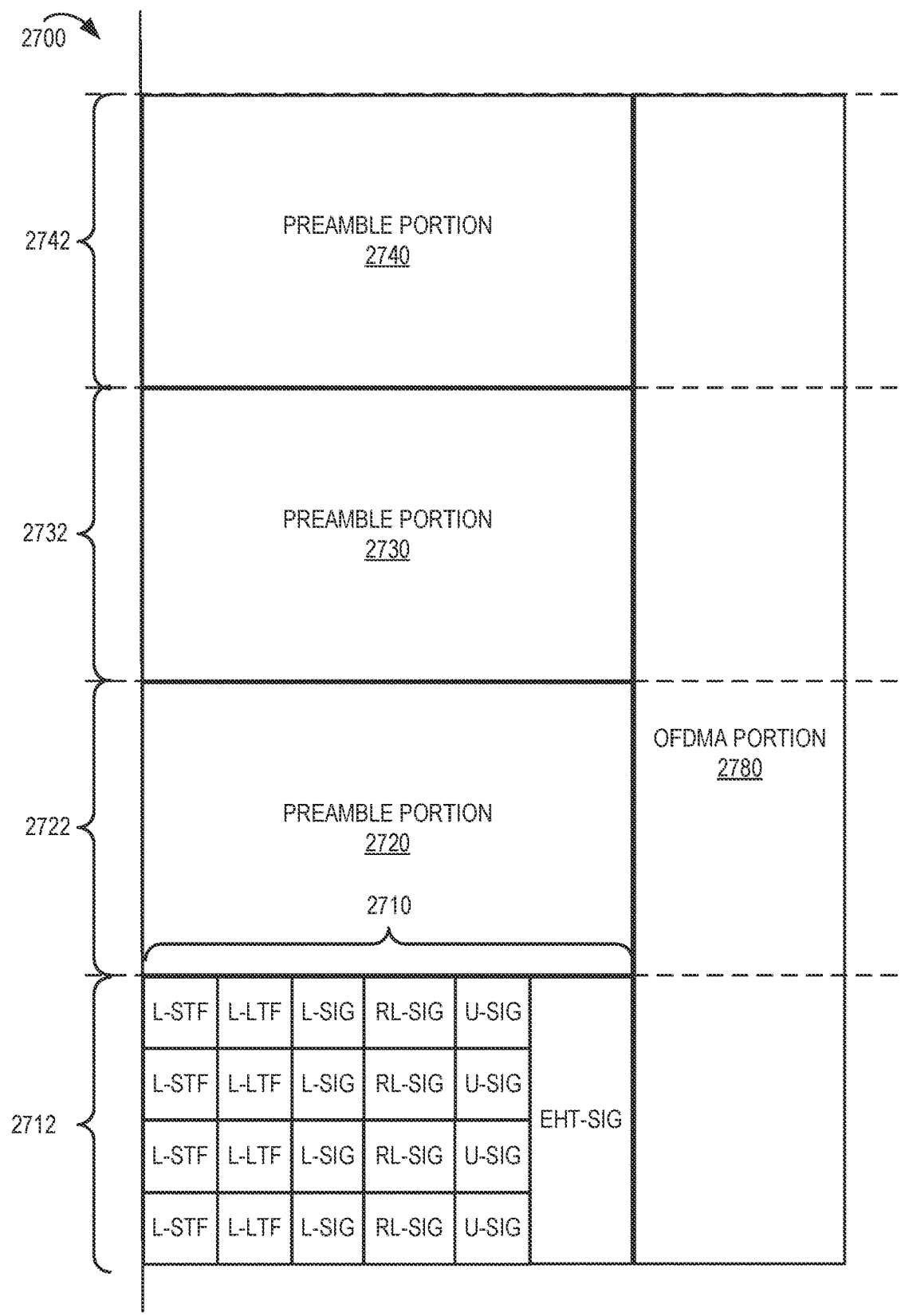
FIG. 27 shows an example in which EHT-SIG signaling may be modified to support OFDMA resource unit (RU) allocations in different 80 MHz bandwidth portions of a wireless channel according to some implementations.

FIG. 27 shows an example in which EHT-SIG signaling may be modified to support OFDMA RU allocations in different 80 MHz bandwidth portions of a wireless channel according to some implementations. The wireless channel 2700 in FIG. 27 may be 320 MHz bandwidth made up of four 80 MHz bandwidth portions 2712, 2722, 2732, and 2742. The techniques in this description are not limited to 320 MHz wireless channels, but the concepts may apply to any wireless channel that is made up of multiple 80 MHz bandwidth portions. Each 80 MHz bandwidth portion 2712, 2722, 2732, and 2742 may include a preamble portion 2710, 2720, 2730, and 2740, respectively. As described in this disclosure, some fields (such as the L-STF, L-LTF) of the preamble portions 2710, 2720, 2730, and 2740 may be the same for all 80 MHz bandwidth portions 2712, 2722, 2732, and 2742. Some fields (such as the L-SIG, RL-SIG, U-SIG, and EHT-SIG) may be different for each 80 MHz bandwidth portions 2712, 2722, 2732, and 2742. The preamble portions 2710, 2720, 2730, and 2740 may describe how resources units in the OFDMA portion 2780 may be allocated. For brevity, the first preamble portion 2710 is illustrated, but the other preamble portions 2720, 2730, and 2740 would have similar fields, albeit potentially different content for some fields.

In some implementations, a device may observe the preamble portion for a single MHz portion. For example, a STA that is parked or monitoring an 80 MHz bandwidth portion may obtain the signaling from the preamble in that 80 MHz bandwidth portion to determine which RUs of the preamble portion 2730 are assigned to it. However, the RU assignments may not be limited to the 80 MHz bandwidth portion on which that STA is parked or monitoring. For example, a STA may monitor the first preamble portion 2710 in the first 80 MHz bandwidth portion 2712 of the wireless channel. Based on signaling in the U-SIG and EHT-SIG in the first 80 MHz bandwidth portion of the wireless channel, that STA may determine that an RU assignment for it is assigned within the OFDMA portion 2730 in the second 80 MHz bandwidth portion 2722. In some implementations, the EHT-SIG in each MHz bandwidth portion may signal all the RU assignments for the entire bandwidth of the wireless channel. Alternatively, the EHT-SIG in each 80 MHz bandwidth portion may include signaling for that 80 MHz bandwidth portion as well as for any RU allocations that include a STA parked on that 80 MHZ bandwidth portion. To signal RU assignments in other 80 MHz bandwidth portions, the content of the EHT-SIG may be modified according to any one of the examples described in FIGS. 28-31. The examples in FIGS. 28-31 are based on RU allocations for OFDMA, possibly with one or more RU(s) assigned for MU-MIMO. However, some of the concepts may be applicable to RU allocations for non-OFDMA MU-MIMO.

Figure 28:
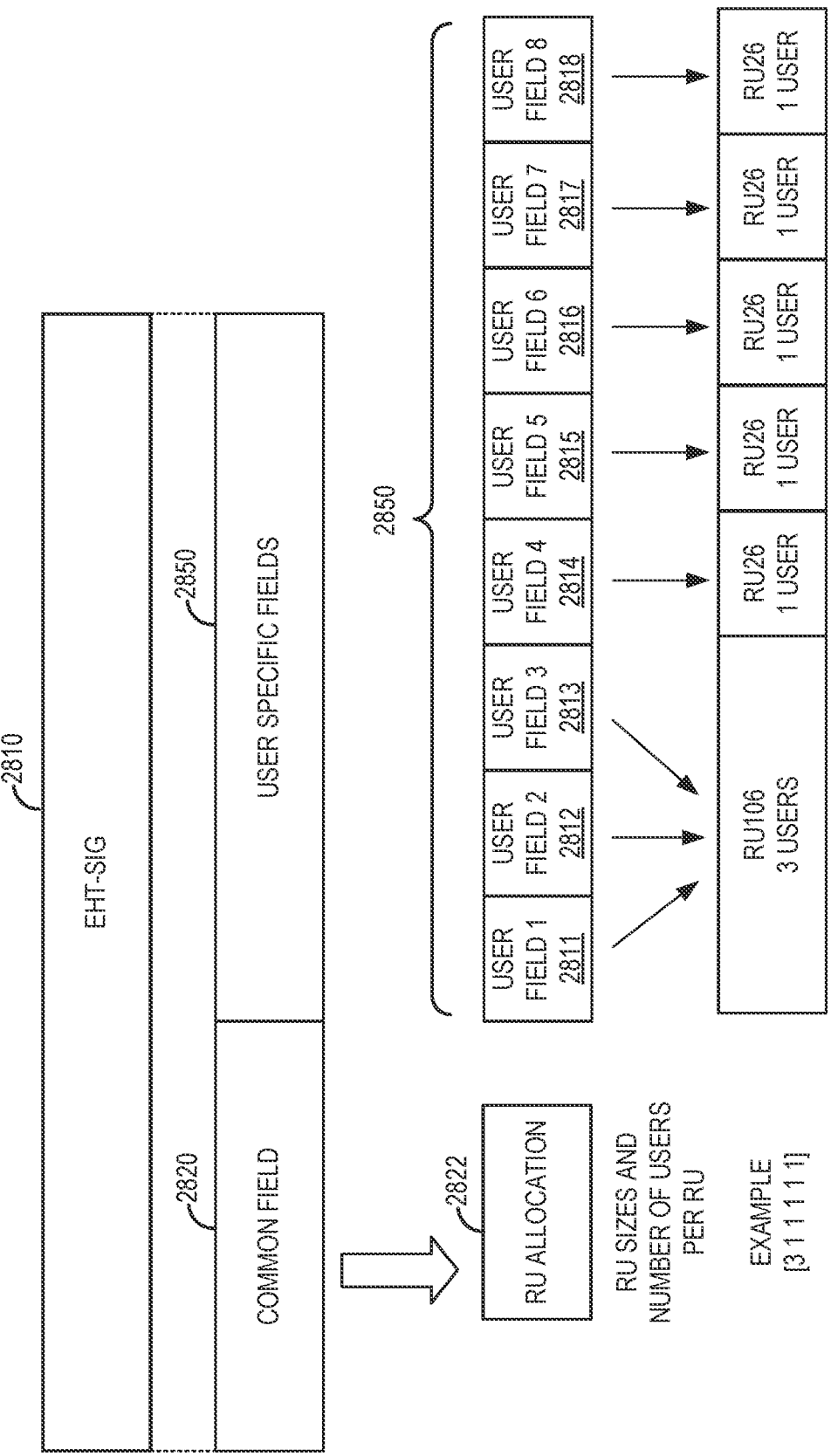
FIG. 28 shows an example resource unit (RU) allocation using user specific fields with RU assignments according to some implementations.

FIG. 28 shows an example RU allocation using user specific fields with RU assignments according to some implementations. The content of the EHT-SIG 2810 may include a common field 2820 and user specific fields 2850 as described elsewhere in this disclosure. The common field 2820 may include, among other subfields, an RU allocation 2822. The RU allocation 2822 describes the RU sizes within that 80 MHz bandwidth portion as well as the number of users in each RU. Currently, the mapping of user fields to the RU allocation is accomplished is based on the order of the user fields in the user specific fields 2850 portion of the EHT-SIG. For example, the RU allocation 2822 in FIG. 28 indicates that the 80 MHz bandwidth portion includes an RU106 shared by 3 users, and 5 RU26 assignments having 1 user each. The first three user fields 1-3 2811-2813 may be interpreted as the three users that share the RU106, while each of the remaining user fields 4-8 2814-2818 are each assigned to the next consecutive RU26 in the tone plan for that 80 MHz bandwidth portion. Thus, the order of the user fields in the user specific fields 2850 is used with the RU allocation 2822 to determine which RU is assigned to which user.

As described herein, the EHT-SIG for one 80 MHz bandwidth portion may include the RU allocation subfields and user fields for that 80 MHz bandwidth portion and also may include the RU allocation subfields and user fields for another 80 MHz bandwidth portion. This may be useful, for example, when a device is parked on one 80 MHz bandwidth portion and the RU assigned for that device is in another 80 MHz bandwidth portion. The inclusion of RU allocation subfields and user fields for other 80 MHz bandwidth portions also may be useful, for example, when RU assignments span 80 MHz bandwidth boundaries or when multiple RUs are assigned to a particular device.

Figure 29:
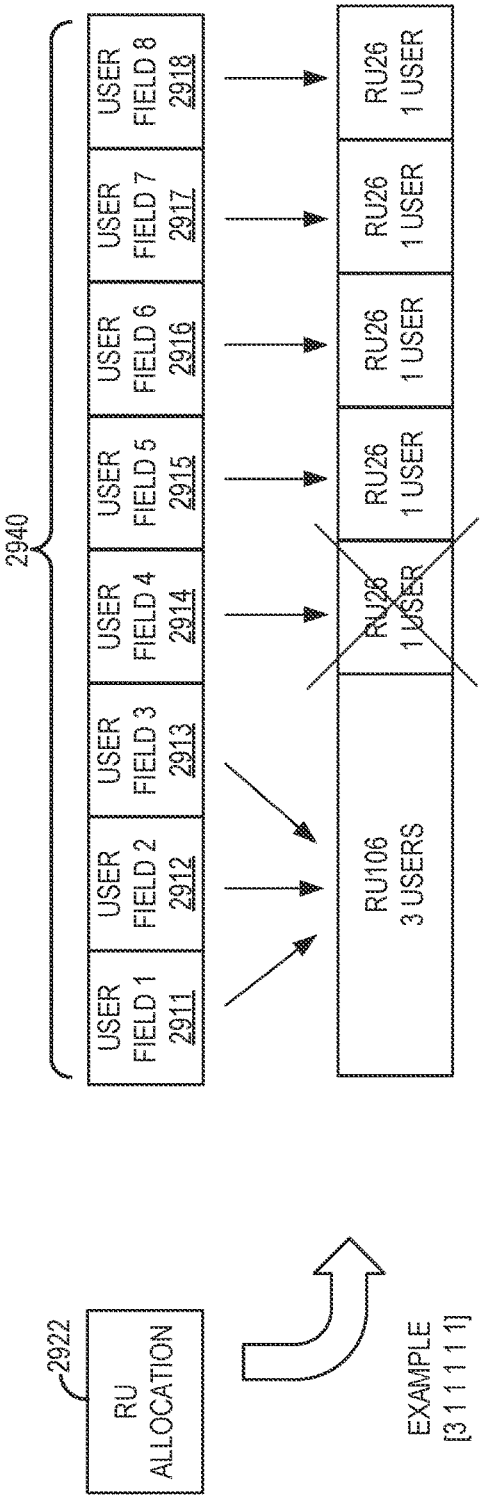
FIG. 29 shows an example RU allocation with user specific fields to maintain an order of RU assignments according to some implementations.

FIG. 29 shows an example RU allocation with user fields 2940 to maintain an order of RU assignments according to some implementations. As described with reference to FIG. 28, when any user is parked on an 80 MHz bandwidth portion, the EHT-SIG for that MHz bandwidth portion will include the RU assignment for that user even if the RU assignment is in a different 80 MHz bandwidth portion. To include the RU assignment for that user, the RU allocation subfield 2922 may include an RU allocation value that defines the RU sizes and number of users per RU in another 80 MHz bandwidth portion. To maintain a relationship between the order of user fields and the RU allocation subfield, in some implementations, whenever an EHT-SIG includes an RU allocation subfield within a different 80 MHz bandwidth portion, the EHT-SIG may also include the user fields for that RU allocation subfield. Using the example in FIG. 29, the RU allocation subfield 2922 of a MHz subchannel in a first 80 MHz bandwidth portion is for a different 80 MHz bandwidth portion but defines the same [3 1 1 1 1 1] RU allocation as described in FIG. 28. Even if the STA defined in user field 4 2914 is not parked on the first 80 MHz bandwidth portion, the user specific fields may include the user field 4 2914 in the user specific field so that an order of the user fields matches the RU allocation subfield.

Figure 30:
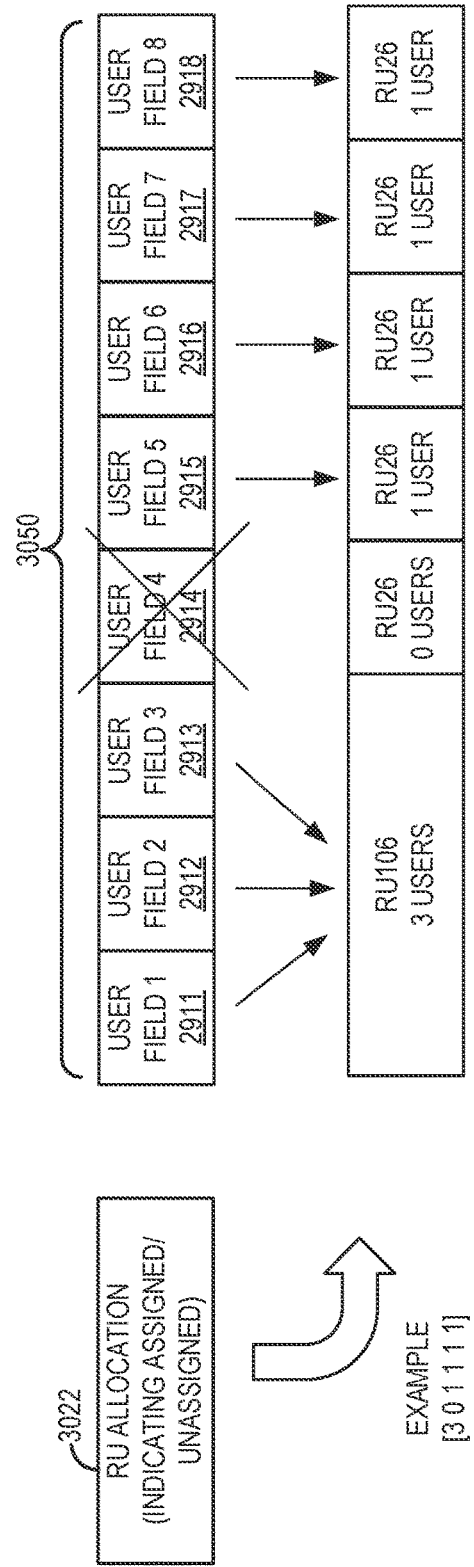
FIG. 30 shows an example RU allocation that may be used to eliminate some user specific fields according to some implementations.

FIG. 30 shows an example RU allocation that may be used to eliminate some user specific fields 3050 according to some implementations. For example, the first 80 MHz bandwidth portion may include an RU allocation subfield 3022 describing a 20 MHz subchannel in a second 80 MHz bandwidth portion. However, the RU allocation subfield 3022 may carry a different value [3 0 1 1 1 1] than the RU allocation described in FIG. 29. The RU allocation subfield 3022 may be defined with an "unassigned" indicator for a particular RU. The example in FIG. 30 shows the first RU26 is unassigned (0 in the RU allocation value, indicating zero users or unassigned RU). When an RU is unassigned, the user field that would otherwise be included for that RU may be omitted from the user specific fields. As shown in FIG. 30, the first RU26 is unassigned and the user field 4 2914 may be omitted from the user specific field.

An RU allocation table may be extended to indicate unassigned or omitted RUs in addition to the different sizes of RUs and quantities of users per RU. In some implementations, the RU allocation field of the EHT-SIG may be extended to include a subfield that indicates which RUs are assigned or unassigned. These variations may be used to reduce the quantity of user fields that are included in the user specific fields portion of an EHT-SIG.

Figure 31:
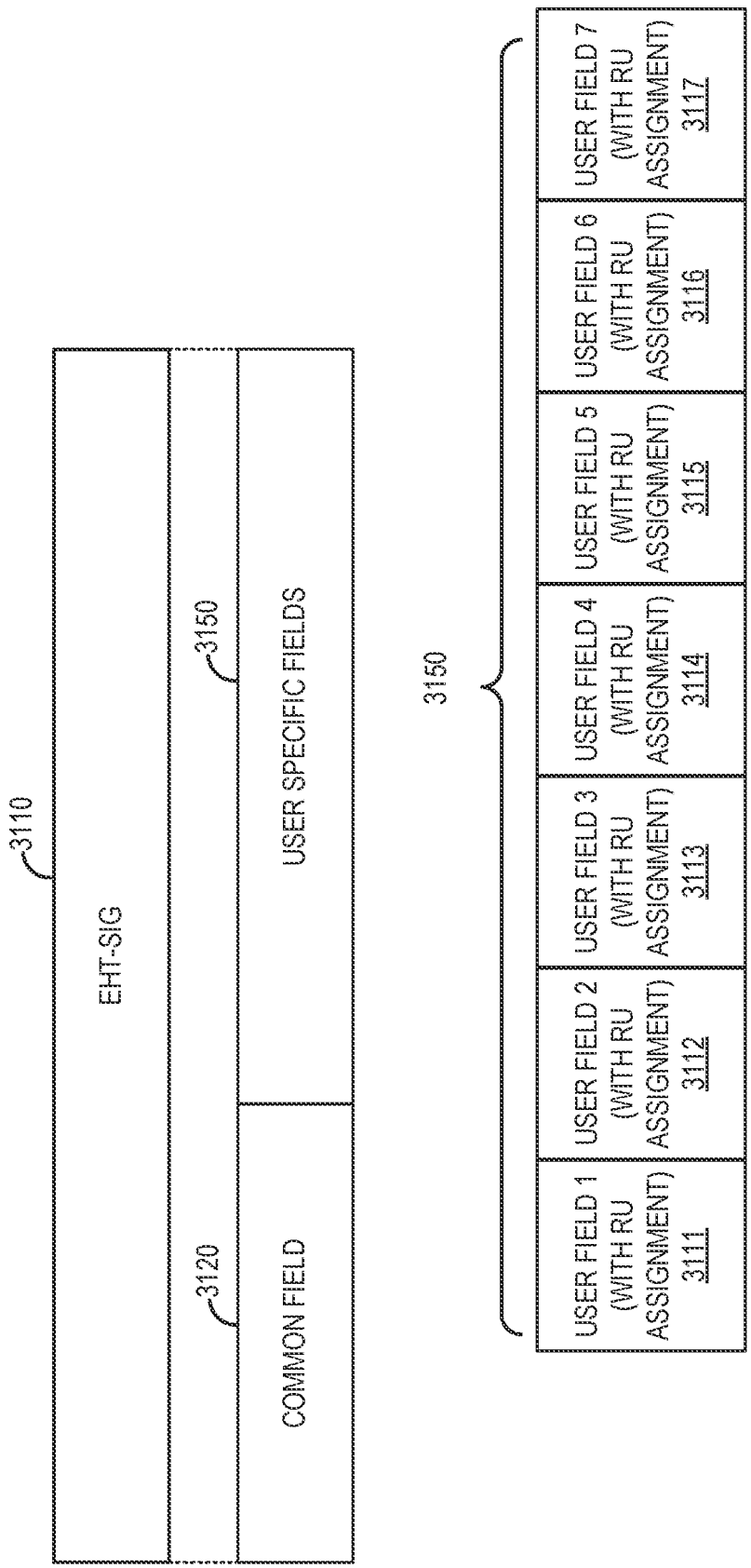
FIG. 31 shows an example RU allocation in which RU assignments are included in user specific fields according to some implementations.

FIG. 31 shows an example RU allocation in which RU assignments are included in user fields according to some implementations. Rather than including the RU allocation field (not shown) in the common field 3120 of the EHT-SIG 3110, the technique illustrated and described with reference to FIG. 31 includes the RU assignment for each user in their corresponding user field. The user specific field 3150 of the EHT-SIG 3110 may include user fields that include the RU assignments for each user. A first user field 1 3111 includes the RU assignment for the first user, a second user field 2 3112 includes the RU assignment for the second user, and so on. In this example implementation, the order of the user fields may be modified as needed because the order is no longer related to an RU allocation value in the common field. Some potential new subfields that may be included in each user field may include the RU assignment, and MU-MIMO indicator (to indicate whether the RU assignment is for MU-MIMO or non-MU-MIMO), the NSTS of this user, and the starting stream index (when using MU-MIMO), among other examples.

To accommodate the potential RU assignments that may be included in each user field, each RU within the entire bandwidth of the wireless channel may be given a different lookup value. FIG. 37 includes some RU size options. For example, for a total 320 MHz PPDU BW, there may be 343 options of sizes of RUs and locations within a 320 MHz channel bandwidth (148 26-tone RUs, 64 52-tone RUs, 16 78-tone RUs, 32 106-tone RUs, 16 132-tone RUs, 16 242-tone RUs, 8 484-tone RUs, 16 726-tone RUs, 4 996-tone RUs, 8 (996+484)-tone RUs, 2 2×996-tone RUs, 4 3×996-tone RUs, 8 (3×996+484)-tone RUs, and 1 4×996-tone RU). Furthermore, in some implementations, there may be 115 options for different MU-MIMO RUs (if RU sizes of RU106 and above may be used for MU-MIMO transmissions). Thus, a different 9-bit value (maximum 512 values) may be used to identify each different possible RU or aggregated RU within a PPDU BW for a 320 MHz channel bandwidth. In another implementation, a 9-bit value (maximum 512 values) may be used to identify each different possible RU or aggregated RU assigned for a single user, and each different possible RU or aggregated RU assigned for multiple user to perform MU-MIMO transmissions, within the PPDU BW.

In some implementations, an RU allocation table my support partial-bandwidth MU-MIMO. Partial-bandwidth MU-MIMO refers to an RU allocation that permits MU-MIMO for part of the bandwidth of the PPDU. Other parts of the same PPDU may be used for non-MU-MIMO OFDMA RUs. Thus, such a PPDU may include a combination of MU-MIMO RU(s) and non-MU-MIMO OFDMA RU(s). To signal such RUs, this disclosure includes some design options or simplification rules that may be applied in some implementations. For example, the simplification rules may reduce the quantity of RU allocation options or simply the RU allocation signaling. In some implementations, these simplification rules may apply only when the PPDU includes a partial-bandwidth MU-MIMO RU(s). For example, in PPDUs that do not include partial-bandwidth MU-MIMO or that use full bandwidth MU-MIMO, the simplification rules may not be needed. Up to 16 users can be supported for full BW MU-MIMO (with or without punctured channels) without the use of a specialized RU allocation table. Meanwhile, when the PPDU includes partial-bandwidth MU-MIMO, a specialized RU allocation table may be based on simplification rules. The specialized RU allocation able may apply to both uplink and downlink traffic when there is partial-bandwidth MU-MIMO in the PPDU.

An example simplification rule proposed in this disclosure may include a minimum PPDU BW size that is permitted to support partial-bandwidth MU-MIMO in the same PPDU. For example, partial-bandwidth MU-MIMO may only be permitted in PPDUs that have a bandwidth over a threshold size. In some implementations, the minimum PPDU bandwidth that can support partial-bandwidth MU-MIMO may be 40 MHz bandwidth or 80 MHz bandwidth. A PPDU that has a PPDU BW less than the minimum bandwidth may not support partial-bandwidth MU-MIMO. Instead, it may use an EHT-SIG compression mode that is for full bandwidth MU-MIMO (with or without punctured channels), or an RU allocation table that is only for OFDMA. By setting a minimum PPDU BW to support partial-bandwidth PPDU, the RU allocation signaling may be simplified for the various options of MU-MIMO and OFDMA RUs that would be used for the higher bandwidth PPDUs. In some implementations, the minimum PPDU BW to support partial-bandwidth MU-MIMO may be a configurable setting. Setting the minimum PPDU BW that supports partial-bandwidth MU-MIMO to a setting of 20 MHz bandwidth may effectively disable this rule since all PPDU BWs would support partial BW MU-MIMO. However, setting the minimum PPDU BW to a setting of 40 MHz bandwidth or 80 MHz bandwidth may enable different RU allocation tables to be used.

Another example simplification rule proposed in this disclosure may include a minimum RU size that can be allocated for partial-bandwidth MU-MIMO. For example, the minimum RU size may be RU 242. In some implementations, the minimum RU size for use with MU-MIMO may be dependent on the bandwidth of the PPDU. For example, for a 240 MHz bandwidth (or 320 MHz bandwidth) PPDU, the minimum RU size for MU-MIMO may be RU484. For a PPDU having a smaller PPDU BW size (smaller than 240 MHz bandwidth), the minimum RU size for MU-MIMO may be RU242. The determination of the minimum RU size for MU-MIMO may be fixed or may be dynamic. For example, in a fixed configuration, the minimum RU size for MU-MIMO may be the same regardless of the PPDU BW. In a dynamic configuration, the minimum RU size for MU-MIMO may be adjusted based on the PPDU BW. In some implementations, the minimum RU size for MU-MIMO may be determined as a fraction of the PPDU BW (PBW) size. For example, the minimum RU size may be one eighth the size of the PBW. In some implementations, there may be a lower bound, such as RU242. Table 2 summarizes some example minimum RU sizes for partial BW MU-MIMO using this example simplification rule.

TABLE 2

Minimum RU size for partial BW MU-MIMO based on simplification rule

| | | Min RU size of partial BW MU-MIMO | | | | | |
|---|---|---|---|---|---|---|---|
| | | 20 MHz | 40 MHz | 80 MHz | 160 MHZ or 80 + 80 MHz | 240 MHZ or 160 + 80 MHz | 320 MHZ or 160 + 160 MHz |
| Option 1: Min PPDU BW = 40 MHz, min RU-size = RU106 (+ allowing RU132) | Option 1a | N/A | RU106 | RU106 | RU242 | RU484 | RU484 |
| | Option 1b | N/A | RU106 | RU106 | RU106 | RU106 | RU106 |
| Option 2: Min PPDU BW = 80 MHz, min RU-size = RU242 | Option 2a | N/A | N/A | RU242 | RU242 | RU484 | RU484 |
| | Option 2b | N/A | N/A | RU242 | RU484 | RU996 | RU996 |
| | Option 2c | N/A | N/A | RU242 | RU242 | RU242 | RU242 |
| Option 3: Min PPDU BW = 40 MHz, min RU-size = RU242 | Option 3a | N/A | RU242 | RU242 | RU242 | RU484 | RU484 |
| | Option 3b | N/A | RU242 | RU242 | RU484 | RU996 | RU996 |
| | Option 3c | N/A | RU242 | RU242 | RU242 | RU242 | RU242 |

Option 1: Min PPDU BW=40 MHz, min RU-size=RU106 (+ allowing RU132)

Option 1a: Dynamic min RU size=⅛ PPDU BW with a lower bound for min RU size of RU106 (i.e. Min RU size=max(PPDU BW/8, RU106))

240/160+80 MHz PPDU uses min RU size of RU484

Option 1b: Static min RU-size=RU106 (regardless of PPDU BW)

Option 2: Min PPDU BW=80 MHz, min RU-size=RU242
  Option 2a: Dynamic min RU size=⅛ PBW with a lower bound for min RU size of RU242 (i.e. Min RU size=max(PBW/8, RU242))
    240/160+80 MHz PPDU uses min RU size of RU484
  Option 2b: Dynamic min RU size=¼ PBW
  Option 2c: Static min RU-size=RU242 (regardless of PPDU BW)
Option 3: Min PPDU BW=40 MHz, min RU-size=RU242
  Option 3a: Dynamic min RU size=⅛ PBW with a lower bound for min RU size of RU242 (i.e. Min RU size=max(PBW/8, RU242))
    240/160+80 MHz PPDU uses min RU size of RU484
  Option 3b: Dynamic min RU size=¼ PBW with a lower bound for min RU size of RU242 (i.e. Min RU size=max(PBW/4, RU242))
  Option 3c: Static min RU-size=RU242 (regardless of PPDU BW)

Another example simplification rule proposed in this disclosure may include a minimum RU size that can be allocated for non-MU-MIMO users in a PPDU that includes a mix of MU-MIMO and OFDMA RUs. This minimum RU size may be used for the OFDMA sections. In some implementations, the minimum RU size allocated to a single user may be the same as for MU-MIMO. For example, the minimum RU size allocated to a single user may be RU242. In some implementations, the allocation of OFDMA section may allow only a defined list of canonical OFDMA modes within an OFDMA section of the PPDU BW. For example, the canonical OFDMA modes may be based on a restriction that the OFDMA sections must be at least RU242 in size. In some implementations, an RU for an OFDMA section may be split into 2 or 4 RUs, each RU for one OFDMA user, using additional signaling.

The example simplification rules described herein may be used independently or may be combined in various combinations.

This disclosure includes a design option for the compressed EHT-SIG that may follow a U-SIG. For example, the compressed EHT-SIG may be used when the EHT-SIG follows a U-SIG formatted for a unified SU/MU PPDU frame format. Other uses of the compresses EHT-SIG may be relevant for MU PPDUs. In some implementations, the compressed EHT-SIG may be reduced in size by omitting the RU allocation subfield in the EHT-SIG common field or using reduced sized RU allocation subfields for the EHT-SIG common field.

FIG. 32A shows a first example table 3200 with different options for compression modes that may be used in the EHT-SIG including a no compression mode. The use of different compression modes may depend on the type of communication (such as SU, non-OFDMA MU-MIMO, or OFDMA) in the PPDU as well as the puncturing of subchannels within the PPDU BW. The PPDU type may be MU PPDU as indicated in the U-SIG. Alternatively, or additionally, the SU or non-OFDMA MU-MIMO designation may be determined by the 'number of EHT-SIG symbols' field which may be interpreted as number of non-OFDMA users (the value indicated in this field may be the number of non-OFDMA users minus 1). A value of "0" in the 'number of EHT-SIG symbols' field may indicate that the PPDU is for an SU transmission. SU will have only one EHT-SIG-per-user field of the non-MU-MIMO allocation format (even for punctured transmissions). In yet another implementation, if the SU PPDU is a separate PPDU type, the compression modes may be defined only for non-OFDMA MU-MIMO.

A first compression mode ("Compression Mode 1") may be used in a PPDU on a non-punctured (full bandwidth) wireless channel when the PPDU is directed to a single user or that uses a non-OFDMA MU-MIMO transmission. In Compression Mode 1, the RU allocation information in the common field (of the EHT-SIG) may be omitted.

A second compression mode ("Compression Mode 2") may be used in a PPDU on a punctured wireless channel when the PPDU is directed to a single user or that uses a non-OFDMA MU-MIMO transmission. In Compression Mode 2, the RU allocation information in the common field (of the EHT-SIG) may be replaced by with punctured channel information. The punctured channel information may have a granularity of 20 MHz bandwidth. For example, the RU allocation information in the common field (of the EHT-SIG) may be replaced by a punctured channel bitmap of other 80 MHz segments (different from where that EHT-SIG is located). The puncturing information for the 80 MHz segment (which carries that EHT-SIG) would be indicated by the PPDU BW indicator in the U-SIG. Thus, the Compression Mode 2 may permit convey information about puncturing in the current 80 MHz section as well as other 80 MHz sections of the wireless channel.

In some implementations, the punctured channel bitmap may be omitted if PPDU BW is 20 MHz, 40 MHz, or 80 MHz. The punctured channel bitmap may be 4 bits if the PPDU BW is 160 MHz or 80+80 MHz. The punctured channel bitmap may be 8 bits if the PPDU BW is 240 MHz or 160+80 MHz. The punctured channel bitmap may be 12 bits if the PPDU BW is 320 MHz or 160+160 MHz. In some implementations, such as when [1 2 1 2] structure is used with EHT-SIG parallelization, the punctured channel bitmap may be half of the size.

When using OFDMA, neither the Compression Mode 1 nor the Compression Mode 2 will be used. In a full bandwidth PPDU, OFDMA signaling may not need a punctured channel bitmap. When using OFDMA in a PPDU on a wireless channel with punctured subchannels, the RU allocations may be based on a shifted tone plan or updated RU allocation table. For example, an updated tone plan (with shifted RUs) may support different puncturing patterns. The punctured channel bitmap may support indications of puncturing in other 80 MHz segments (different from the 80 MHz segment for this EHT-SIG). The punctured channel bitmap may support a granularity of 20 MHz puncturing. An updated tone plan may be based on the punctured channel bitmap. Alternatively, the RU allocation table may be revised to include 1-2 bits to indicate the use of an updated tone plan. In another alternative, a per-user field may be updated to include a bit to indicate the use of an updated tone plan (with RU shifting). In some implementations, the same punctured channel bitmap that is used with Compression Mode 2 may be used. In some implementations, such as when the tone plan for an 80 MHz segment uses a duplicated HE40 tone plan or a new EHT80 tone plan, puncturing of subchannels does not change the OFDMA tone plan, and the punctured channel signaling may not be needed in the EHT-SIG common field. In some implementations, the same RU allocation subfield design may be used for both full bandwidth OFDMA and OFDMA with punctured subchannels.

In some implementations, an RU allocation table may be reduced by limiting some options of RU allocations that can be made (in either an RU allocation subfield of the EHT-SIG common or in a per-user RU allocation subfield). Depending on the limitations of RU allocation options, the quantity of bits needed to signal the RU allocation may change.

FIG. 32B shows a second example table 3210 with different options for compression modes that may be used in the EHT-SIG including a compression mode for a PPDU that includes partial bandwidth MU-MIMO. The use of different compression modes may depend on the type of communication (such as SU, non-OFDMA MU-MIMO, or OFDMA) in the PPDU, the puncturing of subchannels within the PPDU BW, as well as whether the PPDU includes a partial bandwidth MU-MIMO portion. A first compression mode ("Compression Mode 1") may be used in a PPDU on a non-punctured (full bandwidth) wireless channel when the PPDU is directed to a single user or that uses a non-OFDMA MU-MIMO transmission. In Compression Mode 1, the RU allocation information in the common field (of the EHT-SIG) may be omitted.

A second compression mode ("Compression Mode 2") may be used in a PPDU on a punctured wireless channel when the PPDU is directed to a single user or that uses a non-OFDMA MU-MIMO transmission. In Compression Mode 2, the RU allocation information in the common field (of the EHT-SIG) may be replaced by with punctured channel information.

When the PPDU includes OFDMA, neither the Compression Mode 1 nor the Compression Mode 2 may be used. Rather, a third compression mode ("Compression Mode 3") may be used with the PPDU includes partial bandwidth MU-MIMO RUs. A fourth compression mode ("Compression Mode 4") may be used with the PPDU only includes OFDMA RUs and does not include any MU-MIMO RUs. In Compression Mode 4, each RU may be assigned to no more than one user and no RU may be assigned for MU-MIMO. Thus, Compression Mode 3 supports a mix of OFDMA and MU-MIMO, and Compression Mode 4 may be used for a PPDU that is only OFDMA. The use of different compression modes may simplify the signaling regarding the RU allocations.

Figure 32C:
FIG. 32C shows a third example table with different options for compression modes that may be used in the EHT-SIG.

FIG. 32C shows a third example table 3220 with different options for compression modes that may be used in the EHT-SIG. The use of different compression modes may depend on the type of communication (such as SU, non-OFDMA MU-MIMO, or OFDMA) in the PPDU. A first compression mode ("Compression Mode 1") may be used in a PPDU when the PPDU is directed to a single user. In Compression Mode 1, the RU allocation information in the common field (of the EHT-SIG) may be omitted and only the total number of non-OFDMA users is signaled in all 20 MHz subchannels in the EHT-SIG common field. A second compression mode ("Compression Mode 2") may be used in a PPDU when the PPDU is a non-OFDMA MU-MIMO transmission. In Compression Mode 2, the RU allocation information in the common field (of the EHT-SIG) may be omitted and only the total number of non-OFDMA users is signaled in all 20 MHz subchannels in EHT-SIG common field. When the PPDU includes OFDMA, neither the Compression Mode 1 nor the Compression Mode 2 may be used.

Figure 32D:
FIG. 32D shows a fourth example table with different options for compression modes that may be used in the EHT-SIG.

FIG. 32D shows a fourth example table 3230 with different options for compression modes that may be used in the EHT-SIG. The use of a compression mode may depend on the type of communication (such as SU, non-OFDMA MU-MIMO, or OFDMA) in the PPDU. A first compression mode ("Compression Mode 1") may be used in a PPDU when the PPDU is directed to a single user or is a non-OFDMA MU-MIMO transmission. In Compression Mode 1, the RU allocation information in the common field (of the EHT-SIG) may be omitted, and only the total number of non-OFDMA users is signaled in all 20 MHz subchannels in EHT-SIG common field When the PPDU includes OFDMA, no compression mode may be used.

This disclosure includes some options for a reduced sized RU allocation subfield for EHT-SIG. In some implementations, the compressed EHT-SIG may use a [1, 2, 1, 2] content channel structure similar to IEEE 802.11ax. However, the EHT-SIG structure for channel bandwidths up to 160 MHz may be the same as the SIG-B structure defined for IEEE 802.11ax. However, for channel bandwidths over 160 MHz, a reduced size RU allocation subfield for EHT-SIG may be used to manage overhead. For example, for a 320 MHz, the reduced-size RU allocation subfield for EHT-SIG may include a 5 bit value (rather than an 8 bit value that would otherwise be used to signal every size of RU allocation).

In a first example option, the minimum RU size may be RU52. MU-MIMO may be allowed only for RU sizes >=RU242. The center RU26 of each 20 MHz can only be used if it is aggregated with an adjacent RU106.

In a second example option, the minimum RU size may be RU106. MU-MIMO may be allowed only for RU sizes >=RU242. The center RU26 of each 20 MHz can be assigned separately.

The are other possible small RU aggregation modes in each 80 MHz within EHT MHz, 160 MHz, or 320 MHz. For example, in a 1st and 3rd 20 MHz subchannel, an aggregation may include [RU106+26, RU106]. In a 2nd and 4th 20 MHz, subchannel, an aggregation may include [RU106, RU26+106]. In some implementations, the RU allocation table may assume a minimum RU52 size, and MU-MIMO is for RU242 and larger RUs. In another example variation, the RU allocation table may use a minimum RU106 size with an aggregation mode option. An aggregation mode may depend on which 20 MHz within each MHz. The center RU26 (C-RU26) in each 20 MHz may be aggregated with an adjacent RU106. The aggregation mode depending on which 20 MHz within each 80 MHz. Other variations may be possible. For example, each RU allocation subfield in the EHT-SIG may be in an uncompressed mode and include up to 8 or 9 bits. However, by removing some RU allocation options it is possible to add new RU allocation options for newly defined aggregated RUs in 11be or higher bandwidths. Furthermore, in some implementations, the revised RU allocation table may enable some further optimizations or conventions used for MU-MIMO signaling. For example, by restricting minimum RU allocation size to RU242 or greater for MU-MIMO RUs, the RU allocation table may be expanded to include greater bandwidth RU options as well as MU-MIMO for up-to 16 users without increasing the total size of the RU allocation table. In some options, aggregated RUs also may be used to support different RU sizes.

In some implementations, an RU allocation table may be modified to limit some options while adding new options. For example, each RU allocation subfield in the EHT-SIG may be in an uncompressed mode and include up to 8 or 9 bits. However, by removing some RU allocation options it is possible to add new RU allocation options for newly defined aggregated RUs in 11be or higher bandwidths. Furthermore, in some implementations, the revised RU allocation table may enable some further optimizations or conventions used for MU-MIMO signaling. For example, by restricting minimum RU allocation size to RU242 or greater for MU-MIMO RUs, the RU allocation table may be expanded to include greater bandwidth RU options as well as MU-MIMO for up-to 16 users without increasing the total size of the RU allocation table. In some options, aggregated RUs also may be used to support different RU sizes. An updated RU allocation table may be used for an RU allocation value populated in the RU allocation subfield (in the EHT-SIG). Alternatively, as described further below, an updated RU allocation table may be used for an RU assignment and MU-MIMO indication in a self-contained user field of the EHT-SIG. In some implementations, an MU-MIMO transmission may support up to 16 users without an RU allocation subfield in the EHT-SIG common. This may include MU-MIMO transmissions with or without puncturing. The MU-MIMO configurations can be signaled in the per-user RU allocation subfield of the user field. When the RU allocation (with or without MU-MIMO indicator) is included in a per-user RU allocation subfield of the user field, the user field may be referred to as a self-contained user field, similar to those described with reference to FIG. 31. When an EHT-SIG includes self-contained user fields, the EHT-SIG common may not include an RU allocation subfield. Instead, the RU allocation information (and frequency allocation) is included in the self-contained user fields. In some implementations, the EHT-SIG common may be revised to include the total number of users and total number of spatial streams ($N_{sts,total}$) for MU-MIMO RUs.

An RU allocation table may include entries for an RU allocation subfield of the EHT-SIG that supports MU-MIMO for up to 16 users for RU242. For larger RUs (such as those that cross multiple 20 MHz subchannels), 16 users could be supported for MU-MIMO since the RU allocation table may be used for each 20 MHz. An 8-bit value for the RU allocation subfield may be included for each 20 MHz of a full bandwidth or punctured bandwidth PPDU. The example RU allocation tables differ from a legacy IEEE 802.11ax RU allocation table in that they both support MU-MIMO up to 16 users. In a first example RU allocation table, RU allocation and MU-MIMO information may be combined in the RU allocation table and the first example RU allocation table may include some aggregated RUs to achieve more RU allocation options.

Each entry in the example RU allocation tables (one table per 20 MHz within the PPDU BW) indicates what are the RUs in this 20 MHz and how many users in each RU. The example RU allocation tables may limit some MU-MIMO configurations (below RU242) so that the same number of bits (8) may be used to signal the RU allocation option. For PPDUs which include MU-MIMO, the minimum RU size for partial BW MU-MIMO may be RU242 or higher. This is so that 16 users can be signaled with the existing RU allocation subfield size (8 bits).

In both of the example RU allocation tables, the number of entries for RU242 is increased from 8 to 16 to support up to 16 users. In some implementations, one entry may be added to the example RU allocation tables to indicate puncturing of a 20 MHz subchannel. An advantage of having an entry to indicate puncturing is that a device may determine whether to shift RUs within a tone map if a particular 20 MHz subchannel is punctured. Both of the example RU allocation tables include additional entries within a 20 MHz bandwidth. For example, the example RU allocation tables add 11 entries related to RU78 and 10 entries related to RU132 within a 20 MHz bandwidth. The example RU allocation tables include additional entries to support greater than 20 MHz bandwidth. For example, the example RU allocation tables add 18 entries related to RU768 (242+484 or 484+242), so as to support additional options for RU greater than 40 Mhz. For another example, the example RU allocation tables add 54 entries related to RU(484+996 or 996+484), 9 entries related to RU2×996, and 9 entries related to RU3×996. These new entries are added so that RU allocations can be made for greater bandwidths (over 80 MHz or 160 MHz bandwidth). The example RU allocation tables may include additional entries to support additional options for greater than 20 MHz bandwidth in an RU allocation table using more aggregation mode options. For example, the example RU allocation tables add 18 entries related to RU(484+2×996, 996+484+996, 2×996+484) and 18 entries related to RU(484+3×996).

In some implementations, the RU allocation table may support aggregated RUs that are referred to as a combination of smaller RU sizes. For example, 484-tone RU and a 996-tone RU may be combined to form an aggregated RU, referred to as either (484+996)-tone RU or (996+484)-tone RU. To support larger aggregated RUs, the RU allocation subfield in the EHT-SIG common field may have a first entry and up to 8 other entries. The first entry denotes that the current 20 MHz is inside of (size-A)-tone RU within an aggregated RU (such as (size A+size B)-tone RU), and that there is no user field associated to this RU allocation subfield in EHT-SIG. In an RU allocation table that includes aggregated RUs, the (size A+size B)-tone RU and (size B+size A)-tone RU (for example (484+996)-tone RU and (996+484)-tone RU) have different values. The "size A" RU component is in a lower frequency band while the "size B" RU component is in a higher frequency band.

As described previously, the content of the EHT-SIG common field may depend on the compression mode options for the PPDU when the wireless channel is full bandwidth or punctured. Furthermore, the size of the EHT-SIG common field may be adjusted based on the PPDU BW. Table 3 shows sizes of the EHT-SIG based on the PPDU BW for 20 MHz, 40 MHz, 80 MHz, 160 MHz, 240 MHz and 320 MHz bandwidth.

TABLE 3

EHT-SIG Common field size

| EHT-SIG Common | 20 MHz | 40 MHz | 80 MHz | 160 MHz | 240 MHz | 320 MHz |
|---|---|---|---|---|---|---|
| Bits for Overflowed Fields from U-SIG | 14 | 14 | 14 | 14 | 14 | 14 |
| Reserved/R2/DUPed | 2 | 2 | 2 | 2 | 2 | 2 |
| Punctured channel bitmap | 0 | 0 | 0 | 4 | 8 | 12 |
| C-RU26 (if using HE80 tone plan) | 0 | 0 | 1 | 2 | 3 | 4 |
| RU allocation subfields | 8x1 | 8x2 | 8x4 | 8x8 | 8x12 | 8x16 |
| Total | 24 | 32 | 50 | 86 | 123 | 160 |

Among other details, Table 3 shows the number of RU allocation subfields in the EHT-SIG common. Each RU allocation subfield is 8 bits and can be used to signal the RU allocations within a 20 MHz bandwidth. Thus, up to 16 RU allocation subfields may be included in the EHT-SIG common to indicate the RU allocations for the full bandwidth when the PPDU BW is 320 MHz. In some implementations, where the flax like [1 2 1 2] content channel structure is used, the RU allocations subfields may be parallelized into two content channels, and the common field size in each content channel changes. Table 3 also shows the quantity of bits for the punctured channel bitmap to indicate which subchannels are punctured.

In the compressed modes, the user field may not include per-user RU allocation information. When the EHT-SIG common includes the RU allocation subfield(s), the user field may not include per-user RU allocation information. However, the user field of the EHT-SIG common may be adjusted to support up to 16 spatial streams for non-MU-MIMO and MU-MIMO. Examples of the user field are shown below as Table 4 (for non-MU-MIMO allocation), Table 5 (for non-MU-MIMO with MCS having DCM parameter), and Table 6 (for MU-MIMO allocation).

TABLE 4

User field for a non-MU-MIMO allocation

| Subfield | Number of Bits |
| --- | --- |
| STA-ID | 11 |
| NSTS | 4 |
| Beamformed | 1 |
| MCS | 4 |
| DCM | 1 |
| Coding | 1 |

TABLE 5

User field for a non-MU-MIMO allocation (in which DCM and BPSK modulation is reflected in the MCS value)

| Subfield | Number of Bits |
| --- | --- |
| STA-ID | 11 |
| NSTS | 4 |
| Beamformed | 1 |
| MCS | 4 |
| Reserved | 1 |
| Coding | 1 |

TABLE 6

User field for MU-MIMO allocation

| Subfield | Number of Bits |
| --- | --- |
| STA-ID | 11 |
| Spatial Configuration | 6-8 |
| MCS | 4 |
| Coding | 1 |

The NSTS (in Table 4) may be 4 bits so that it can signal a value high enough to support 16 spatial streams. Table 5 The spatial configuration (in Table 6) may be 6, 7, or 8 bits to support different spatial stream configurations for MU-MIMO, as described with reference to FIG. 26 In some implementations, the spatial configuration in Table 6 is 6 bits, making the user field exactly 22 bits. Thus, the user field for non-MU-MIMO (Table 4) and MU-MIMO (Table 6) may be a consistent size (22 bits) while supporting up to 16 spatial streams.

When the EHT-SIG includes self-contained user fields, each user field may include RU allocation information. In some implementations, the RU allocation subfield in the EHT-SIG common may not be necessary since the RU allocation information is included in the self-contained user fields. Examples of the self-contained user field are shown below as Table 7 (for non-MU-MIMO allocation) and Table 8 (for MU-MIMO allocation).

Table 7 shows an example format for the self-contained user field when the RU allocation is for non-MU-MIMO allocation.

TABLE 7

Example format of the user field for non-MU-MIMO allocation

| Subfield | Number of Bits |
| --- | --- |
| STA-ID | 11 |
| RU Allocation | 9 |
| MU-MIMO flag (set to 0 for non-MU-MIMO format) | 1 |
| NSTS (set to actual NSTS minus 1) | 3 to support up to 8 spatial streams; or 4 to support up to 16 spatial streams |
| Beamformed | 1 |
| MCS | 4 |
| DCM | 1 |
| Coding | 1 |
| Reserved | X bits to align the size of both formats |

Table 8 shows an example format for the user field when RU allocation is for an MU-MIMO allocation.

TABLE 8

Example format of the user field for MU-MIMO allocation

| Subfield | Number of Bits |
| --- | --- |
| STA-ID | 11 |
| RU Allocation | 9 |
| MU-MIMO flag (set to 1 for MU-MIMO format) | 1 |
| NSTS (set to actual NSTS minus 1) | 2 to support up to max 4 spatial streams per user; 3 to support up to 8 spatial streams per user |
| Starting stream index | 3 to support up to 8 spatial streams; 4 to support up to 16 spatial streams |
| MCS | 4 |
| Coding | 1 |
| Reserved | Y bits to align the size of both formats |

Table 9 shows an example format for the user field in a unified format that supports either non-MU-MIMO or MU-MIMO allocations.

TABLE 9

Example unified format of the user field for either non-MU-MIMO or MU-MIMO allocation

| Subfield | Number of Bits |
| --- | --- |
| STA-ID | 11 |
| RU Allocation | 9 |
| MU-MIMO flag (set to 0 for non-MU-MIMO and set to 1 for MU-MIMO format) | 1 |
| NSTS (set to actual NSTS minus 1) | 3 to support up to 8 spatial streams 4 to support up to 16 spatial streams |
| Starting stream index (stream index starts from 0; set to 0 for non-MU-MIMO case) | 3 to support up to 8 spatial streams; 4 to support up to 16 spatial streams |

TABLE 9-continued

Example unified format of the user field for
either non-MU-MIMO or MU-MIMO allocation

| Subfield | Number of Bits |
| --- | --- |
| Beamformed | 1 |
| MCS | 4 |
| DCM (set to 0 for non-MU-MIMO) | 1 |
| Coding | 1 |

In some implementations, it may be possible to combine RU allocation information with MU-MIMO information. For example, in IEEE 802.11ax, not all RUs are doing MU-MIMO. RU26 and RU52 may only be assigned to a single user (SU) and not for multiple users doing MU-MIMO. Only RUs of a certain size (such as RU106 or RU242) and larger may be assigned to multiple users for MU-MIMO.

If a similar limit is used in IEEE 802.11be, it may be possible to signal the RU allocation and MU-MIMO indication as a combined value of 9 bits, as described in one option in FIG. 33. For a channel bandwidth up to 320 MHz there may be 458 RUs and RU aggregation modes in non-MU-MIMO mode. Please see FIG. 33 for a list of various RU allocation and MU-MIMO options (and their potential bit lengths) for other bandwidth sizes. If only RU106 and larger RUs (32+16+8+4+2+1=63) and RU aggregation modes (using RU106 and larger RUs) are allowed to be allocated for MU-MIMO mode, the total number of RUs and combinations would be less than 512. Thus, 9 bits may be sufficient to represent the combinations of different RUs and MU-MIMO and non-MU-MIMO indications within a 320 MHz bandwidth provided the limits imposed on smaller RUs. Furthermore, in another implementation, 9 bits may be sufficient to represent the combinations of different RUs and RU aggregation modes, and MU-MIMO and non-MU-MIMO indications within a 320 MHz bandwidth provided the limits imposed on smaller RUs. Table 10 shows an example format for the user field when the RU allocation and MU-MIMO indicator is represented by a combined indicator and the user field is for non-MU-MIMO allocation.

TABLE 10

Example format of the user field for non-MU-MIMO allocation with combined RU allocation

| Subfield | Number of Bits |
| --- | --- |
| STA-ID | 11 |
| RU Allocation & MU-MIMO Indication | 9 |
| NSTS (set to actual NSTS minus 1) | 3 to support up to 8 spatial streams; 4 to support up to 16 spatial streams |
| Beamformed | 1 |
| MCS | 4 |
| DCM | 1 |
| Coding | 1 |
| Reserved | X bits to align the size of both formats |

Table 11 shows an example format for the user field when the RU allocation and MU-MIMO indicator is represented by a combined indicator and the user field is for an MU-MIMO allocation.

TABLE 11

Example format of the user field for MU-MIMO allocation with combined RU allocation

| Subfield | Number of Bits |
| --- | --- |
| STA-ID | 11 |
| RU Allocation & MU-MIMO Indication | 9 |
| NSTS (set to actual NSTS minus 1) | 2 to support up to max 4 spatial streams per user; 3 to support up to 8 spatial streams per user |
| Starting stream index | 3 to support up to 8 spatial streams; 4 to support up to 16 spatial streams |
| MCS | 4 |
| Coding | 1 |
| Reserved | Y bits to align the size of both formats |

Table 12 shows an example format for the user field that uses a unified format when the RU allocation and MU-MIMO indicator is represented by a combined indicator.

TABLE 12

Example unified format of the user field using combined RU allocation and MU-MIMO allocation

| Subfield | Number of Bits |
| --- | --- |
| STA-ID | 11 |
| RU Allocation & MU-MIMO Indication | 9 |
| NSTS (set to actual NSTS minus 1) | 3 to support up to 8 spatial streams; 4 to support up to 16 spatial streams |
| Starting stream index (stream index starts from 0; set to 0 for non-MU-MIMO case) | 3 to support up to 8 spatial streams; 4 to support up to 16 spatial streams |
| Beamformed | 1 |
| MCS | 4 |
| DCM (set to 0 for non-MU-MIMO) | 1 |
| Coding | 1 |

In some implementations, the self-contained user field (such as any of those described in Tables 7-12) may be formatted to have a consistent length (such as 31 or 32 bits). The quantity of reserved bits or lengths of various indicators may be changed in the self-contained user field design to achieve a consistent bit length for each user field.

FIG. 33 shows a table 3310 with quantity of per-user RU assignment options when using a self-contained user field in the EHT-SIG. The table shows the types of RUs that may be assigned within different channel bandwidth (CBW) options. For example, for a MHz channel bandwidth, there may be 9 26-tone RUs, 5 52-tone RUs, 2 78-tone RUs, 2 106-tone RUs, 2 132-tone RUs, 1 242-tone RU. New RU sizes (based on aggregated RUs) are indicated in italics, such as the 78-tone RU, 132-tone RU, and so on. Thus, for a 20 MHz CBW, there may be a total of 20 RU options for OFDMA. In addition to the non-MU-MIMO OFDMA RU assignment options, the table may be expanded to include MU-MIMO options. As described herein, the MU-MIMO options may be limited (such as RU106, RU242 or greater). The example in table 3310 is based on a restriction that MU-MIMO RU allocations are RU106 or greater. For a channel bandwidth of 20 MHz, there may be up to 5 options for MU-MIMO RUs. Thus, within a channel bandwidth of 20 MHz, there may be 20 OFDMA RU options and 5 MU-MIMO RU options for a total of 25 entries in the RU assignment table. The per-user RU assignment information in a self-contained user field may use 5 bits to signal any of the RU options—including whether the RU option is for OFDMA or MU-MIMO.

The table 3310 shows the total number of entries needed in an RU allocation table for different channel bandwidths up to 320 MHz. For example, in a channel bandwidth of 320 (CBW80×4, CBW160+80×2, CBW160×2, or CBW320), there may be a total of 458 entries. Each entry may signal a different OFDMA RU option or MU-MIMO option. Thus, it may be possible to signal the OFDMA RU or MU-MIMO RU assignment using 9 bits.

In some implementations, the number of bits included in the per-user RU assignment information in the self-contained user field may change depending on the PPDU BW. For example, PPDU BW field in the U-SIG may indicate whether the PPDU bandwidth is CBW20, CBW40, CBW80, CBW80+80, CBW160, CBW80×3, CBW160+80, CBW240, CBW80×4, CBW160+80×2, CBW160×2, or CBW320. Based on the value in the PPDU BW field of the U-SIG, the per-user RU assignment information in the self-contained user field may be 5, 6, 7, 8, or 9 bits, respectively, as shown in table 3310.

As described previously (with reference to FIG. 32B), the signaling for a PPDU that supports partial-bandwidth MU-MIMO and OFDMA may be simplified. In Compression Mode 3, an RU allocation subfield may include signaling for RU allocations within a PPDU that includes both MU-MIMO and OFDMA sections. Some partial BW RUs may be MU-MIMO RUs while other RUs may be for OFDMA. Using the simplification rules describe herein, there may be a maximum of 8 MU-MIMO RUs within a PPDU. The RU allocation subfield may include some bits that signal an initial split of the PPDU BW into different initial RU portions. Then further signaling for each of the initial RU portions may signal whether the initial RU portion is punctured, used for MU-MIMO, or further split into one or multiple RUs for OFDMA.

In an example which no compression mode is used for the RU allocation subfield, there may be new RU allocation tables with entries that are optimized to support partial bandwidth MU-MIMO RU allocations. For example, an RU allocation table may include per 20 MHz RU allocation options to support flexible combination of MU-MIMO and OFDMA RU allocations in a PPDU. Table 14 shows the quantity of bits needed to signal unique entries from some example RU allocations tables. For example, a first design option (Option 1) for an RU allocation table may support RU106 for MU-MIMO, but not RU132 for MU-MIMO, only 1 MU-MIMO RU in a 20 MHz bandwidth, with up to 16 users or 2 MU-MIMO RUs in the 20 MHz bandwidth with up to 4 users. There are 452 entries in the first design option for the RU allocation table. Thus, 9 bits may be used to signal a unique entry in the example RU allocation table having the first design option.

Table 15 shows an example RU allocation table according to some implementations described herein. Entries that reflect modifications are indicated in bold font.

TABLE 15

Example RU allocation table

| #1 | #2 | #3 | #4 | #5 | #6 | #7 | #8 | #9 | Number of entries |
|---|---|---|---|---|---|---|---|---|---|
| 26 | 26 | 26 | 26 | 26 | 26 | 26 | 26 | 26 | 1 |
| 26 | 26 | 26 | 26 | 26 | 26 | 26 | 52 |  | 1 |
| 26 | 26 | 26 | 26 | 26 |  | 52 | 26 | 26 | 1 |
| 26 | 26 | 26 | 26 | 26 | 52 |  | 52 |  | 1 |
| 26 | 26 |  | 52 | 26 | 26 | 26 | 26 | 26 | 1 |
| 26 | 26 |  | 52 | 26 | 26 | 26 | 52 |  | 1 |
| 26 | 26 |  | 52 | 26 | 52 |  | 26 | 26 | 1 |
| 26 | 26 |  | 52 | 26 | 52 |  | 52 |  | 1 |
|  | 52 |  | 26 | 26 | 26 | 26 | 26 | 26 | 1 |
|  | 52 |  | 26 | 26 | 26 | 26 | 52 |  | 1 |
|  | 52 |  | 26 | 26 | 52 |  | 26 | 26 | 1 |
|  | 52 |  | 26 | 26 | 52 |  | 52 |  | 1 |
|  | 52 |  |  | 52 | 26 | 26 | 26 | 26 | 1 |
|  | 52 |  |  | 52 | 26 | 26 | 52 |  | 1 |
|  | 52 |  |  | 52 | 52 |  | 26 | 26 | 1 |
|  | 52 |  |  | 52 | 52 |  | 52 |  | 1 |
|  | 52 |  |  | 52 | — |  | 106 |  | 0 |
|  |  | 106 |  | — |  | 52 |  | 52 | 0 |
| 26 | 26 | 26 |  | 26 |  | 106 |  |  | 1 |
| 26 | 26 |  | 52 | 26 |  | 106 |  |  | 1 |
|  | 52 |  | 26 | 26 |  | 106 |  |  | 1 |
|  | 52 |  |  | 52 |  | 106 |  |  | 1 |
|  |  | 106 |  | 26 | 26 | 26 | 26 | 26 | 1 |
|  |  | 106 |  | 26 | 26 | 26 | 52 |  | 1 |
|  |  | 106 |  | 26 | 52 |  | 26 | 26 | 1 |
|  |  | 106 |  | 26 | 52 |  | 52 |  | 1 |
|  |  | 106 |  | — |  | 106 |  |  | 0 |
|  | 52 |  |  | 52 |  | 52 |  | 52 | 1 |
|  |  | 106 |  | 26 |  | 106 |  |  | 1 |
|  | 52 |  | 78 |  | 52 |  | 52 |  | 1 |
| 26 |  | 78 |  | 26 | 26 | 26 | 26 | 26 | 1 |
| 26 |  | 78 |  | 26 | 26 | 26 | 52 |  | 1 |
| 26 |  | 78 |  | 26 | 52 |  | 26 | 26 | 1 |
| 26 |  | 78 |  | 26 | 52 |  | 52 |  | 1 |
| 26 |  | 78 |  | 26 |  | 106 |  |  | 1 |
| 26 | 26 | 26 | 26 | 26 |  | 78 |  | 26 | 1 |

TABLE 15-continued

Example RU allocation table

| #1 | #2 | #3 | #4 | #5 | #6 | #7 | #8 | #9 | Number of entries |
|----|----|----|----|----|----|----|----|----|-------------------|
| 26 | 26 |    | 52 |    | 26 | 78 |    | 26 | 1 |
|    | 52 | 26 |    | 26 | 26 | 78 |    | 26 | 1 |
|    | 52 |    | 52 |    | 26 | 78 |    | 26 | 1 |
|    |    | 106|    |    | 26 | 78 |    | 26 | 1 |
| 26 |    | 78 |    |    | 26 | 78 |    | 26 | 1 |
|    |    | 132 |    |    | 26 | 26 | 26 | 26 | 1 |
|    |    | 132 |    |    | 26 | 26 |    | 52 | 1 |
|    |    | 132 |    |    |    | 52 | 26 | 26 | 1 |
|    |    | 132 |    |    |    | 52 |    | 52 | 1 |
|    |    | 132 |    |    |    |    | 106 |   | 1 |
|    |    | 132 |    |    |    | 78 |    | 26 | 1 |
| 26 | 26 | 26 | 26 |    |    | 132 |   |    | 1 |
| 26 | 26 |    | 52 |    |    | 132 |   |    | 1 |
|    | 52 | 26 | 26 |    |    | 132 |   |    | 1 |
|    | 52 |    | 52 |    |    | 132 |   |    | 1 |
|    |    | 106|    |    |    | 132 |   |    | 1 |
| 26 |    | *78* |   |    |    | 132 |   |    | 1 |
| 242-tone RU with zero User fields indicated in this RU Allocation subfield | | | | | | | | | 1 |
| 484-tone RU with zero User fields indicated in this RU Allocation subfield | | | | | | | | | 1 |
| 996-tone RU with zero User fields indicated in this RU Allocation subfield | | | | | | | | | 1 |
| 242 | | | | | | | | | 8 |
| 484 | | | | | | | | | 8 |
| 996 | | | | | | | | | 8 |
| (242+484)-tone RU, formed by 2nd RU242 & 2nd RU484 within one 80 MHz segment | | | | | | | | | 8 |
| (242+484)-tone RU, formed by 1st RU242 & 2nd RU484 within one 80 MHz segment | | | | | | | | | 8 |
| (242+484)-tone RU, formed by 1st RU484 & 4th RU242 within one 80 MHz segment | | | | | | | | | 8 |
| (242+484)-tone RU, formed by 1st RU484 & 3rd RU242 within one 80 MHz segment | | | | | | | | | 8 |
| (484+996)-tone RU, formed by 2nd RU484 & 2nd RU996 within one contiguous 160 MHz | | | | | | | | | 8 |
| (484+996)-tone RU, formed by 1st RU484 & 2nd RU996 within one contiguous 160 MHZ | | | | | | | | | 8 |
| (484+996)-tone RU, formed by 1st RU996 & 4th RU484 within one contiguous 160 MHZ | | | | | | | | | 8 |
| (484+996)-tone RU, formed by 1st RU996 & 3rdRU484 within one contiguous 160 MHZ | | | | | | | | | 8 |
| 2x996-tone RU | | | | | | | | | 8 |
| (2x996+484)-tone RU, formed by 2nd RU484 & 2nd RU996 & 3rd RU996 within one contiguous 240 MHZ | | | | | | | | | 8 |
| (2x996+484)-tone RU, formed by 1st RU484 & 2nd RU996 & 3rd RU996 within one contiguous 240 MHZ | | | | | | | | | 8 |
| (2x996+484)-tone RU, formed by 1st RU996 & 4th RU484 & 3rd RU996 within one contiguous 240 MHZ | | | | | | | | | 8 |
| (2x996+484)-tone RU, formed by 1st RU996 & 3rd RU484 & 3rd RU996 within one contiguous 240 MHZ | | | | | | | | | 8 |
| (2x996+484)-tone RU, formed by 1st RU996 & 2nd RU996 & 6th RU484 within one contiguous 240 MHZ | | | | | | | | | 8 |
| (2x996+484)-tone RU, formed by 1st RU996 & 2nd RU996 & 5th RU484 within one contiguous 240 MHZ | | | | | | | | | 8 |
| 3x996-tone RU, formed by 2nd, 3rd & 4th RU996 within 320 MHz | | | | | | | | | 8 |
| 3x996-tone RU, formed by 1st, 3rd & 4th RU996 within 320 MHZ | | | | | | | | | 8 |
| 3x996-tone RU, formed by 1st, 2nd & 4th RU996 within 320 MHz | | | | | | | | | 8 |
| 3x996-tone RU, formed by 1st, 2nd & 3rd RU996 within 320 MHz | | | | | | | | | 8 |
| (3x996+484)-tone RU, formed by 2nd RU484 & 2nd RU996 & 3rd RU996 & 4th RU996 within 320 MHZ | | | | | | | | | 8 |
| (3x996+484)-tone RU, formed by 1st RU484 & 2nd RU996 & 3rd RU996 & 4th RU996 within 320 MHZ | | | | | | | | | 8 |
| (3x996+484)-tone RU, formed by 1st RU996 & 4th RU484 & 3rd RU996 & 4th RU996 within 320 MHZ | | | | | | | | | 8 |
| (3x996+484)-tone RU, formed by 1st RU996 & 3rd RU484 & 3rd RU996 & 4th RU996 within 320 MHZ | | | | | | | | | 8 |
| (3x996+484)-tone RU, formed by 1st RU996 & 2nd RU996 & 6th RU484 & 4th RU996 within 320 MHz | | | | | | | | | 8 |

TABLE 15-continued

Example RU allocation table

| #1 | #2 | #3 | #4 | #5 | #6 | #7 | #8 | #9 | Number of entries |
|---|---|---|---|---|---|---|---|---|---|
| | (3x996+484)-tone RU, formed by 1st RU996 & 2nd RU996 & 5th RU484 & 4th RU996 within 320 MHZ | | | | | | | | 8 |
| | (3x996+484)-tone RU, formed by 1st RU996 & 2nd RU996 & 3rd RU996 & 8th RU484 within 320 MHz | | | | | | | | 8 |
| | (3x996+484)-tone RU, formed by 1st RU996 & 2nd RU996 & 3rd RU996 & 7th RU484 within 320 MHz | | | | | | | | 8 |
| | Punctured | | | | | | | | 1 |
| | Reserved | | | | | | | | 218 |
| | Total | | | | | | | | 294 |
| | # Bits | | | | | | | | 9 |

Table 16 shows a spatial stream configuration design.

TABLE 16 shows a spatial stream configuration design.

| | B5-B0 | NS TS[1] | NS TS[2] | NS TS[3] | NS TS[4] | NS TS[5] | NS TS[6] | NS TS[7] | NS TS[8] | Total NSTS | Number of Entries |
|---|---|---|---|---|---|---|---|---|---|---|---|
| 2 | 000000-000011 | 1-4 | 1 | 0 | 0 | 0 | 0 | 0 | 0 | 2-5 | 10 |
| | 000100-000110 | 2-4 | 2 | 0 | 0 | 0 | 0 | 0 | 0 | 4-6 | |
| | 000111-001000 | 3-4 | 3 | 0 | 0 | 0 | 0 | 0 | 0 | 6-7 | |
| | 001001 | 4 | 4 | 0 | 0 | 0 | 0 | 0 | 0 | 8 | |
| 3 | 000000-000011 | 1-4 | 1 | 1 | 0 | 0 | 0 | 0 | 0 | 3-6 | 20 |
| | 000100-000110 | 2-4 | 2 | 1 | 0 | 0 | 0 | 0 | 0 | 5-7 | |
| | 000111-001000 | 3-4 | 3 | 1 | 0 | 0 | 0 | 0 | 0 | 7-8 | |
| | 001001 | 4 | 4 | 1 | 0 | 0 | 0 | 0 | 0 | 9 | |
| | 001010-001100 | 2-4 | 2 | 2 | 0 | 0 | 0 | 0 | 0 | 6-8 | |
| | 001101-001110 | 3-4 | 3 | 2 | 0 | 0 | 0 | 0 | 0 | 8-9 | |
| | 001111 | 4 | 4 | 2 | 0 | 0 | 0 | 0 | 0 | 10 | |
| | 010000-010001 | 3-4 | 3 | 3 | 0 | 0 | 0 | 0 | 0 | 9-10 | |
| | 010010 | 4 | 4 | 3 | 0 | 0 | 0 | 0 | 0 | 11 | |
| | 010011 | 4 | 4 | 4 | 0 | 0 | 0 | 0 | 0 | 12 | |
| 4 | 000000-000011 | 1-4 | 1 | 1 | 1 | 0 | 0 | 0 | 0 | 4-7 | 35 |
| | 000100-000110 | 2-4 | 2 | 1 | 1 | 0 | 0 | 0 | 0 | 6-8 | |
| | 000111-001000 | 3-4 | 3 | 1 | 1 | 0 | 0 | 0 | 0 | 8-9 | |
| | 001001 | 4 | 4 | 1 | 1 | 0 | 0 | 0 | 0 | 10 | |
| | 001010-001100 | 2-4 | 2 | 2 | 1 | 0 | 0 | 0 | 0 | 7-9 | |
| | 001101-001110 | 3-4 | 3 | 2 | 1 | 0 | 0 | 0 | 0 | 9-10 | |
| | 001111 | 4 | 4 | 2 | 1 | 0 | 0 | 0 | 0 | 11 | |
| | 010000-010001 | 3-4 | 3 | 3 | 1 | 0 | 0 | 0 | 0 | 10-11 | |
| | 010010 | 4 | 4 | 3 | 1 | 0 | 0 | 0 | 0 | 12 | |
| | 010011 | 4 | 4 | 4 | 1 | 0 | 0 | 0 | 0 | 13 | |
| | 010100-010110 | 2-4 | 2 | 2 | 2 | 0 | 0 | 0 | 0 | 8-10 | |
| | 010111-011000 | 3-4 | 3 | 2 | 2 | 0 | 0 | 0 | 0 | 10-11 | |
| | 011001 | 4 | 4 | 2 | 2 | 0 | 0 | 0 | 0 | 12 | |
| | 011010-011011 | 3-4 | 3 | 3 | 2 | 0 | 0 | 0 | 0 | 11-12 | |
| | 011100 | 4 | 4 | 3 | 2 | 0 | 0 | 0 | 0 | 13 | |
| | 011101 | 4 | 4 | 4 | 2 | 0 | 0 | 0 | 0 | 14 | |
| | 011110-011111 | 3-4 | 3 | 3 | 3 | 0 | 0 | 0 | 0 | 12-13 | |

TABLE 16-continued shows a spatial stream configuration design.

| | B5-B0 | NS TS[1] | NS TS[2] | NS TS[3] | NS TS[4] | NS TS[5] | NS TS[6] | NS TS[7] | NS TS[8] | Total NSTS | Number of Entries |
|---|---|---|---|---|---|---|---|---|---|---|---|
| | 100000 | 4 | 4 | 3 | 3 | 0 | 0 | 0 | 0 | 14 | |
| | 100001 | 4 | 4 | 4 | 3 | 0 | 0 | 0 | 0 | 15 | |
| | 100010 | 4 | 4 | 4 | 4 | 0 | 0 | 0 | 0 | 16 | |
| 5 | 000000-000011 | 1-4 | 1 | 1 | 1 | 1 | 0 | 0 | 0 | 5-8 | 49 |
| | 000100-000110 | 2-4 | 2 | 1 | 1 | 1 | 0 | 0 | 0 | 7-9 | |
| | 000111-001000 | 3-4 | 3 | 1 | 1 | 1 | 0 | 0 | 0 | 9-10 | |
| | 001001 | 4 | 4 | 1 | 1 | 1 | 0 | 0 | 0 | 11 | |
| | 001010-001100 | 2-4 | 2 | 2 | 1 | 1 | 0 | 0 | 0 | 8-10 | |
| | 001101-001110 | 3-4 | 3 | 2 | 1 | 1 | 0 | 0 | 0 | 10-11 | |
| | 001111 | 4 | 4 | 2 | 1 | 1 | 0 | 0 | 0 | 12 | |
| | 010000-010001 | 3-4 | 3 | 3 | 1 | 1 | 0 | 0 | 0 | 11-12 | |
| | 010010 | 4 | 4 | 3 | 1 | 1 | 0 | 0 | 0 | 13 | |
| | 010011 | 4 | 4 | 4 | 1 | 1 | 0 | 0 | 0 | 14 | |
| | 010100-010110 | 2-4 | 2 | 2 | 2 | 1 | 0 | 0 | 0 | 9-11 | |
| | 010111-011000 | 3-4 | 3 | 2 | 2 | 1 | 0 | 0 | 0 | 11-12 | |
| | 011001 | 4 | 4 | 2 | 2 | 1 | 0 | 0 | 0 | 13 | |
| | 011010-011011 | 3-4 | 3 | 3 | 2 | 1 | 0 | 0 | 0 | 12-13 | |
| | 011100 | 4 | 4 | 3 | 2 | 1 | 0 | 0 | 0 | 14 | |
| | 011101 | 4 | 4 | 4 | 2 | 1 | 0 | 0 | 0 | 15 | |
| | 011110-011111 | 3-4 | 3 | 3 | 3 | 1 | 0 | 0 | 0 | 13-14 | |
| | 100000 | 4 | 4 | 3 | 3 | 1 | 0 | 0 | 0 | 15 | |
| | 100001 | 4 | 4 | 4 | 3 | 1 | 0 | 0 | 0 | 16 | |
| | 100010-100100 | 2-4 | 2 | 2 | 2 | 2 | 0 | 0 | 0 | 10-12 | |
| | 100101-100110 | 3-4 | 3 | 2 | 2 | 2 | 0 | 0 | 0 | 12-13 | |
| | 100111 | 4 | 4 | 2 | 2 | 2 | 0 | 0 | 0 | 14 | |
| | 101000-101001 | 3-4 | 3 | 3 | 2 | 2 | 0 | 0 | 0 | 13-14 | |
| | 101010 | 4 | 4 | 3 | 2 | 2 | 0 | 0 | 0 | 15 | |
| | 101011 | 4 | 4 | 4 | 2 | 2 | 0 | 0 | 0 | 16 | |
| | 101100-101101 | 3-4 | 3 | 3 | 3 | 2 | 0 | 0 | 0 | 14-15 | |
| | 101110 | 4 | 4 | 3 | 3 | 2 | 0 | 0 | 0 | 16 | |
| | 101111-110000 | 3-4 | 3 | 3 | 3 | 3 | 0 | 0 | 0 | 15-16 | |
| 6 | 000000-000011 | 1-4 | 1 | 1 | 1 | 1 | 1 | 0 | 0 | 6-9 | 54 |
| | 000100-000110 | 2-4 | 2 | 1 | 1 | 1 | 1 | 0 | 0 | 8-10 | |
| | 000111-001000 | 3-4 | 3 | 1 | 1 | 1 | 1 | 0 | 0 | 10-11 | |
| | 001001 | 4 | 4 | 1 | 1 | 1 | 1 | 0 | 0 | 12 | |
| | 001010-001100 | 2-4 | 2 | 2 | 1 | 1 | 1 | 0 | 0 | 9-11 | |
| | 001101-001110 | 3-4 | 3 | 2 | 1 | 1 | 1 | 0 | 0 | 11-12 | |
| | 001111 | 4 | 4 | 2 | 1 | 1 | 1 | 0 | 0 | 13 | |
| | 010000-010001 | 3-4 | 3 | 3 | 1 | 1 | 1 | 0 | 0 | 12-13 | |
| | 010010 | 4 | 4 | 3 | 1 | 1 | 1 | 0 | 0 | 14 | |
| | 010011 | 4 | 4 | 4 | 1 | 1 | 1 | 0 | 0 | 15 | |
| | 010100-010110 | 2-4 | 2 | 2 | 2 | 1 | 1 | 0 | 0 | 10-12 | |
| | 010111-011000 | 3-4 | 3 | 2 | 2 | 1 | 1 | 0 | 0 | 12-13 | |
| | 011001 | 4 | 4 | 2 | 2 | 1 | 1 | 0 | 0 | 14 | |
| | 011010-011011 | 3-4 | 3 | 3 | 2 | 1 | 1 | 0 | 0 | 13-14 | |
| | 011100 | 4 | 4 | 3 | 2 | 1 | 1 | 0 | 0 | 15 | |
| | 011101 | 4 | 4 | 4 | 2 | 1 | 1 | 0 | 0 | 16 | |
| | 011110-011111 | 3-4 | 3 | 3 | 3 | 1 | 1 | 0 | 0 | 14-15 | |

TABLE 16-continued shows a spatial stream configuration design.

| | B5-B0 | NS TS[1] | NS TS[2] | NS TS[3] | NS TS[4] | NS TS[5] | NS TS[6] | NS TS[7] | NS TS[8] | Total NSTS | Number of Entries |
|---|---|---|---|---|---|---|---|---|---|---|---|
| | 100000 | 4 | 4 | 3 | 3 | 1 | 1 | 0 | 0 | 16 | |
| | 100001-100011 | 2-4 | 2 | 2 | 2 | 2 | 1 | 0 | 0 | 11-13 | |
| | 100100-100101 | 3-4 | 3 | 2 | 2 | 2 | 1 | 0 | 0 | 13-14 | |
| | 100110 | 4 | 4 | 2 | 2 | 2 | 1 | 0 | 0 | 15 | |
| | 100111-101000 | 3-4 | 3 | 3 | 2 | 2 | 1 | 0 | 0 | 14-15 | |
| | 101001 | 4 | 4 | 3 | 2 | 2 | 1 | 0 | 0 | 16 | |
| | 101010-101011 | 3-4 | 3 | 3 | 3 | 2 | 1 | 0 | 0 | 15-16 | |
| | 101100 | 3 | 3 | 3 | 3 | 3 | 1 | 0 | 0 | 16 | |
| | 101101-101111 | 2-4 | 2 | 2 | 2 | 2 | 2 | 0 | 0 | 12-14 | |
| | 110000-110001 | 3-4 | 3 | 2 | 2 | 2 | 2 | 0 | 0 | 14-15 | |
| | 110010 | 4 | 4 | 2 | 2 | 2 | 2 | 0 | 0 | 16 | |
| | 110011-110100 | 3-4 | 3 | 3 | 2 | 2 | 2 | 0 | 0 | 15-16 | |
| | 110101 | 3 | 3 | 3 | 3 | 2 | 2 | 0 | 0 | 16 | |
| 7 | 000000-000011 | 1-4 | 1 | 1 | 1 | 1 | 1 | 1 | 0 | 7-10 | 50 |
| | 000100-000110 | 2-4 | 2 | 1 | 1 | 1 | 1 | 1 | 0 | 9-11 | |
| | 000111-001000 | 3-4 | 3 | 1 | 1 | 1 | 1 | 1 | 0 | 11-12 | |
| | 001001 | 4 | 4 | 1 | 1 | 1 | 1 | 1 | 0 | 13 | |
| | 001010-001100 | 2-4 | 2 | 2 | 1 | 1 | 1 | 1 | 0 | 10-12 | |
| | 001101-001110 | 3-4 | 3 | 2 | 1 | 1 | 1 | 1 | 0 | 12-13 | |
| | 001111 | 4 | 4 | 2 | 1 | 1 | 1 | 1 | 0 | 14 | |
| | 010000-010001 | 3-4 | 3 | 3 | 1 | 1 | 1 | 1 | 0 | 13-14 | |
| | 010010 | 4 | 4 | 3 | 1 | 1 | 1 | 1 | 0 | 15 | |
| | 010011 | 4 | 4 | 4 | 1 | 1 | 1 | 1 | 0 | 16 | |
| | 010100-010110 | 2-4 | 2 | 2 | 2 | 1 | 1 | 1 | 0 | 11-13 | |
| | 010111-011000 | 3-4 | 3 | 2 | 2 | 1 | 1 | 1 | 0 | 13-14 | |
| | 011001 | 4 | 4 | 2 | 2 | 1 | 1 | 1 | 0 | 15 | |
| | 011010-011011 | 3-4 | 3 | 3 | 2 | 1 | 1 | 1 | 0 | 14-15 | |
| | 011100 | 4 | 4 | 3 | 2 | 1 | 1 | 1 | 0 | 16 | |
| | 011101-011110 | 3-4 | 3 | 3 | 3 | 1 | 1 | 1 | 0 | 15-16 | |
| | 011111-100001 | 2-4 | 2 | 2 | 2 | 2 | 1 | 1 | 0 | 12-14 | |
| | 100010-100011 | 3-4 | 3 | 2 | 2 | 2 | 1 | 1 | 0 | 14-15 | |
| | 100100 | 4 | 4 | 2 | 2 | 2 | 1 | 1 | 0 | 16 | |
| | 100101-100110 | 3-4 | 3 | 3 | 2 | 2 | 1 | 1 | 0 | 15-16 | |
| | 100111 | 3 | 3 | 3 | 3 | 2 | 1 | 1 | 0 | 16 | |
| | 101000-101010 | 2-4 | 2 | 2 | 2 | 2 | 2 | 1 | 0 | 13-15 | |
| | 101011-101100 | 3-4 | 3 | 2 | 2 | 2 | 2 | 1 | 0 | 15-16 | |
| | 101101 | 3 | 3 | 3 | 2 | 2 | 2 | 1 | 0 | 16 | |
| | 101110-110000 | 2-4 | 2 | 2 | 2 | 2 | 2 | 2 | 0 | 14-16 | |
| | 110001 | 3 | 3 | 2 | 2 | 2 | 2 | 2 | 0 | 16 | |
| 8 | 000000-000011 | 1-4 | 1 | 1 | 1 | 1 | 1 | 1 | 1 | 8-11 | 41 |
| | 000100-000110 | 2-4 | 2 | 1 | 1 | 1 | 1 | 1 | 1 | 10-12 | |
| | 000111-001000 | 3-4 | 3 | 1 | 1 | 1 | 1 | 1 | 1 | 12-13 | |
| | 001001 | 4 | 4 | 1 | 1 | 1 | 1 | 1 | 1 | 14 | |
| | 001010-001100 | 2-4 | 2 | 2 | 1 | 1 | 1 | 1 | 1 | 11-13 | |
| | 001101-001110 | 3-4 | 3 | 2 | 1 | 1 | 1 | 1 | 1 | 13-14 | |

TABLE 16-continued shows a spatial stream configuration design.

| B5-B0 | NS TS[1] | NS TS[2] | NS TS[3] | NS TS[4] | NS TS[5] | NS TS[6] | NS TS[7] | NS TS[8] | Total NSTS | Number of Entries |
|---|---|---|---|---|---|---|---|---|---|---|
| 001111 | 4 | 4 | 2 | 1 | 1 | 1 | 1 | 1 | 15 | |
| 010000-010001 | 3-4 | 3 | 3 | 1 | 1 | 1 | 1 | 1 | 14-15 | |
| 010010 | 4 | 4 | 3 | 1 | 1 | 1 | 1 | 1 | 16 | |
| 010011-010101 | 2-4 | 2 | 2 | 2 | 1 | 1 | 1 | 1 | 12-14 | |
| 010110-010111 | 3-4 | 3 | 2 | 2 | 1 | 1 | 1 | 1 | 14-15 | |
| 011000 | 4 | 4 | 2 | 2 | 1 | 1 | 1 | 1 | 16 | |
| 011001-011010 | 3-4 | 3 | 3 | 2 | 1 | 1 | 1 | 1 | 15-16 | |
| 011011 | 3 | 3 | 3 | 3 | 1 | 1 | 1 | 1 | 16 | |
| 011100-011110 | 2-4 | 2 | 2 | 2 | 2 | 1 | 1 | 1 | 13-15 | |
| 011111-100000 | 3-4 | 3 | 2 | 2 | 2 | 1 | 1 | 1 | 15-16 | |
| 100001 | 3 | 3 | 3 | 2 | 2 | 1 | 1 | 1 | 16 | |
| 100010-100100 | 2-4 | 2 | 2 | 2 | 2 | 2 | 1 | 1 | 14-16 | |
| 100101 | 3 | 3 | 2 | 2 | 2 | 2 | 1 | 1 | 16 | |
| 100110-100111 | 2-3 | 2 | 2 | 2 | 2 | 2 | 2 | 1 | 15-16 | |
| 101000 | 2 | 2 | 2 | 2 | 2 | 2 | 2 | 2 | 16 | |

Table 16 shows a 6-bit spatial stream configuration design as described with reference to FIG. 26.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A wireless communication device, comprising:
a processing system that includes processor circuitry and memory circuitry that stores code, the processing system configured to cause the wireless communication device to:
receive, via at least a portion of a wireless channel, a packet including a preamble portion and a data portion, the preamble portion including:
a universal signal field (U-SIG) that is duplicated on each subchannel of a first subset of subchannels of the wireless channel, the first subset of subchannels including two or more subchannels, and the U-SIG including at least a version identifier that indicates a version of the packet and frequency occupation information that indicates a bandwidth of the wireless channel and punctured channel information, wherein the two or more subchannels of the first subset of subchannels are determined based at least in part on the bandwidth of the wireless channel and the punctured channel information; and
a first signal field that is encoded in a frequency domain across the first subset of subchannels; and
decode the first signal field on the first subset of subchannels in accordance with the version identifier and the frequency occupation information.

2. The wireless communication device of claim 1, wherein the wireless channel spans one or more 80 MHz bandwidth portions, and the first signal field is encoded across two or more 20 MHz subchannels within a first 80 MHz bandwidth portion.

3. The wireless communication device of claim 2, wherein a starting 20 MHz subchannel within the first 80 MHz bandwidth portion is a lowest 20 MHz subchannel within the 80 MHz bandwidth portion.

4. The wireless communication device of claim 1, wherein the wireless channel spans one or more 80 MHz bandwidth portions, and a first instance of the first signal field is encoded across a first 20 MHz subchannel and a second 20 MHz subchannel within a first 80 MHz bandwidth portion, and a second instance of the first signal field is encoded across a third 20 MHz subchannel and a fourth 20 MHz subchannel of the first 80 MHz bandwidth portion.

5. The wireless communication device of claim 4, wherein:
when the first 80 MHz bandwidth portion is unpunctured, the first 20 MHz subchannel includes a first instance of a first content channel of the first signal field, the second 20 MHz subchannel includes a first instance of a second content channel of the first signal field, the third 20 MHz subchannel includes a second instance of the first content channel, and the fourth 20 MHz subchannel includes a second instance of the second content channel.

6. The wireless communication device of claim 5, wherein to decode the first signal field, the processing system is further configured to cause the wireless communication device to:
combine the first instance of the first content channel and the second instance of the first content channel; and
decode the first content channel using a 20 MHz decoder.

7. The wireless communication device of claim 4, wherein the punctured channel information indicates one or more of the 20 MHz subchannels are punctured.

8. The wireless communication device of claim 7, wherein the first content channel and the second content channel are alternately encoded in consecutive 20 MHz subchannels, and one or more instances of the first content channel or the second content channel are omitted when a corresponding 20 MHz subchannel is punctured.

9. The wireless communication device of claim 7, wherein the first content channel and the second content channel are alternately encoded in consecutive unpunctured MHz subchannels.

10. The wireless communication device of claim 1, wherein the packet is formatted according to a multi-user (MU) multiple-input multiple-output (MIMO) format that supports multiple users including the wireless communication device, and wherein the first signal field further includes a spatial stream configuration for the wireless communication device.

11. The wireless communication device of claim 10, wherein the spatial stream configuration indicates that at least two spatial streams are configured for the wireless communication device.

12. The wireless communication device of claim 11, wherein the spatial stream configuration indicates that up to 4 spatial streams or up to 8 spatial streams are configured for the wireless communication device, and wherein at least one other user is configured with up to 4 spatial streams or up to 8 spatial streams.

13. The wireless communication device of claim 10, wherein the spatial stream configuration supports up to 16 spatial streams.

14. A method for wireless communication, comprising:
receiving, via at least a portion of a wireless channel, a packet including a preamble portion and a data portion, the preamble portion including:
a universal signal field (U-SIG) that is duplicated on each subchannel of a first subset of subchannels of the wireless channel, the first subset of subchannels including two or more subchannels, and the U-SIG including at least a version identifier that indicates a version of the packet and frequency occupation information that indicates a bandwidth of the wireless channel and punctured channel information, wherein the two or more subchannels of the first subset of subchannels are determined based at least in part on the bandwidth of the wireless channel and the punctured channel information; and
a first signal field that is encoded in a frequency domain across the first subset of subchannels; and
decode the first signal field on the first subset of subchannels in accordance with the version identifier and the frequency occupation information.

15. The method of claim 14, wherein the wireless channel spans one or more 80 MHz bandwidth portions, and the first signal field is encoded across two or more 20 MHz subchannels within a first 80 MHz bandwidth portion.

16. The method of claim 15, wherein a starting 20 MHz subchannel within the first 80 MHz bandwidth portion is a lowest 20 MHz subchannel within the 80 MHz bandwidth portion.

17. The method of claim 14, wherein the wireless channel spans one or more MHz bandwidth portions, and a first instance of the first signal field is encoded across a first 20 MHz subchannel and a second 20 MHz subchannel within a first 80 MHz bandwidth portion, and a second instance of the first signal field is encoded across a third 20 MHz subchannel and a fourth 20 MHz subchannel of the first 80 MHz bandwidth portion.

18. The method of claim 17, wherein:
when the first 80 MHz bandwidth portion is unpunctured, the first 20 MHz subchannel includes a first instance of a first content channel of the first signal field, the second 20 MHz subchannel includes a first instance of a second content channel of the first signal field, the third 20 MHz subchannel includes a second instance of the first content channel, and the fourth 20 MHz subchannel includes a second instance of the second content channel.

19. The method of claim 18, wherein the decoding further comprises:
combining the first instance of the first content channel and the second instance of the first content channel; and
decoding the first content channel using a 20 MHz decoder.

20. The method of claim 17, wherein the punctured channel information indicates one or more of the 20 MHz subchannels are punctured.

21. The method of claim 20, wherein the first content channel and the second content channel are alternately encoded in consecutive 20 MHz subchannels, and one or more instances of the first content channel or the second content channel are omitted when a corresponding 20 MHz subchannel is punctured.

22. The method of claim 20, wherein the first content channel and the second content channel are alternately encoded in consecutive unpunctured 20 MHz subchannels.

23. The method of claim 14, wherein the packet is formatted according to a multi-user (MU) multiple-input multiple-output (MIMO) format that supports multiple users, and wherein the first signal field further includes a spatial stream configuration for the wireless communication device.

24. The method of claim 23, wherein the spatial stream configuration indicates that at least two spatial streams are configured for the wireless communication device.

25. The method of claim 24, wherein the spatial stream configuration indicates that up to 4 spatial streams or up to 8 spatial streams are configured for the wireless communication device, and wherein at least one other user is configured with up to 4 spatial streams or up to 8 spatial streams.

26. The method of claim 23, wherein the spatial stream configuration supports up to 16 spatial streams.

27. A mobile station comprising:
   a wireless communication device comprising:
      at least one modem;
      at least one processor communicatively coupled with the at least one modem; and
      at least one memory communicatively coupled with the at least one processor and storing processor-readable code that, when executed by the at least one processor in conjunction with the at least one modem, is configured to:
         receive, via at least a portion of a wireless channel, a packet including a preamble portion and a data portion, the preamble portion including:
            a universal signal field (U-SIG) that is duplicated on each subchannel of a first subset of subchannels of the wireless channel, the first subset of subchannels including two or more subchannels, and the U-SIG including at least a version identifier that indicates a version of the packet and frequency occupation information that indicates a bandwidth of the wireless channel and punctured channel information, wherein the two or more subchannels of the first subset of subchannels are determined based at least in part on the bandwidth of the wireless channel and the punctured channel information; and
            a first signal field that is encoded in a frequency domain across the first subset of subchannels; and
         decode the first signal field on the first subset of subchannels in accordance with the version identifier and the frequency occupation information;
      at least one transceiver coupled to the at least one modem;
      at least one antenna coupled to the at least one transceiver to wirelessly transmit signals output from the at least one transceiver and to wirelessly receive signals for input into the at least one transceiver; and
   a housing that encompasses the at least one modem, the at least one processor, the at least one memory, the at least one transceiver and at least a portion of the at least one antenna.

\* \* \* \* \*